(12) United States Patent
Auyeung et al.

(10) Patent No.: US 10,891,881 B2
(45) Date of Patent: *Jan. 12, 2021

(54) LIGHTING ASSEMBLY WITH LEDS AND OPTICAL ELEMENTS

(71) Applicant: Ultravision Technologies, LLC, Dallas, TX (US)

(72) Inventors: David Siucheong Auyeung, Carrollton, TX (US); William Y Hall, Dallas, TX (US); Simon Magarill, Mountain View, CA (US)

(73) Assignee: Ultravision Technologies, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,361

(22) Filed: Jan. 23, 2020

(65) Prior Publication Data

US 2020/0302837 A1     Sep. 24, 2020

Related U.S. Application Data

(63) Continuation of application No. 16/459,127, filed on Jul. 1, 2019, now abandoned, which is a continuation
(Continued)

(51) Int. Cl.
*G09F 13/22*     (2006.01)
*F21K 9/60*      (2016.01)
(Continued)

(52) U.S. Cl.
CPC ............... *G09F 13/22* (2013.01); *F21K 9/60* (2016.08); *F21S 6/006* (2013.01); *F21V 5/007* (2013.01);
(Continued)

(58) Field of Classification Search
CPC .. G09F 13/02; F21Y 2105/10; F21Y 2105/16; F21Y 2115/10; F21S 4/28; F21V 5/005; F21V 5/02
See application file for complete search history.

(56) References Cited

U.S. PATENT DOCUMENTS 242,899 A     1/1881  Edison
1,267,865 A   5/1918  Halvorson
(Continued)

FOREIGN PATENT DOCUMENTS

CA    2342267 A1   9/2001
CA    2342267 C    9/2001
(Continued)

OTHER PUBLICATIONS

US 7,282,743 B2, 10/2007, Sakai et al. (withdrawn)
(Continued)

*Primary Examiner* — Alexander K Garlen
(74) *Attorney, Agent, or Firm* — Slater Matsil, LLP

(57) ABSTRACT

A lighting apparatus includes a circuit board and light emitting diodes (LEDs) attached to the circuit board. The LEDs are arranged in an array of row and columns and are attached to the circuit board are arranged in a single plane. A support substrate supports the circuit board. Optical elements are configured to redirect light from the plurality of LEDs. Each optical element is substantially the same as all other optical elements. Each LED is associated with a single optical element and each optical element is associated with a single LED. The lighting apparatus is configured to direct light away from the circuit board so that the light is directed so as to illuminate a substantially rectangular area that is off-center relative to the light assembly. The substantially rectangular area has an edge that is at least 14 feet in length.

29 Claims, 13 Drawing Sheets

Related U.S. Application Data of application No. 15/939,565, filed on Mar. 29, 2018, now Pat. No. 10,339,841, which is a continuation of application No. 15/676,823, filed on Aug. 14, 2017, now Pat. No. 9,947,248, which is a continuation of application No. 15/162,278, filed on May 23, 2016, now Pat. No. 9,734,737, which is a continuation of application No. 14/992,680, filed on Jan. 11, 2016, now Pat. No. 9,349,307, which is a continuation of application No. 14/635,907, filed on Mar. 2, 2015, now Pat. No. 9,234,642, which is a continuation of application No. 13/836,517, filed on Mar. 15, 2013, now Pat. No. 8,974,077.

(60) Provisional application No. 61/677,346, filed on Jul. 30, 2012.

(51) Int. Cl.

| | | |
|---|---|---|
| *F21V 29/70* | (2015.01) | |
| *F21V 5/00* | (2018.01) | |
| *F21V 29/00* | (2015.01) | |
| *F21V 29/15* | (2015.01) | |
| *F21V 33/00* | (2006.01) | |
| *G09F 15/00* | (2006.01) | |
| *F21S 6/00* | (2006.01) | |
| *G09F 13/02* | (2006.01) | |
| *F21V 29/503* | (2015.01) | |
| *F21V 29/76* | (2015.01) | |
| *F21V 29/74* | (2015.01) | |
| *F21V 29/83* | (2015.01) | |
| *F21V 31/00* | (2006.01) | |
| *F21V 29/89* | (2015.01) | |
| *F21V 19/00* | (2006.01) | |
| *F21V 21/26* | (2006.01) | |
| *F21V 23/00* | (2015.01) | |
| *F21W 131/10* | (2006.01) | |
| *G02B 19/00* | (2006.01) | |
| *F21Y 105/12* | (2016.01) | |
| *F21Y 105/10* | (2016.01) | |
| *F21Y 115/10* | (2016.01) | |
| *F21W 131/40* | (2006.01) | |
| *F21Y 105/16* | (2016.01) | |

(52) U.S. Cl.
CPC ............ *F21V 19/003* (2013.01); *F21V 21/26* (2013.01); *F21V 23/002* (2013.01); *F21V 29/00* (2013.01); *F21V 29/15* (2015.01); *F21V 29/503* (2015.01); *F21V 29/70* (2015.01); *F21V 29/74* (2015.01); *F21V 29/745* (2015.01); *F21V 29/76* (2015.01); *F21V 29/763* (2015.01); *F21V 29/83* (2015.01); *F21V 29/89* (2015.01); *F21V 31/00* (2013.01); *F21V 31/005* (2013.01); *F21V 33/00* (2013.01); *G09F 13/02* (2013.01); *G09F 15/00* (2013.01); *G09F 15/005* (2013.01); *G09F 15/0037* (2013.01); *F21W 2131/10* (2013.01); *F21W 2131/40* (2013.01); *F21Y 2105/10* (2016.08); *F21Y 2105/12* (2016.08); *F21Y 2105/16* (2016.08); *F21Y 2115/10* (2016.08); *G02B 19/0014* (2013.01); *G02B 19/0028* (2013.01); *G02B 19/0061* (2013.01); *G02B 19/0066* (2013.01); *G09F 2013/222* (2013.01)

(56) References Cited

U.S. PATENT DOCUMENTS

| | | |
|---|---|---|
| 2,254,961 A | 9/1941 | Lawrence et al. |
| 2,891,337 A | 6/1959 | Breslaw |
| 3,249,473 A | 5/1966 | Holonyak, Jr. |
| 3,905,141 A | 9/1975 | Chichester, Jr. |
| 3,981,023 A | 9/1976 | King et al. |
| 4,006,476 A | 2/1977 | Romney |
| 4,197,527 A | 4/1980 | Romney |
| 4,235,285 A | 11/1980 | Johnson et al. |
| 4,263,736 A | 4/1981 | Beierwaltes et al. |
| 4,298,869 A | 11/1981 | Okuno |
| 4,418,333 A | 11/1983 | Schwarzbach et al. |
| 4,603,496 A | 8/1986 | Latz et al. |
| 4,633,161 A | 12/1986 | Callahan et al. |
| 4,675,575 A | 6/1987 | Smith et al. |
| 4,679,118 A | 7/1987 | Johnson et al. |
| 4,771,278 A | 9/1988 | Pooley |
| 4,901,155 A | 2/1990 | Hara et al. |
| 4,929,866 A | 5/1990 | Murata et al. |
| 4,935,665 A | 6/1990 | Murata |
| 4,954,935 A | 9/1990 | Hammond et al. |
| 4,966,512 A | 10/1990 | Takaku |
| 4,984,999 A | 1/1991 | Leake |
| 5,018,290 A | 5/1991 | Kozek et al. |
| 5,020,253 A | 6/1991 | Lie et al. |
| 5,036,248 A | 7/1991 | McEwan et al. |
| 5,079,636 A | 1/1992 | Brody |
| 5,083,194 A | 1/1992 | Bartilson |
| 5,124,890 A | 6/1992 | Choi et al. |
| 5,142,804 A | 9/1992 | Hillstrom et al. |
| 5,160,853 A | 11/1992 | Simon et al. |
| 5,195,016 A | 3/1993 | Powers |
| 5,248,919 A | 9/1993 | Hanna et al. |
| 5,268,828 A | 12/1993 | Miura |
| 5,313,729 A | 5/1994 | Sakai et al. |
| 5,329,426 A | 7/1994 | Villani |
| 5,347,736 A | 9/1994 | Kanigan |
| 5,379,202 A | 1/1995 | Daun |
| 5,379,540 A | 1/1995 | Howard |
| 5,384,940 A | 1/1995 | Soule et al. |
| 5,404,282 A | 4/1995 | Klinke et al. |
| 5,410,328 A | 4/1995 | Yoksza et al. |
| 5,430,356 A | 7/1995 | Ference et al. |
| 5,489,891 A | 2/1996 | Diong et al. |
| 5,495,147 A | 2/1996 | Lanzisera |
| 5,559,528 A | 9/1996 | Ravid et al. |
| 5,561,351 A | 10/1996 | Vrionis et al. |
| 5,563,470 A | 10/1996 | Li |
| 5,578,839 A | 11/1996 | Nakamura et al. |
| 5,592,391 A | 1/1997 | Muyshondt et al. |
| 5,598,066 A | 1/1997 | Wiesemann et al. |
| 5,636,057 A | 6/1997 | Dick et al. |
| 5,648,656 A | 7/1997 | Begemann et al. |
| 5,673,022 A | 9/1997 | Patel |
| 5,701,058 A | 12/1997 | Roth |
| 5,722,767 A | 3/1998 | Lin |
| 5,778,577 A | 7/1998 | Bailey |
| 5,779,351 A | 7/1998 | Erickson et al. |
| 5,785,415 A | 7/1998 | Matsumura et al. |
| 5,796,376 A | 8/1998 | Banks |
| 5,803,579 A | 9/1998 | Turnbull et al. |
| 5,812,422 A | 9/1998 | Lyons |
| 5,818,640 A | 10/1998 | Watanabe et al. |
| 5,838,247 A | 11/1998 | Bladowski |
| 5,857,767 A | 1/1999 | Hochstein |
| 5,889,568 A | 3/1999 | Seraphim et al. |
| 5,895,986 A | 4/1999 | Walters et al. |
| 5,896,093 A | 4/1999 | Sjobom |
| 5,905,442 A | 5/1999 | Mosebrook et al. |
| 5,914,698 A | 6/1999 | Nicholson et al. |
| 5,924,788 A | 7/1999 | Parkyn, Jr. |
| 5,926,320 A | 7/1999 | Parkyn, Jr. et al. |
| 5,949,581 A | 9/1999 | Kurtenbach et al. |
| 5,986,357 A | 11/1999 | Myron et al. |
| 5,990,802 A | 11/1999 | Maskeny |
| 6,016,038 A | 1/2000 | Mueller et al. |

(56) References Cited

U.S. PATENT DOCUMENTS

| | | |
|---|---|---|
| 6,028,396 A | 2/2000 | Morrissey et al. |
| 6,035,266 A | 3/2000 | Williams et al. |
| 6,045,240 A | 4/2000 | Hochstein |
| 6,065,854 A | 5/2000 | West et al. |
| 6,072,280 A | 6/2000 | Allen |
| 6,091,614 A | 7/2000 | Malenfant |
| 6,101,750 A | 8/2000 | Blesener et al. |
| 6,119,076 A | 9/2000 | Williams et al. |
| 6,150,996 A | 11/2000 | Nicholson et al. |
| 6,151,529 A | 11/2000 | Batko |
| 6,154,945 A | 12/2000 | Voelzke |
| 6,162,849 A | 12/2000 | Zhuo et al. |
| 6,169,632 B1 | 1/2001 | Kurtenbach et al. |
| 6,175,342 B1 | 1/2001 | Nicholson et al. |
| 6,250,774 B1 | 6/2001 | Begemann et al. |
| 6,262,696 B1 | 7/2001 | Seraphim et al. |
| 6,271,806 B1 | 8/2001 | Motoshima et al. |
| 6,274,924 B1 | 8/2001 | Carey et al. |
| 6,285,139 B1 | 9/2001 | Ghanem |
| 6,314,669 B1 | 11/2001 | Tucker |
| 6,329,593 B1 | 12/2001 | Yang |
| 6,359,555 B1 | 3/2002 | Williams |
| 6,364,507 B1 | 4/2002 | Yang |
| 6,370,019 B1 | 4/2002 | Matthies et al. |
| 6,400,102 B1 | 6/2002 | Ghanem |
| 6,404,131 B1 | 6/2002 | Kawano et al. |
| 6,414,650 B1 | 7/2002 | Nicholson et al. |
| 6,422,716 B2 | 7/2002 | Henrici et al. |
| 6,428,189 B1 | 8/2002 | Hochstein |
| 6,441,558 B1 | 8/2002 | Muthu et al. |
| 6,445,373 B1 | 9/2002 | Yamamoto |
| 6,452,339 B1 | 9/2002 | Morrissey et al. |
| 6,452,340 B1 | 9/2002 | Morrissey et al. |
| 6,454,437 B1 | 9/2002 | Kelly |
| 6,473,002 B1 | 10/2002 | Hutchison |
| 6,496,359 B2 | 12/2002 | Clark et al. |
| 6,497,500 B1 | 12/2002 | Bradford |
| 6,504,301 B1 | 1/2003 | Lowery |
| 6,507,159 B2 | 1/2003 | Muthu |
| 6,508,024 B1 | 1/2003 | Hale |
| 6,509,941 B2 | 1/2003 | Freidhoff et al. |
| 6,517,218 B2 | 2/2003 | Hochstein |
| 6,528,954 B1 | 3/2003 | Lys et al. |
| 6,536,923 B1 | 3/2003 | Merz |
| 6,547,423 B2 | 4/2003 | Marshall et al. |
| 6,548,967 B1 | 4/2003 | Dowling et al. |
| 6,558,021 B2 | 5/2003 | Wu et al. |
| 6,570,505 B1 | 5/2003 | Malenfant |
| 6,582,103 B1 | 6/2003 | Popovich |
| 6,583,573 B2 | 6/2003 | Bierman |
| 6,592,238 B2 | 7/2003 | Cleaver et al. |
| 6,597,179 B2 | 7/2003 | Stgermain |
| 6,604,062 B2 | 8/2003 | Williams et al. |
| 6,607,286 B2 | 8/2003 | West et al. |
| 6,608,264 B1 | 8/2003 | Fouladpour |
| 6,608,485 B2 | 8/2003 | Stgermain |
| 6,624,638 B2 | 9/2003 | Stgermain |
| 6,642,666 B1 | 11/2003 | Stgermain |
| 6,659,632 B2 | 12/2003 | Chen |
| 6,674,096 B2 | 1/2004 | Sommers |
| 6,683,665 B1 | 1/2004 | Matthies |
| 6,693,551 B2 | 2/2004 | Pederson |
| 6,704,989 B1 | 3/2004 | Lutz et al. |
| 6,731,077 B1 | 5/2004 | Cheng |
| 6,741,222 B1 | 5/2004 | Tucker |
| 6,741,351 B2 | 5/2004 | Marshall et al. |
| 6,742,907 B2 | 6/2004 | Funamoto et al. |
| 6,756,998 B1 | 6/2004 | Bilger |
| 6,762,563 B2 | 7/2004 | St et al. |
| 6,773,135 B1 | 8/2004 | Packer |
| 6,783,269 B2 | 8/2004 | Pashley et al. |
| 6,784,603 B2 | 8/2004 | Pelka et al. |
| 6,787,999 B2 | 9/2004 | Stimac et al. |
| 6,791,458 B2 | 9/2004 | Baldwin |
| 6,791,513 B2 | 9/2004 | Ogino et al. |
| 6,798,341 B1 | 9/2004 | Eckel et al. |
| 6,799,864 B2 | 10/2004 | Bohler et al. |
| 6,813,853 B1 | 11/2004 | Tucker |
| 6,817,123 B2 | 11/2004 | Okazaki et al. |
| 6,830,358 B2 | 12/2004 | Allen |
| 6,834,001 B2 | 12/2004 | Myono |
| 6,837,605 B2 | 1/2005 | Reill |
| 6,841,944 B2 | 1/2005 | Morrissey et al. |
| 6,864,513 B2 | 3/2005 | Lin et al. |
| 6,877,106 B2 | 4/2005 | Tomooka et al. |
| 6,885,035 B2 | 4/2005 | Bhat et al. |
| 6,888,323 B1 | 5/2005 | Null et al. |
| 6,896,381 B2 | 5/2005 | Benitez et al. |
| 6,908,214 B2 | 6/2005 | Luk |
| 6,918,684 B2 | 7/2005 | Harvey |
| 6,937,258 B2 | 8/2005 | Lim et al. |
| 6,942,360 B2 | 9/2005 | Chou et al. |
| 6,946,975 B2 | 9/2005 | Hansler et al. |
| 6,948,838 B2 | 9/2005 | Kunstler |
| 6,956,541 B2 | 10/2005 | Mcclintock |
| 6,956,545 B2 | 10/2005 | Mcclintock et al. |
| 6,967,565 B2 | 11/2005 | Lingemann |
| 6,982,518 B2 | 1/2006 | Chou et al. |
| 6,994,452 B2 | 2/2006 | Rozenberg et al. |
| 7,006,306 B2 | 2/2006 | Falicoff et al. |
| 7,009,213 B2 | 3/2006 | Camras et al. |
| 7,019,276 B2 | 3/2006 | Cloutier et al. |
| 7,034,470 B2 | 4/2006 | Cok et al. |
| 7,048,400 B2 | 5/2006 | Murasko et al. |
| 7,055,271 B2 | 6/2006 | Lutz et al. |
| 7,064,673 B1 | 6/2006 | Bonham |
| 7,064,674 B2 | 6/2006 | Pederson |
| 7,071,620 B2 | 7/2006 | Devos et al. |
| 7,071,894 B1 | 7/2006 | Thielemans et al. |
| 7,072,096 B2 | 7/2006 | Holman et al. |
| 7,080,927 B2 | 7/2006 | Feuerborn et al. |
| 7,091,933 B2 | 8/2006 | Mcclintock et al. |
| 7,102,601 B2 | 9/2006 | Devos et al. |
| 7,118,236 B2 | 10/2006 | Hahm et al. |
| 7,122,976 B1 | 10/2006 | Null et al. |
| 7,131,226 B2 | 11/2006 | Gray et al. |
| 7,138,659 B2 | 11/2006 | Raos et al. |
| 7,144,135 B2 | 12/2006 | Martin et al. |
| 7,144,748 B2 | 12/2006 | Popovich |
| 7,153,002 B2 | 12/2006 | Kim et al. |
| 7,159,997 B2 | 1/2007 | Reo et al. |
| 7,160,140 B1 | 1/2007 | Mrakovich et al. |
| 7,190,390 B2 | 3/2007 | Hett et al. |
| 7,191,506 B2 | 3/2007 | Gray et al. |
| 7,204,607 B2 | 4/2007 | Yano et al. |
| 7,207,693 B2 | 4/2007 | Ratcliffe |
| 7,210,957 B2 | 5/2007 | Mrakovich et al. |
| 7,217,012 B2 | 5/2007 | Southard et al. |
| 7,220,022 B2 | 5/2007 | Allen et al. |
| 7,244,044 B2 | 7/2007 | Liao |
| 7,245,279 B2 | 7/2007 | Wang |
| 7,246,923 B2 | 7/2007 | Conner |
| 7,246,931 B2 | 7/2007 | Hsieh et al. |
| 7,252,408 B2 | 8/2007 | Mazzochette et al. |
| 7,271,543 B1 | 9/2007 | Goldstein |
| 7,273,300 B2 | 9/2007 | Mrakovich |
| 7,283,313 B2 | 10/2007 | Tamaoki et al. |
| 7,287,878 B2 | 10/2007 | Miller |
| 7,300,177 B2 | 11/2007 | Conner |
| 7,303,309 B2 | 12/2007 | Wu et al. |
| 7,311,431 B2 | 12/2007 | Chew et al. |
| 7,319,408 B2 | 1/2008 | Temple |
| 7,325,955 B2 | 2/2008 | Lucas et al. |
| 7,333,903 B2 | 2/2008 | Walters et al. |
| 7,334,918 B2 | 2/2008 | Newton et al. |
| 7,335,562 B2 | 2/2008 | Kobayashi et al. |
| 7,336,195 B2 | 2/2008 | van de Ven |
| 7,339,202 B2 | 3/2008 | Chiu et al. |
| 7,339,471 B1 | 3/2008 | Chan et al. |
| 7,344,275 B2 | 3/2008 | Allen et al. |
| 7,344,279 B2 | 3/2008 | Mueller et al. |
| 7,354,180 B2 | 4/2008 | Sawhney et al. |
| 7,358,929 B2 | 4/2008 | Mueller et al. |
| 7,360,923 B2 | 4/2008 | Weber-Rabsilber et al. |

(56) References Cited

U.S. PATENT DOCUMENTS

| | | |
|---|---|---|
| 7,374,306 B2 | 5/2008 | Liu |
| 7,374,316 B2 | 5/2008 | Kuo et al. |
| 7,375,381 B2 | 5/2008 | Shimizu et al. |
| 7,377,669 B2 | 5/2008 | Farmer et al. |
| 7,378,983 B2 | 5/2008 | Wang et al. |
| 7,390,117 B2 | 6/2008 | Leatherdale et al. |
| 7,396,146 B2 | 7/2008 | Wang |
| 7,399,105 B2 | 7/2008 | Southard et al. |
| 7,400,439 B2 | 7/2008 | Holman |
| 7,410,275 B2 | 8/2008 | Sommers et al. |
| 7,417,259 B2 | 8/2008 | Sakai et al. |
| 7,429,186 B2 | 9/2008 | Mrakovich et al. |
| 7,434,964 B1 | 10/2008 | Zheng et al. |
| 7,448,154 B1 | 11/2008 | Kludt |
| 7,458,706 B1 | 12/2008 | Liu et al. |
| 7,460,985 B2 | 12/2008 | Benitez et al. |
| 7,473,020 B2 | 1/2009 | Pickering |
| 7,478,915 B1 | 1/2009 | Pedersen |
| 7,501,657 B2 | 3/2009 | Nagai |
| 7,502,950 B1 | 3/2009 | Brands |
| 7,507,001 B2 | 3/2009 | Kit |
| 7,513,639 B2 | 4/2009 | Wang |
| 7,513,653 B1 | 4/2009 | Liu et al. |
| 7,520,771 B2 | 4/2009 | Nall et al. |
| 7,529,594 B2 | 5/2009 | Walters et al. |
| 7,543,976 B2 | 6/2009 | Abogabir |
| 7,546,167 B2 | 6/2009 | Walters et al. |
| 7,546,168 B2 | 6/2009 | Walters et al. |
| 7,549,773 B2 | 6/2009 | Lim |
| 7,549,777 B2 | 6/2009 | Huang |
| 7,564,368 B2 | 7/2009 | Segall |
| 7,566,147 B2 | 7/2009 | Wilcox et al. |
| 7,572,654 B2 | 8/2009 | Chang |
| 7,576,707 B2 | 8/2009 | Nishimura |
| 7,598,859 B2 | 10/2009 | Laski et al. |
| 7,603,184 B2 | 10/2009 | Walters et al. |
| 7,608,807 B2 | 10/2009 | Hick et al. |
| 7,614,771 B2 | 11/2009 | Mckechnie et al. |
| 7,618,162 B1 | 11/2009 | Parkyn et al. |
| 7,618,163 B2 | 11/2009 | Wilcox |
| 7,623,042 B2 | 11/2009 | Huizenga |
| 7,625,099 B2 | 12/2009 | Newton et al. |
| 7,633,055 B2 | 12/2009 | Nall et al. |
| 7,637,630 B2 | 12/2009 | Wilcox et al. |
| 7,648,257 B2 | 1/2010 | Villard |
| 7,651,245 B2 | 1/2010 | Thomas et al. |
| 7,654,684 B1 | 2/2010 | Wight et al. |
| 7,654,701 B2 | 2/2010 | Zhang et al. |
| 7,665,862 B2 | 2/2010 | Villard |
| 7,665,874 B2 | 2/2010 | Chadwell et al. |
| 7,674,018 B2 | 3/2010 | Holder et al. |
| 7,674,019 B2 | 3/2010 | Parkyn et al. |
| 7,675,075 B2 | 3/2010 | Nagai |
| 7,677,770 B2 | 3/2010 | Mazzochette |
| 7,677,914 B2 | 3/2010 | Nall et al. |
| 7,679,096 B1 | 3/2010 | Ruffin |
| 7,686,469 B2 | 3/2010 | Ruud et al. |
| 7,686,477 B2 | 3/2010 | Southard et al. |
| 7,687,288 B2 | 3/2010 | Saha et al. |
| 7,694,444 B2 | 4/2010 | Miller et al. |
| 7,696,698 B2 | 4/2010 | Ghanem |
| 7,719,480 B2 | 5/2010 | Devos et al. |
| 7,722,224 B1 | 5/2010 | Coleman et al. |
| 7,736,019 B2 | 6/2010 | Shimada et al. |
| 7,748,863 B1 | 7/2010 | Holman et al. |
| 7,753,561 B2 | 7/2010 | Chaves et al. |
| 7,753,564 B2 | 7/2010 | Cheng et al. |
| 7,761,260 B2 | 7/2010 | Walters et al. |
| RE41,603 E | 8/2010 | Matthies |
| 7,766,508 B2 | 8/2010 | Villard et al. |
| 7,766,512 B2 | 8/2010 | Chou et al. |
| 7,771,087 B2 | 8/2010 | Wilcox et al. |
| 7,774,968 B2 | 8/2010 | Nearman et al. |
| 7,784,971 B2 | 8/2010 | Dorogi |
| 7,791,282 B2 | 9/2010 | Yu et al. |
| 7,792,956 B2 | 9/2010 | Choong et al. |
| 7,794,114 B2 | 9/2010 | Medendorp, Jr. |
| 7,794,124 B2 | 9/2010 | Hulsey et al. |
| 7,796,034 B2 | 9/2010 | Laski et al. |
| 7,800,121 B2 | 9/2010 | Aanegola et al. |
| 7,804,252 B2 | 9/2010 | Chen |
| 7,806,563 B1 | 10/2010 | Bruck et al. |
| 7,817,063 B2 | 10/2010 | Hawkins et al. |
| 7,821,023 B2 | 10/2010 | Yuan et al. |
| RE41,914 E | 11/2010 | Palanisamy |
| 7,823,308 B1 | 11/2010 | Munson et al. |
| 7,824,070 B2 | 11/2010 | Higley et al. |
| 7,832,896 B2 | 11/2010 | Saha et al. |
| 7,841,750 B2 | 11/2010 | Wilcox et al. |
| 7,850,341 B2 | 12/2010 | Mrakovich et al. |
| 7,857,483 B2 | 12/2010 | Storch et al. |
| 7,862,195 B2 | 1/2011 | Stack et al. |
| 7,864,136 B2 | 1/2011 | Matthies et al. |
| 7,866,851 B2 | 1/2011 | Chang |
| 7,869,198 B1 | 1/2011 | Nearman et al. |
| 7,869,675 B2 | 1/2011 | Urano |
| 7,876,056 B2 | 1/2011 | Atkins et al. |
| 7,880,394 B2 | 2/2011 | Sibalich et al. |
| 7,896,521 B2 | 3/2011 | Becker et al. |
| 7,896,522 B2 | 3/2011 | Heller et al. |
| 7,905,634 B2 | 3/2011 | Agurok et al. |
| 7,911,359 B2 | 3/2011 | Walters et al. |
| 7,925,384 B2 | 4/2011 | Huizenga et al. |
| 7,926,213 B1 | 4/2011 | Kludt et al. |
| 7,926,300 B2 | 4/2011 | Roberts et al. |
| 7,926,977 B2 | 4/2011 | Nall et al. |
| 7,928,968 B2 | 4/2011 | Shon et al. |
| 7,938,558 B2 | 5/2011 | Wilcox et al. |
| 7,942,559 B2 | 5/2011 | Holder et al. |
| 7,944,365 B2 | 5/2011 | Walters et al. |
| 7,952,262 B2 | 5/2011 | Wilcox et al. |
| 7,959,326 B2 | 6/2011 | Laporte |
| 7,972,031 B2 | 7/2011 | Ray et al. |
| 7,976,210 B2 | 7/2011 | Shinozaki |
| 7,980,733 B2 | 7/2011 | Shih et al. |
| 7,980,747 B2 | 7/2011 | Vissenberg et al. |
| 7,997,761 B2 | 8/2011 | Peck et al. |
| 8,002,435 B2 | 8/2011 | Laporte |
| 8,007,121 B2 | 8/2011 | Elliott et al. |
| 8,010,319 B2 | 8/2011 | Walters et al. |
| 8,018,139 B2 | 9/2011 | Chou |
| 8,021,027 B2 | 9/2011 | Galipeau et al. |
| 8,025,417 B2 | 9/2011 | Pohlert et al. |
| 8,035,119 B2 | 10/2011 | Ng et al. |
| 8,035,320 B2 | 10/2011 | Sibert |
| 8,046,942 B1 | 11/2011 | Kludt et al. |
| 8,052,303 B2 | 11/2011 | Lo et al. |
| 8,056,614 B2 | 11/2011 | Chen et al. |
| 8,058,659 B2 | 11/2011 | Bisberg |
| 8,061,869 B2 | 11/2011 | Lo |
| 8,062,916 B2 | 11/2011 | Krames et al. |
| 8,092,046 B2 | 1/2012 | Wu et al. |
| 8,092,049 B2 | 1/2012 | Kinnune et al. |
| 8,100,552 B2 | 1/2012 | Spero |
| 8,101,434 B2 | 1/2012 | Guillien et al. |
| 8,104,204 B1 | 1/2012 | Syrstad |
| 8,109,660 B2 | 2/2012 | Hochstein et al. |
| 8,111,208 B2 | 2/2012 | Brown |
| 8,113,687 B2 | 2/2012 | Villard et al. |
| 8,122,627 B2 | 2/2012 | Miller |
| 8,132,942 B2 | 3/2012 | Holder et al. |
| 8,136,277 B2 | 3/2012 | Patterson et al. |
| 8,136,279 B1 | 3/2012 | Nearman et al. |
| 8,138,479 B2 | 3/2012 | Kothari et al. |
| 8,140,276 B2 | 3/2012 | Walters et al. |
| 8,152,337 B2 | 4/2012 | Herms et al. |
| 8,154,864 B1 | 4/2012 | Nearman et al. |
| 8,157,413 B2 | 4/2012 | Maxik et al. |
| 8,172,097 B2 | 5/2012 | Nearman et al. |
| 8,174,197 B2 | 5/2012 | Ghanem et al. |
| 8,179,055 B2 | 5/2012 | Miskin et al. |
| 8,183,794 B2 | 5/2012 | Grajcar |
| 8,192,048 B2 | 6/2012 | Kristoffersen et al. |
| 8,201,970 B2 | 6/2012 | Wang et al. |

(56) References Cited

U.S. PATENT DOCUMENTS

| | | |
|---|---|---|
| 8,203,445 B2 | 6/2012 | Recker et al. |
| 8,204,709 B2 | 6/2012 | Presher et al. |
| 8,210,723 B2 | 7/2012 | Peck et al. |
| 8,210,732 B2 | 7/2012 | Okumura et al. |
| 8,214,061 B2 | 7/2012 | Westrick et al. |
| 8,215,814 B2 | 7/2012 | Marcoux |
| 8,235,546 B2 | 8/2012 | Takasago et al. |
| 8,235,553 B2 | 8/2012 | Minami et al. |
| 8,237,590 B2 | 8/2012 | Mihai et al. |
| 8,246,219 B2 | 8/2012 | Teng et al. |
| 8,246,220 B2 | 8/2012 | Epstein et al. |
| 8,248,271 B2 | 8/2012 | Ghanem et al. |
| 8,256,919 B2 | 9/2012 | Holder et al. |
| 8,258,453 B2 | 9/2012 | Rees |
| 8,262,252 B2 | 9/2012 | Bergman et al. |
| 8,265,674 B2 | 9/2012 | Choong et al. |
| 8,267,551 B2 | 9/2012 | Lin |
| 8,269,700 B2 | 9/2012 | Joffer et al. |
| 8,272,757 B1 | 9/2012 | Fan et al. |
| 8,273,158 B2 | 9/2012 | Jarrier et al. |
| 8,275,471 B2 | 9/2012 | Huizenga et al. |
| 8,280,558 B2 | 10/2012 | Picco |
| 8,291,485 B2 | 10/2012 | Ellis, III |
| 8,294,371 B2 | 10/2012 | Ghanem et al. |
| 8,299,159 B2 | 10/2012 | Chandrasekhar et al. |
| 8,299,721 B2 | 10/2012 | Smith |
| 8,308,331 B2 | 11/2012 | Loh |
| 8,310,158 B2 | 11/2012 | Coplin et al. |
| 8,322,881 B1 | 12/2012 | Wassel |
| 8,330,387 B2 | 12/2012 | York et al. |
| 8,338,841 B2 | 12/2012 | Lerman et al. |
| 8,339,716 B2 | 12/2012 | Premysler |
| 8,342,709 B2 | 1/2013 | Lueken et al. |
| 8,344,660 B2 | 1/2013 | Mohan et al. |
| 8,348,460 B2 | 1/2013 | Bachl et al. |
| 8,348,461 B2 | 1/2013 | Wilcox et al. |
| 8,350,697 B2 | 1/2013 | Trundle et al. |
| 8,350,788 B1 | 1/2013 | Nearman et al. |
| 8,360,613 B2 | 1/2013 | Little, Jr. |
| 8,362,696 B2 | 1/2013 | Zheng |
| 8,364,325 B2 | 1/2013 | Huizenga et al. |
| 8,368,112 B2 | 2/2013 | Chan et al. |
| 8,376,581 B2 | 2/2013 | Auld et al. |
| 8,376,585 B2 | 2/2013 | Noeth |
| 8,384,293 B2 | 2/2013 | Liao |
| 8,393,101 B2 | 3/2013 | Knight et al. |
| D681,263 S | 4/2013 | Van et al. |
| 8,408,737 B2 | 4/2013 | Wright et al. |
| 8,410,706 B2 | 4/2013 | Steiner et al. |
| 8,415,897 B2 | 4/2013 | Choong et al. |
| 8,422,401 B1 | 4/2013 | Choong et al. |
| 8,427,076 B2 | 4/2013 | Bourquin et al. |
| 8,434,909 B2 | 5/2013 | Nichol et al. |
| 8,436,542 B2 | 5/2013 | Middletonwhite et al. |
| 8,436,549 B2 | 5/2013 | Hasnain |
| 8,444,297 B2 | 5/2013 | Lee et al. |
| 8,444,299 B2 | 5/2013 | Chou et al. |
| 8,454,194 B2 | 6/2013 | Liu |
| 8,454,215 B2 | 6/2013 | Bollmann |
| 8,463,453 B2 | 6/2013 | Parsons, Jr. |
| 8,465,178 B2 | 6/2013 | Wilcox et al. |
| 8,469,552 B2 | 6/2013 | Moeller |
| 8,476,650 B2 | 7/2013 | Liao |
| 8,502,456 B2 | 8/2013 | Jarrell et al. |
| 8,503,330 B1 | 8/2013 | Choong et al. |
| 8,506,103 B2 | 8/2013 | Iimura et al. |
| 8,506,118 B2 | 8/2013 | Maxik et al. |
| 8,519,566 B2 | 8/2013 | Recker et al. |
| 8,522,494 B2 | 9/2013 | Ward |
| 8,529,085 B2 | 9/2013 | Josefowicz et al. |
| 8,534,859 B2 | 9/2013 | Imajo et al. |
| 8,541,950 B2 | 9/2013 | Reed |
| 8,545,049 B2 | 10/2013 | Davis et al. |
| 8,547,023 B2 | 10/2013 | Chang et al. |
| 8,556,459 B2 | 10/2013 | Takamura et al. |
| 8,558,456 B2 | 10/2013 | Yokotani |
| 8,567,987 B2 | 10/2013 | Wronski |
| 8,569,679 B2 | 10/2013 | Holcombe et al. |
| RE44,574 E | 11/2013 | Ha et al. |
| 8,573,815 B2 | 11/2013 | Mallory et al. |
| 8,577,434 B2 | 11/2013 | Merchant et al. |
| 8,581,269 B2 | 11/2013 | Kuk et al. |
| 8,585,253 B2 | 11/2013 | Duong et al. |
| 8,585,254 B2 | 11/2013 | Arai et al. |
| 8,587,956 B2 | 11/2013 | Choutov et al. |
| 8,602,599 B2 | 12/2013 | Zimmer et al. |
| 8,610,357 B2 | 12/2013 | Stoll et al. |
| 8,610,779 B2 | 12/2013 | Wu |
| 8,622,572 B2 | 1/2014 | Morgan |
| 8,622,574 B2 | 1/2014 | Liu |
| 8,624,425 B2 | 1/2014 | Feng et al. |
| 8,628,217 B2 | 1/2014 | Moshtagh |
| 8,632,225 B2 | 1/2014 | Koo et al. |
| 8,635,049 B2 | 1/2014 | Kauffman et al. |
| 8,648,774 B2 | 2/2014 | Kline et al. |
| 8,651,693 B2 | 2/2014 | Josefowicz et al. |
| 8,662,704 B2 | 3/2014 | Carraher et al. |
| 8,665,310 B2 | 3/2014 | Verthein et al. |
| 8,669,716 B2 | 3/2014 | Recker et al. |
| 8,670,873 B2 | 3/2014 | Shloush et al. |
| 8,678,612 B2 | 3/2014 | Jasmin et al. |
| 8,697,458 B2 | 4/2014 | Nolan et al. |
| 8,702,262 B2 | 4/2014 | Park et al. |
| 8,731,689 B2 | 5/2014 | Platner et al. |
| 8,733,981 B2 | 5/2014 | Jiang et al. |
| 8,740,408 B2 | 6/2014 | Yoon et al. |
| 8,773,023 B2 | 7/2014 | Ghanem et al. |
| 8,777,458 B2 | 7/2014 | Seki et al. |
| 8,783,900 B2 | 7/2014 | Holder et al. |
| 8,789,967 B2 | 7/2014 | Gordin et al. |
| 8,794,795 B2 | 8/2014 | Yaphe et al. |
| 8,801,221 B2 | 8/2014 | Lin et al. |
| 8,814,396 B2 | 8/2014 | Ishida et al. |
| 8,816,610 B2 | 8/2014 | King |
| 8,824,125 B1 | 9/2014 | Cox et al. |
| 8,835,958 B2 | 9/2014 | Hsieh |
| 8,844,180 B2 | 9/2014 | Kludt et al. |
| 8,845,129 B1 | 9/2014 | Holder et al. |
| 8,848,368 B2 | 9/2014 | Ellis |
| 8,853,965 B2 | 10/2014 | Bouws et al. |
| 8,858,024 B2 | 10/2014 | Wu et al. |
| 8,858,028 B2 | 10/2014 | Kim |
| 8,864,334 B2 | 10/2014 | Swafford, Jr. et al. |
| 8,864,344 B2 | 10/2014 | Jiang et al. |
| 8,866,168 B2 | 10/2014 | Bailey et al. |
| 8,866,343 B2 | 10/2014 | Abraham et al. |
| 8,870,395 B2 | 10/2014 | Wu |
| 8,870,410 B2 | 10/2014 | Auyeung |
| 8,870,413 B2 | 10/2014 | Auyeung |
| 8,876,325 B2 | 11/2014 | Lu et al. |
| 8,899,784 B2 | 12/2014 | Meyer et al. |
| 8,899,792 B2 | 12/2014 | Duong et al. |
| 8,901,858 B2 | 12/2014 | King |
| 8,902,127 B2 | 12/2014 | Li et al. |
| 8,911,160 B2 | 12/2014 | Seo et al. |
| 8,922,458 B2 | 12/2014 | Sefton et al. |
| 8,922,570 B2 | 12/2014 | Archer |
| 8,922,734 B2 | 12/2014 | Lin |
| 8,929,083 B2 | 1/2015 | Cox et al. |
| 8,931,928 B2 | 1/2015 | Heintz |
| 8,931,934 B2 | 1/2015 | Lin |
| 8,932,123 B2 | 1/2015 | Murayama et al. |
| 8,933,642 B2 | 1/2015 | Ghanem |
| 8,950,921 B2 | 2/2015 | Sheng |
| 8,956,018 B2 | 2/2015 | Deshpande et al. |
| 8,992,037 B2 | 3/2015 | Rycyna, III |
| 8,998,458 B2 | 4/2015 | Tankala et al. |
| 9,014,829 B2 | 4/2015 | Chemel et al. |
| 9,018,846 B2 | 4/2015 | Chew |
| 9,024,471 B2 | 5/2015 | Logvinov |
| 9,028,097 B2 | 5/2015 | Wilcox |
| 9,046,293 B2 | 6/2015 | Pelka et al. |
| 9,047,791 B2 | 6/2015 | Cox et al. |
| 9,049,116 B2 | 6/2015 | King |

(56) References Cited

U.S. PATENT DOCUMENTS

| | | |
|---|---|---|
| 9,049,756 B2 | 6/2015 | Klusmann et al. |
| 9,052,085 B2 | 6/2015 | Chan |
| 9,103,507 B2 | 8/2015 | Allen et al. |
| 9,108,261 B1 | 8/2015 | Patrick |
| 9,113,514 B2 | 8/2015 | Wang et al. |
| 9,121,582 B2 | 9/2015 | Kinnune et al. |
| 9,182,101 B2 | 11/2015 | Nakamura et al. |
| 9,188,289 B2 | 11/2015 | Peil et al. |
| 9,217,854 B2 | 12/2015 | Wilcox |
| 9,228,732 B2 | 1/2016 | Li |
| 9,234,652 B2 | 1/2016 | Wu |
| 9,243,790 B2 | 1/2016 | Speer et al. |
| 9,285,531 B2 | 3/2016 | Sherman et al. |
| 9,285,533 B2 | 3/2016 | Moriwaki et al. |
| 9,330,583 B2 | 5/2016 | Cox et al. |
| 9,349,306 B2 | 5/2016 | Hall |
| 9,360,192 B2 | 6/2016 | Ming et al. |
| 9,388,949 B2 | 7/2016 | Holder et al. |
| 9,434,151 B2 | 9/2016 | Tanaka |
| 9,464,790 B2 | 10/2016 | Badley et al. |
| 9,494,302 B2 | 11/2016 | Shen et al. |
| 9,523,491 B2 | 12/2016 | Bailey et al. |
| 9,538,588 B2 | 1/2017 | Mutschelknaus et al. |
| 9,541,258 B2 | 1/2017 | Castillo |
| 9,546,781 B2 | 1/2017 | Myers |
| 9,562,655 B2 | 2/2017 | Villard |
| 9,587,814 B2 | 3/2017 | Carney et al. |
| 9,612,004 B2 | 4/2017 | Hemiller et al. |
| 9,615,474 B2 | 4/2017 | He et al. |
| 9,651,218 B2 | 5/2017 | Gattari |
| 9,699,854 B2 | 7/2017 | Wassel |
| 9,739,462 B2 | 8/2017 | Georgitsis et al. |
| 9,752,749 B2 | 9/2017 | Adams |
| 9,761,157 B2 | 9/2017 | Cox et al. |
| 9,791,116 B2 | 10/2017 | Mrakovich et al. |
| 9,822,952 B2 | 11/2017 | Farmer et al. |
| 9,852,666 B2 | 12/2017 | Ward et al. |
| 9,857,051 B2 | 1/2018 | Ikeda et al. |
| 9,863,586 B2 | 1/2018 | Yang et al. |
| 9,863,625 B2 | 1/2018 | Cummings |
| 9,879,849 B2 | 1/2018 | Kinnune et al. |
| 9,897,269 B2 | 2/2018 | Thomas et al. |
| 9,915,416 B2 | 3/2018 | Chemel et al. |
| 9,916,782 B2 | 3/2018 | Hall |
| 9,964,261 B2 | 5/2018 | Ying et al. |
| 10,012,375 B1 | 7/2018 | Salessi |
| 10,018,343 B2 | 7/2018 | Wasserman et al. |
| 10,024,510 B2 | 7/2018 | Hammond et al. |
| 10,410,551 B2 | 9/2019 | Auyeung et al. |
| 2001/0037591 A1 | 11/2001 | Nicholson et al. |
| 2002/0003592 A1 | 1/2002 | Hett et al. |
| 2002/0050958 A1 | 5/2002 | Matthies et al. |
| 2002/0122134 A1 | 9/2002 | Kalua |
| 2002/0175881 A1 | 11/2002 | Luoma et al. |
| 2003/0056413 A1 | 3/2003 | Wiemer et al. |
| 2003/0057888 A1 | 3/2003 | Archenhold et al. |
| 2003/0058191 A1 | 3/2003 | Yuhara et al. |
| 2003/0058666 A1 | 3/2003 | Myono |
| 2003/0099105 A1 | 5/2003 | Watson |
| 2003/0120236 A1 | 6/2003 | Graef et al. |
| 2003/0123254 A1 | 7/2003 | Brass et al. |
| 2003/0151917 A1 | 8/2003 | Daughtry et al. |
| 2003/0167666 A1 | 9/2003 | Close |
| 2003/0189829 A1 | 10/2003 | Shimizu et al. |
| 2003/0209977 A1 | 11/2003 | Palanisamy |
| 2003/0217495 A1 | 11/2003 | Nagamine et al. |
| 2003/0234343 A1 | 12/2003 | Cok et al. |
| 2004/0004827 A1 | 1/2004 | Guest |
| 2004/0040248 A1 | 3/2004 | Vilnes |
| 2004/0085030 A1 | 5/2004 | Laflamme et al. |
| 2004/0104871 A1 | 6/2004 | Boldt et al. |
| 2004/0123501 A1 | 7/2004 | Safavi et al. |
| 2004/0135482 A1 | 7/2004 | Thielemans et al. |
| 2004/0207315 A1 | 10/2004 | Robbie et al. |
| 2004/0240230 A1 | 12/2004 | Kitajima et al. |
| 2004/0255496 A1 | 12/2004 | Youn |
| 2004/0262053 A1 | 12/2004 | Ludewig et al. |
| 2005/0018428 A1 | 1/2005 | Harvey |
| 2005/0047170 A1 | 3/2005 | Hilburger et al. |
| 2005/0052373 A1 | 3/2005 | Devos et al. |
| 2005/0078104 A1 | 4/2005 | Matthies et al. |
| 2005/0081414 A1 | 4/2005 | Lutz et al. |
| 2005/0116667 A1 | 6/2005 | Mueller et al. |
| 2005/0128752 A1 | 6/2005 | Ewington et al. |
| 2005/0134526 A1 | 6/2005 | Willem et al. |
| 2005/0151141 A1 | 7/2005 | Grotsch et al. |
| 2005/0151708 A1 | 7/2005 | Farmer et al. |
| 2005/0162342 A1 | 7/2005 | Luoma et al. |
| 2005/0178034 A1 | 8/2005 | Schubert et al. |
| 2005/0189557 A1 | 9/2005 | Mazzochette et al. |
| 2005/0212717 A1 | 9/2005 | Baumstark |
| 2005/0225222 A1 | 10/2005 | Mazzochette et al. |
| 2005/0231949 A1 | 10/2005 | Kim et al. |
| 2005/0259036 A1 | 11/2005 | Callegari et al. |
| 2005/0259418 A1 | 11/2005 | Callegari et al. |
| 2006/0017658 A1 | 1/2006 | Biondo et al. |
| 2006/0028594 A1 | 2/2006 | Chou |
| 2006/0055641 A1 | 3/2006 | Robertus et al. |
| 2006/0056169 A1 | 3/2006 | Lodhie et al. |
| 2006/0066562 A1 | 3/2006 | Beland et al. |
| 2006/0075666 A1 | 4/2006 | Thielemans et al. |
| 2006/0076568 A1 | 4/2006 | Keller et al. |
| 2006/0077192 A1 | 4/2006 | Thielemans et al. |
| 2006/0077193 A1 | 4/2006 | Thielemans et al. |
| 2006/0077307 A1 | 4/2006 | Thielemans et al. |
| 2006/0077669 A1 | 4/2006 | Thielemans et al. |
| 2006/0081863 A1 | 4/2006 | Kim et al. |
| 2006/0087843 A1 | 4/2006 | Setomoto et al. |
| 2006/0104058 A1 | 5/2006 | Chemel et al. |
| 2006/0126319 A1 | 6/2006 | Pohlert et al. |
| 2006/0139917 A1 | 6/2006 | Ward |
| 2006/0146531 A1 | 7/2006 | Reo et al. |
| 2006/0163596 A1 | 7/2006 | Kim et al. |
| 2006/0171148 A1 | 8/2006 | Huang |
| 2006/0218828 A1 | 10/2006 | Schrimpf et al. |
| 2006/0227003 A1 | 10/2006 | Ven |
| 2006/0243948 A1 | 11/2006 | Ishiwa et al. |
| 2006/0244681 A1 | 11/2006 | Nakajima |
| 2006/0245083 A1 | 11/2006 | Chou et al. |
| 2006/0254103 A1 | 11/2006 | Strick et al. |
| 2006/0262533 A1 | 11/2006 | Lin et al. |
| 2006/0279493 A1 | 12/2006 | Syrstad |
| 2006/0284195 A1 | 12/2006 | Nagai |
| 2007/0000849 A1 | 1/2007 | Lutz et al. |
| 2007/0008259 A1 | 1/2007 | Barker |
| 2007/0061050 A1 | 3/2007 | Hoffknecht |
| 2007/0068055 A1 | 3/2007 | Segan et al. |
| 2007/0069663 A1 | 3/2007 | Burdalski et al. |
| 2007/0085701 A1 | 4/2007 | Walters et al. |
| 2007/0103386 A1 | 5/2007 | Hara et al. |
| 2007/0201225 A1 | 8/2007 | Holder et al. |
| 2007/0222581 A1 | 9/2007 | Hawkins et al. |
| 2007/0229250 A1 | 10/2007 | Recker et al. |
| 2007/0247842 A1 | 10/2007 | Zampini et al. |
| 2007/0253198 A1 | 11/2007 | Pelegrin |
| 2007/0257270 A1 | 11/2007 | Lu et al. |
| 2007/0263394 A1 | 11/2007 | Thielemans et al. |
| 2007/0273296 A9 | 11/2007 | Janning |
| 2007/0279314 A1 | 12/2007 | Brown |
| 2007/0279904 A1 | 12/2007 | Tasch et al. |
| 2008/0002399 A1 | 1/2008 | Villard et al. |
| 2008/0060234 A1 | 3/2008 | Chou et al. |
| 2008/0073663 A1 | 3/2008 | Chang |
| 2008/0074872 A1 | 3/2008 | Panotopoulos |
| 2008/0078733 A1 | 4/2008 | Nearman et al. |
| 2008/0080179 A1 | 4/2008 | Giorgi |
| 2008/0080196 A1 | 4/2008 | Ruud et al. |
| 2008/0084360 A1 | 4/2008 | Shingai |
| 2008/0084693 A1 | 4/2008 | Shimada et al. |
| 2008/0084694 A1 | 4/2008 | Rose et al. |
| 2008/0084701 A1 | 4/2008 | Van De Ven et al. |
| 2008/0101063 A1 | 5/2008 | Koike et al. |
| 2008/0116815 A1 | 5/2008 | Foust et al. |
| 2008/0130282 A1 | 6/2008 | Negley |

(56) References Cited

U.S. PATENT DOCUMENTS

| | | |
|---|---|---|
| 2008/0141571 A1 | 6/2008 | Kottwitz |
| 2008/0141572 A1 | 6/2008 | Tomich et al. |
| 2008/0165535 A1 | 7/2008 | Mazzochette |
| 2008/0174515 A1 | 7/2008 | Matthies et al. |
| 2008/0180014 A1 | 7/2008 | Tzeng et al. |
| 2008/0186703 A1 | 8/2008 | Lou et al. |
| 2008/0212319 A1 | 9/2008 | Klipstein |
| 2008/0229636 A1 | 9/2008 | Mancuso |
| 2008/0244944 A1 | 10/2008 | Nall et al. |
| 2008/0247173 A1 | 10/2008 | Danek et al. |
| 2008/0263924 A1 | 10/2008 | Nearman et al. |
| 2008/0265799 A1 | 10/2008 | Sibert |
| 2008/0266206 A1 | 10/2008 | Nelson et al. |
| 2008/0271352 A1 | 11/2008 | Nakayama et al. |
| 2008/0273327 A1 | 11/2008 | Wilcox et al. |
| 2008/0296607 A1 | 12/2008 | Nall et al. |
| 2009/0009103 A1 | 1/2009 | Mckechnie et al. |
| 2009/0009998 A1 | 1/2009 | Malstrom et al. |
| 2009/0015997 A1 | 1/2009 | Barajas et al. |
| 2009/0016806 A1 | 1/2009 | Wolf et al. |
| 2009/0024929 A1 | 1/2009 | Gloege et al. |
| 2009/0058193 A1 | 3/2009 | Reid et al. |
| 2009/0058760 A1 | 3/2009 | Aoki |
| 2009/0073080 A1 | 3/2009 | Meersman et al. |
| 2009/0079349 A1 | 3/2009 | Sibalich et al. |
| 2009/0097265 A1 | 4/2009 | Sun et al. |
| 2009/0128461 A1 | 5/2009 | Geldard et al. |
| 2009/0146918 A1 | 6/2009 | Kline et al. |
| 2009/0154158 A1 | 6/2009 | Cheng et al. |
| 2009/0180281 A1 | 7/2009 | Ahland, III et al. |
| 2009/0190353 A1 | 7/2009 | Barker |
| 2009/0212198 A1 | 8/2009 | Anglikowski et al. |
| 2009/0212718 A1 | 8/2009 | Kawashima et al. |
| 2009/0222223 A1 | 9/2009 | Walters et al. |
| 2009/0225506 A1 | 9/2009 | Lee et al. |
| 2009/0237934 A1 | 9/2009 | Zeng et al. |
| 2009/0241388 A1 | 10/2009 | Dunn |
| 2009/0256459 A1 | 10/2009 | Liu |
| 2009/0256483 A1 | 10/2009 | Gehman et al. |
| 2009/0261706 A1 | 10/2009 | Sorella et al. |
| 2009/0262531 A1 | 10/2009 | Saha et al. |
| 2009/0262532 A1 | 10/2009 | Wilcox et al. |
| 2009/0267474 A1 | 10/2009 | Zhou et al. |
| 2009/0267540 A1 | 10/2009 | Chemel et al. |
| 2009/0273933 A1 | 11/2009 | Woodward et al. |
| 2009/0278479 A1 | 11/2009 | Platner et al. |
| 2009/0284747 A1 | 11/2009 | Valois |
| 2009/0284978 A1 | 11/2009 | Elliott et al. |
| 2009/0290338 A1 | 11/2009 | Heller et al. |
| 2009/0296407 A1 | 12/2009 | Bailey |
| 2009/0299527 A1 | 12/2009 | Huizenga et al. |
| 2009/0303711 A1 | 12/2009 | Remus et al. |
| 2009/0309494 A1 | 12/2009 | Patterson et al. |
| 2009/0309819 A1 | 12/2009 | Elliott et al. |
| 2009/0310065 A1 | 12/2009 | Dunn |
| 2009/0310337 A1 | 12/2009 | Patterson et al. |
| 2009/0310356 A1 | 12/2009 | Laporte |
| 2010/0007588 A1 | 1/2010 | Zygmunt et al. |
| 2010/0008094 A1 | 1/2010 | Shuai et al. |
| 2010/0012354 A1 | 1/2010 | Hedin et al. |
| 2010/0014289 A1 | 1/2010 | Thomas et al. |
| 2010/0014290 A1 | 1/2010 | Wilcox |
| 2010/0019535 A1 | 1/2010 | Chang et al. |
| 2010/0002727 A1 | 2/2010 | Wilcox et al. |
| 2010/0026195 A1 | 2/2010 | Potter |
| 2010/0027271 A1 | 2/2010 | Wilcox et al. |
| 2010/0033326 A1 | 2/2010 | Atkins et al. |
| 2010/0039810 A1 | 2/2010 | Holder et al. |
| 2010/0046225 A1 | 2/2010 | Zheng |
| 2010/0052574 A1 | 3/2010 | Blakeley et al. |
| 2010/0052576 A1 | 3/2010 | Steiner et al. |
| 2010/0073914 A1 | 3/2010 | Park et al. |
| 2010/0085774 A1 | 4/2010 | Park |
| 2010/0090934 A1 | 4/2010 | Elliott et al. |
| 2010/0102760 A1 | 4/2010 | Reid et al. |
| 2010/0109571 A1 | 5/2010 | Nishino et al. |
| 2010/0118531 A1 | 5/2010 | Montagne |
| 2010/0128488 A1 | 5/2010 | Marcoux |
| 2010/0135022 A1 | 6/2010 | Deguara |
| 2010/0148673 A1 | 6/2010 | Stewart et al. |
| 2010/0149801 A1 | 6/2010 | Lo et al. |
| 2010/0165640 A1 | 7/2010 | Lin et al. |
| 2010/0165660 A1 | 7/2010 | Weber et al. |
| 2010/0171429 A1 | 7/2010 | Garcia et al. |
| 2010/0171442 A1 | 7/2010 | Draper et al. |
| 2010/0172135 A1 | 7/2010 | Holder et al. |
| 2010/0185339 A1 | 7/2010 | Huizenga et al. |
| 2010/0191388 A1 | 7/2010 | Huizenga |
| 2010/0195330 A1 | 8/2010 | Schaefer et al. |
| 2010/0207759 A1 | 8/2010 | Sloan et al. |
| 2010/0232155 A1 | 9/2010 | Wang |
| 2010/0245109 A1 | 9/2010 | Ashoff et al. |
| 2010/0251583 A1 | 10/2010 | Brown et al. |
| 2010/0254134 A1 | 10/2010 | Mccanless |
| 2010/0270582 A1 | 10/2010 | Nolan et al. |
| 2010/0270982 A1 | 10/2010 | Hausman et al. |
| 2010/0289643 A1 | 11/2010 | Trundle et al. |
| 2010/0295454 A1 | 11/2010 | Reed |
| 2010/0296267 A1 | 11/2010 | Yu et al. |
| 2010/0296283 A1 | 11/2010 | Taskar et al. |
| 2010/0302785 A1 | 12/2010 | Zhou |
| 2010/0302786 A1 | 12/2010 | Wilcox et al. |
| 2010/0321917 A1 | 12/2010 | Kim et al. |
| 2010/0327764 A1 | 12/2010 | Knapp |
| 2011/0002120 A1 | 1/2011 | Song et al. |
| 2011/0002129 A1 | 1/2011 | Zheng et al. |
| 2011/0019414 A1 | 1/2011 | Jiang et al. |
| 2011/0031513 A1 | 2/2011 | Hsieh et al. |
| 2011/0031887 A1 | 2/2011 | Stoll et al. |
| 2011/0038151 A1 | 2/2011 | Carraher et al. |
| 2011/0051409 A1 | 3/2011 | Nearman |
| 2011/0057215 A1 | 3/2011 | Chen et al. |
| 2011/0063857 A1 | 3/2011 | Li et al. |
| 2011/0068708 A1 | 3/2011 | Coplin et al. |
| 2011/0069050 A1 | 3/2011 | Sirmon et al. |
| 2011/0072697 A1 | 3/2011 | Miller |
| 2011/0074833 A1 | 3/2011 | Murayama et al. |
| 2011/0075409 A1 | 3/2011 | Zheng |
| 2011/0085321 A1 | 4/2011 | Eli |
| 2011/0089824 A1 | 4/2011 | Zheng |
| 2011/0090138 A1 | 4/2011 | Zheng |
| 2011/0112702 A1 | 5/2011 | Huizenga et al. |
| 2011/0116232 A1 | 5/2011 | Brown et al. |
| 2011/0133659 A1 | 6/2011 | Li et al. |
| 2011/0138663 A1 | 6/2011 | Chen |
| 2011/0149548 A1 | 6/2011 | Yang et al. |
| 2011/0170283 A1 | 7/2011 | Chan |
| 2011/0181493 A1 | 7/2011 | Williams et al. |
| 2011/0181495 A1 | 7/2011 | Chu et al. |
| 2011/0188233 A1 | 8/2011 | Josefowicz et al. |
| 2011/0188235 A1 | 8/2011 | Bollmann |
| 2011/0188981 A1 | 8/2011 | Bonn et al. |
| 2011/0205734 A1 | 8/2011 | Yamakita et al. |
| 2011/0205744 A1 | 8/2011 | Kim |
| 2011/0216482 A1 | 9/2011 | Moscovitch et al. |
| 2011/0219650 A1 | 9/2011 | Wright et al. |
| 2011/0228528 A1 | 9/2011 | Yang et al. |
| 2011/0235332 A1 | 9/2011 | Cheung |
| 2011/0242807 A1 | 10/2011 | Little, Jr. et al. |
| 2011/0242816 A1 | 10/2011 | Chowdhury et al. |
| 2011/0267699 A1 | 11/2011 | Wu |
| 2011/0278633 A1 | 11/2011 | Clifford |
| 2011/0280003 A1 | 11/2011 | Hsu et al. |
| 2011/0307112 A1 | 12/2011 | Barrilleaux |
| 2012/0014115 A1 | 1/2012 | Park et al. |
| 2012/0019490 A1 | 1/2012 | Huang |
| 2012/0033419 A1 | 2/2012 | Kim et al. |
| 2012/0038619 A1 | 2/2012 | Shraga et al. |
| 2012/0043560 A1 | 2/2012 | Wu et al. |
| 2012/0047783 A1 | 3/2012 | Mancuso |
| 2012/0080699 A1 | 4/2012 | Chowdhury et al. |
| 2012/0087125 A1 | 4/2012 | Liu |
| 2012/0105424 A1 | 5/2012 | Lee et al. |
| 2012/0136485 A1 | 5/2012 | Weber et al. |

(56) References Cited

U.S. PATENT DOCUMENTS

| | | | |
|---|---|---|---|
| 2012/0159819 A1 | 6/2012 | Patterson et al. |
| 2012/0163005 A1 | 6/2012 | Liu |
| 2012/0192486 A1 | 8/2012 | Shanahan et al. |
| 2012/0201022 A1 | 8/2012 | van de Ven et al. |
| 2012/0206277 A1 | 8/2012 | Cai |
| 2012/0229052 A1 | 9/2012 | Yang et al. |
| 2012/0236509 A1 | 9/2012 | Cope et al. |
| 2012/0250321 A1 | 10/2012 | Blincoe et al. |
| 2012/0260483 A1 | 10/2012 | Patterson et al. |
| 2012/0268019 A1 | 10/2012 | Briggs |
| 2012/0287634 A1 | 11/2012 | Kochetkov |
| 2012/0307495 A1 | 12/2012 | Shih |
| 2012/0314415 A1 | 12/2012 | Lee |
| 2013/0003370 A1 | 1/2013 | Watanabe |
| 2013/0010468 A1 | 1/2013 | Stoll et al. |
| 2013/0049991 A1 | 2/2013 | Mothaffar |
| 2013/0049992 A1 | 2/2013 | Mothaffar |
| 2013/0057861 A1 | 3/2013 | Ishii et al. |
| 2013/0063970 A1 | 3/2013 | Oh |
| 2013/0086797 A1 | 4/2013 | Davis et al. |
| 2013/0120991 A1 | 5/2013 | Wohlgemuth et al. |
| 2013/0135861 A1 | 5/2013 | Chen et al. |
| 2013/0162120 A1 | 6/2013 | Campagna et al. |
| 2013/0163005 A1 | 6/2013 | Tsang |
| 2013/0187521 A1 | 7/2013 | Campagna et al. |
| 2013/0193850 A1 | 8/2013 | Demuynck et al. |
| 2013/0229797 A1 | 9/2013 | Nearman |
| 2013/0258676 A1 | 10/2013 | Hyun et al. |
| 2013/0265765 A1 | 10/2013 | Liang et al. |
| 2013/0270585 A1 | 10/2013 | Mei et al. |
| 2013/0271973 A1 | 10/2013 | Rycyna, III |
| 2013/0285556 A1 | 10/2013 | Challapali et al. |
| 2013/0291414 A1 | 11/2013 | Cegnar |
| 2013/0335979 A1 | 12/2013 | Lauret et al. |
| 2014/0003050 A1 | 1/2014 | Hemiller et al. |
| 2014/0003052 A1 | 1/2014 | Hemiller et al. |
| 2014/0016326 A1 | 1/2014 | Dieker et al. |
| 2014/0029253 A1 | 1/2014 | Auyeung |
| 2014/0029259 A1 | 1/2014 | Auyeung |
| 2014/0029274 A1 | 1/2014 | Auyeung |
| 2014/0085885 A1 | 3/2014 | Hatano |
| 2014/0085905 A1 | 3/2014 | Broughton |
| 2014/0104851 A1 | 4/2014 | Auyeung |
| 2014/0109387 A1 | 4/2014 | Dunn |
| 2014/0112007 A1 | 4/2014 | Auyeung |
| 2014/0137384 A1 | 5/2014 | Patterson et al. |
| 2014/0152635 A1 | 6/2014 | Morrisseau |
| 2014/0153241 A1 | 6/2014 | Templeton |
| 2014/0160363 A1 | 6/2014 | Mutschelknaus et al. |
| 2014/0168963 A1 | 6/2014 | Stone et al. |
| 2014/0168998 A1 | 6/2014 | Tang et al. |
| 2014/0259645 A1 | 9/2014 | Cox et al. |
| 2014/0267896 A1 | 9/2014 | Cox et al. |
| 2014/0268761 A1 | 9/2014 | Raleigh et al. |
| 2014/0293619 A1 | 10/2014 | Feng et al. |
| 2014/0298696 A1 | 10/2014 | Hunter |
| 2014/0301088 A1 | 10/2014 | Lu et al. |
| 2014/0312802 A1 | 10/2014 | Recker et al. |
| 2014/0313116 A1 | 10/2014 | Jang et al. |
| 2014/0373348 A1 | 12/2014 | Li |
| 2015/0169277 A1 | 6/2015 | Kim et al. |
| 2017/0321869 A1 | 11/2017 | Bryant |

FOREIGN PATENT DOCUMENTS

| | | |
|---|---|---|
| CA | 2615706 A1 | 9/2006 |
| CA | 2736395 A1 | 3/2010 |
| CA | 2748984 C | 1/2017 |
| CN | 2520549 Y | 11/2002 |
| CN | 2544372 Y | 4/2003 |
| CN | 2549557 Y | 5/2003 |
| CN | 2646812 Y | 10/2004 |
| CN | 1556516 A | 12/2004 |
| CN | 2674579 Y | 1/2005 |
| CN | 2706836 Y | 6/2005 |
| CN | 2727885 Y | 9/2005 |
| CN | 2733499 Y | 10/2005 |
| CN | 2869894 Y | 2/2007 |
| CN | 2874691 Y | 2/2007 |
| CN | 2899008 Y | 5/2007 |
| CN | 2903658 Y | 5/2007 |
| CN | 2906921 Y | 5/2007 |
| CN | 2924702 Y | 7/2007 |
| CN | 200949799 Y | 9/2007 |
| CN | 101046278 A | 10/2007 |
| CN | 200956227 Y | 10/2007 |
| CN | 200965180 Y | 10/2007 |
| CN | 201057379 Y | 5/2008 |
| CN | 101250936 A | 8/2008 |
| CN | 201122399 Y | 9/2008 |
| CN | 101294700 A | 10/2008 |
| CN | 101334953 A | 12/2008 |
| CN | 201226214 Y | 4/2009 |
| CN | 201233695 Y | 5/2009 |
| CN | 101546503 A | 9/2009 |
| CN | 201307381 Y | 9/2009 |
| CN | 201345201 Y | 11/2009 |
| CN | 201383294 Y | 1/2010 |
| CN | 101650899 A | 2/2010 |
| CN | 201425825 Y | 3/2010 |
| CN | 201449702 U | 5/2010 |
| CN | 201465466 U | 5/2010 |
| CN | 201539725 U | 8/2010 |
| CN | 201540699 U | 8/2010 |
| CN | 101825259 A | 9/2010 |
| CN | 201570206 U | 9/2010 |
| CN | 201577260 U | 9/2010 |
| CN | 201622789 U | 11/2010 |
| CN | 201638492 U | 11/2010 |
| CN | 201651984 U | 11/2010 |
| CN | 201655193 U | 11/2010 |
| CN | 201666471 U | 12/2010 |
| CN | 201681560 U | 12/2010 |
| CN | 201689615 U | 12/2010 |
| CN | 201748199 U | 2/2011 |
| CN | 201748247 U | 2/2011 |
| CN | 201751932 U | 2/2011 |
| CN | 201765769 U | 3/2011 |
| CN | 201765771 U | 3/2011 |
| CN | 201796561 U | 4/2011 |
| CN | 201812454 U | 4/2011 |
| CN | 201812456 U | 4/2011 |
| CN | 201838275 U | 5/2011 |
| CN | 201845522 U | 5/2011 |
| CN | 102097858 A | 6/2011 |
| CN | 201868043 U | 6/2011 |
| CN | 201868044 U | 6/2011 |
| CN | 102136229 A | 7/2011 |
| CN | 201904981 U | 7/2011 |
| CN | 201910212 U | 7/2011 |
| CN | 201918125 U | 8/2011 |
| CN | 201925281 U | 8/2011 |
| CN | 201925854 U | 8/2011 |
| CN | 201946238 U | 8/2011 |
| CN | 201956020 U | 8/2011 |
| CN | 201965586 U | 9/2011 |
| CN | 201973531 U | 9/2011 |
| CN | 201973564 U | 9/2011 |
| CN | 201973623 U | 9/2011 |
| CN | 201976382 U | 9/2011 |
| CN | 202012808 U | 10/2011 |
| CN | 202025488 U | 11/2011 |
| CN | 202042136 U | 11/2011 |
| CN | 202049690 U | 11/2011 |
| CN | 202058388 U | 11/2011 |
| CN | 202067478 U | 12/2011 |
| CN | 102314812 A | 1/2012 |
| CN | 102314814 A | 1/2012 |
| CN | 202102651 U | 1/2012 |
| CN | 202134169 U | 2/2012 |
| CN | 102368367 A | 3/2012 |
| CN | 301868688 S | 3/2012 |
| CN | 102447405 A | 5/2012 |
| CN | 202230681 U | 5/2012 |

(56) References Cited

FOREIGN PATENT DOCUMENTS

| | | |
|---|---|---|
| CN | 202230682 U | 5/2012 |
| CN | 102509520 A | 6/2012 |
| CN | 202266799 U | 6/2012 |
| CN | 102542923 A | 7/2012 |
| CN | 202307009 U | 7/2012 |
| CN | 202332117 U | 7/2012 |
| CN | 102637389 A | 8/2012 |
| CN | 102647879 A | 8/2012 |
| CN | 102682671 A | 9/2012 |
| CN | 202422683 U | 9/2012 |
| CN | 202423377 U | 9/2012 |
| CN | 102737554 A | 10/2012 |
| CN | 202502685 U | 10/2012 |
| CN | 202523329 U | 11/2012 |
| CN | 202523337 U | 11/2012 |
| CN | 202523345 U | 11/2012 |
| CN | 202523349 U | 11/2012 |
| CN | 202523351 U | 11/2012 |
| CN | 202523377 U | 11/2012 |
| CN | 202549195 U | 11/2012 |
| CN | 202563838 U | 11/2012 |
| CN | 202581065 U | 12/2012 |
| CN | 202584617 U | 12/2012 |
| CN | 202584622 U | 12/2012 |
| CN | 202584625 U | 12/2012 |
| CN | 202615728 U | 12/2012 |
| CN | 202629916 U | 12/2012 |
| CN | 202632682 U | 12/2012 |
| CN | 102889549 A | 1/2013 |
| CN | 202646254 U | 1/2013 |
| CN | 202650452 U | 1/2013 |
| CN | 202650463 U | 1/2013 |
| CN | 202677752 U | 1/2013 |
| CN | 202679828 U | 1/2013 |
| CN | 202758554 U | 2/2013 |
| CN | 202758555 U | 2/2013 |
| CN | 202758567 U | 2/2013 |
| CN | 103000088 A | 3/2013 |
| CN | 202795924 U | 3/2013 |
| CN | 202816279 U | 3/2013 |
| CN | 202838846 U | 3/2013 |
| CN | 202841795 U | 3/2013 |
| CN | 103035175 A | 4/2013 |
| CN | 103065559 A | 4/2013 |
| CN | 202855217 U | 4/2013 |
| CN | 202887627 U | 4/2013 |
| CN | 202905030 U | 4/2013 |
| CN | 202905033 U | 4/2013 |
| CN | 202905040 U | 4/2013 |
| CN | 202905058 U | 4/2013 |
| CN | 103124483 A | 5/2013 |
| CN | 103167764 A | 6/2013 |
| CN | 103177665 A | 6/2013 |
| CN | 202976707 U | 6/2013 |
| CN | 203027635 U | 6/2013 |
| CN | 103196051 A | 7/2013 |
| CN | 203038588 U | 7/2013 |
| CN | 203038597 U | 7/2013 |
| CN | 203038598 U | 7/2013 |
| CN | 203038599 U | 7/2013 |
| CN | 203055361 U | 7/2013 |
| CN | 203055365 U | 7/2013 |
| CN | 203086866 U | 7/2013 |
| CN | 203102774 U | 7/2013 |
| CN | 203102775 U | 7/2013 |
| CN | 103268738 A | 8/2013 |
| CN | 203136407 U | 8/2013 |
| CN | 203165372 U | 8/2013 |
| CN | 302536105 S | 8/2013 |
| CN | 203202526 U | 9/2013 |
| CN | 103335254 A | 10/2013 |
| CN | 103354067 A | 10/2013 |
| CN | 103377592 A | 10/2013 |
| CN | 203232680 U | 10/2013 |
| CN | 203250487 U | 10/2013 |
| CN | 103413497 A | 11/2013 |
| CN | 203415183 U | 1/2014 |
| CN | 203490915 U | 3/2014 |
| CN | 103730068 A | 4/2014 |
| CN | 203535911 U | 4/2014 |
| CN | 203573584 U | 4/2014 |
| CN | 203573586 U | 4/2014 |
| CN | 203573592 U | 4/2014 |
| CN | 203607042 U | 5/2014 |
| CN | 203631082 U | 6/2014 |
| CN | 203644330 U | 6/2014 |
| CN | 302882712 S | 7/2014 |
| CN | 203787033 U | 8/2014 |
| CN | 302917815 S | 8/2014 |
| CN | 103177664 B | 2/2015 |
| CN | 204288709 U | 4/2015 |
| CN | 204423826 U | 6/2015 |
| CN | 103337224 B | 9/2015 |
| CN | 204634223 U | 9/2015 |
| CN | 204665178 U | 9/2015 |
| CN | 105447283 A | 3/2016 |
| CN | 105632354 A | 6/2016 |
| CN | 205406020 U | 7/2016 |
| CN | 205406022 U | 7/2016 |
| CN | 205408340 U | 7/2016 |
| CN | 205447200 U | 8/2016 |
| CN | 205487176 U | 8/2016 |
| CN | 205487177 U | 8/2016 |
| CN | 303805061 S | 8/2016 |
| CN | 205555209 U | 9/2016 |
| DE | 19623188 C2 | 7/2000 |
| DE | 20004795 U1 | 7/2000 |
| DE | 10140415 A1 | 2/2003 |
| DE | 102005015748 B3 | 9/2006 |
| DE | 202006015882 U1 | 1/2007 |
| DE | 202005016441 U1 | 2/2007 |
| DE | 202006013704 U1 | 2/2008 |
| DE | 102007053395 A1 | 6/2008 |
| DE | 202011003232 U1 | 5/2012 |
| DE | 102016210200 A1 | 12/2017 |
| EP | 253379 A2 | 1/1988 |
| EP | 863496 A2 | 9/1998 |
| EP | 1078301 A1 | 2/2001 |
| EP | 1280383 A1 | 1/2003 |
| EP | 894317 B1 | 2/2003 |
| EP | 1469450 A1 | 10/2004 |
| EP | 1528603 A2 | 5/2005 |
| EP | 1548571 A1 | 6/2005 |
| EP | 1548573 A1 | 6/2005 |
| EP | 1550947 A2 | 7/2005 |
| EP | 1349436 B1 | 5/2007 |
| EP | 1988576 A1 | 11/2008 |
| EP | 2039985 A2 | 3/2009 |
| EP | 2085955 A1 | 8/2009 |
| EP | 2092859 A1 | 8/2009 |
| EP | 2172696 A1 | 4/2010 |
| EP | 2337995 A1 | 6/2011 |
| EP | 2378337 A2 | 10/2011 |
| EP | 2416062 A2 | 2/2012 |
| EP | 2448021 A2 | 5/2012 |
| EP | 2553331 A1 | 2/2013 |
| EP | 2622267 A1 | 8/2013 |
| EP | 2515031 B1 | 8/2016 |
| EP | 2383602 B1 | 2/2018 |
| GB | 1585394 A | 3/1981 |
| GB | 2164189 A | 3/1986 |
| GB | 2347296 A | 8/2000 |
| GB | 2421584 A | 6/2006 |
| IN | 2774CHE2009 A | 12/2009 |
| JP | S6279279 U | 5/1987 |
| JP | S6474586 A | 3/1989 |
| JP | H0225119 U | 2/1990 |
| JP | H0248981 U | 4/1990 |
| JP | H02114291 A | 4/1990 |
| JP | H0295374 U | 7/1990 |
| JP | H02121782 U | 10/1990 |
| JP | H0333465 U | 4/1991 |
| JP | H0363190 U | 6/1991 |
| JP | H03129387 A | 6/1991 |

(56) References Cited

FOREIGN PATENT DOCUMENTS

| | | |
|---|---|---|
| JP | H049985 U | 1/1992 |
| JP | H0493983 A | 3/1992 |
| JP | H0450893 U | 4/1992 |
| JP | H04191790 A | 7/1992 |
| JP | H04233582 A | 8/1992 |
| JP | H04273284 A | 9/1992 |
| JP | H04273285 A | 9/1992 |
| JP | H04301673 A | 10/1992 |
| JP | H0527689 A | 2/1993 |
| JP | H0540447 A | 2/1993 |
| JP | H052128 U | 3/1993 |
| JP | H0561422 A | 3/1993 |
| JP | H0533181 U | 4/1993 |
| JP | H0533183 U | 4/1993 |
| JP | H0588618 A | 4/1993 |
| JP | H0594136 A | 4/1993 |
| JP | H0594140 A | 4/1993 |
| JP | H05217558 A | 8/1993 |
| JP | H05232885 A | 9/1993 |
| JP | H05252615 A | 9/1993 |
| JP | H064785 U | 1/1994 |
| JP | H06180550 A | 6/1994 |
| JP | H06186911 A | 7/1994 |
| JP | H06188460 A | 7/1994 |
| JP | H0659877 U | 8/1994 |
| JP | H06214511 A | 8/1994 |
| JP | H06314067 A | 11/1994 |
| JP | H06337644 A | 12/1994 |
| JP | H075822 A | 1/1995 |
| JP | H0736391 A | 2/1995 |
| JP | H0749658 A | 2/1995 |
| JP | H0764494 A | 3/1995 |
| JP | H07129098 A | 5/1995 |
| JP | H07219459 A | 8/1995 |
| JP | H0816114 A | 1/1996 |
| JP | H08123339 A | 5/1996 |
| JP | H08185130 A | 7/1996 |
| JP | H08272318 A | 10/1996 |
| JP | H08314394 A | 11/1996 |
| JP | H099184 A | 1/1997 |
| JP | H0997022 A | 4/1997 |
| JP | H10123981 A | 5/1998 |
| JP | H10133599 A | 5/1998 |
| JP | 3053063 U | 10/1998 |
| JP | H10293540 A | 11/1998 |
| JP | H1138905 A | 2/1999 |
| JP | H1152878 A | 2/1999 |
| JP | H11272209 A | 10/1999 |
| JP | H11296110 A | 10/1999 |
| JP | H11305685 A | 11/1999 |
| JP | H11327467 A | 11/1999 |
| JP | H11352908 A | 12/1999 |
| JP | 2000505213 A | 4/2000 |
| JP | 2000215703 A | 8/2000 |
| JP | 2000305488 A | 11/2000 |
| JP | 2000330487 A | 11/2000 |
| JP | 2001036152 A | 2/2001 |
| JP | 2001067002 A | 3/2001 |
| JP | 2001117513 A | 4/2001 |
| JP | 2001166709 A | 6/2001 |
| JP | 2001184938 A | 7/2001 |
| JP | 2001209334 A | 8/2001 |
| JP | 2001242796 A | 9/2001 |
| JP | 2001249629 A | 9/2001 |
| JP | 2001290442 A | 10/2001 |
| JP | 2001343599 A | 12/2001 |
| JP | 2001350434 A | 12/2001 |
| JP | 2002040966 A | 2/2002 |
| JP | 2002049326 A | 2/2002 |
| JP | 2002503832 A | 2/2002 |
| JP | 2002503836 A | 2/2002 |
| JP | 2002509345 A | 3/2002 |
| JP | 2002183891 A | 6/2002 |
| JP | 3312010 B2 | 8/2002 |
| JP | 2002244581 A | 8/2002 |
| JP | 2002366061 A | 12/2002 |
| JP | 2002368284 A | 12/2002 |
| JP | 2002372927 A | 12/2002 |
| JP | 2002543457 A | 12/2002 |
| JP | 2003015532 A | 1/2003 |
| JP | 2003015554 A | 1/2003 |
| JP | 2003084685 A | 3/2003 |
| JP | 2003140606 A | 5/2003 |
| JP | 2003162233 A | 6/2003 |
| JP | 2003195790 A | 7/2003 |
| JP | 2003316290 A | 11/2003 |
| JP | 2003345269 A | 12/2003 |
| JP | 2003348493 A | 12/2003 |
| JP | 2004037707 A | 2/2004 |
| JP | 2004133457 A | 4/2004 |
| JP | 2004191401 A | 7/2004 |
| JP | 2004219805 A | 8/2004 |
| JP | 2004264323 A | 9/2004 |
| JP | 2004281352 A | 10/2004 |
| JP | 2004530932 A | 10/2004 |
| JP | 2004309986 A | 11/2004 |
| JP | 2004327138 A | 11/2004 |
| JP | 2004354571 A | 12/2004 |
| JP | 2004355834 A | 12/2004 |
| JP | 2005024706 A | 1/2005 |
| JP | 2005071873 A | 3/2005 |
| JP | 2005077608 A | 3/2005 |
| JP | 2005084683 A | 3/2005 |
| JP | 2005084691 A | 3/2005 |
| JP | 2005128089 A | 5/2005 |
| JP | 2005217094 A | 8/2005 |
| JP | 2005327820 A | 11/2005 |
| JP | 2005347075 A | 12/2005 |
| JP | 2006023464 A | 1/2006 |
| JP | 2006106762 A | 4/2006 |
| JP | 2006106763 A | 4/2006 |
| JP | 2006106764 A | 4/2006 |
| JP | 2006119563 A | 5/2006 |
| JP | 2006140139 A | 6/2006 |
| JP | 2006145890 A | 6/2006 |
| JP | 2006163364 A | 6/2006 |
| JP | 2006184561 A | 7/2006 |
| JP | 2006189606 A | 7/2006 |
| JP | 2006221067 A | 8/2006 |
| JP | 2006261600 A | 9/2006 |
| JP | 3127938 U | 12/2006 |
| JP | 2007035420 A | 2/2007 |
| JP | 2007035951 A | 2/2007 |
| JP | 2007073300 A | 3/2007 |
| JP | 2007133155 A | 5/2007 |
| JP | 2007212955 A | 8/2007 |
| JP | 2007522525 A | 8/2007 |
| JP | 2007242258 A | 9/2007 |
| JP | 2007281260 A | 10/2007 |
| JP | 2007533066 A | 11/2007 |
| JP | 2008070891 A | 3/2008 |
| JP | 2008098108 A | 4/2008 |
| JP | 2008152983 A | 7/2008 |
| JP | 2008233832 A | 10/2008 |
| JP | 2008235117 A | 10/2008 |
| JP | 2008249921 A | 10/2008 |
| JP | 2008257031 A | 10/2008 |
| JP | 2008257993 A | 10/2008 |
| JP | 2009016095 A | 1/2009 |
| JP | 2009042758 A | 2/2009 |
| JP | 2009110014 A | 5/2009 |
| JP | 4291026 B2 | 7/2009 |
| JP | 4332342 B2 | 9/2009 |
| JP | 2009198631 A | 9/2009 |
| JP | 2009288810 A | 12/2009 |
| JP | 2010015163 A | 1/2010 |
| JP | 3158866 U | 4/2010 |
| JP | 4488183 B2 | 6/2010 |
| JP | 2010181721 A | 8/2010 |
| JP | 2010212819 A | 9/2010 |
| JP | 3163841 U | 11/2010 |
| JP | 2011060575 A | 3/2011 |
| JP | 2011510334 A | 3/2011 |
| JP | 2011510455 A | 3/2011 |

(56) References Cited

FOREIGN PATENT DOCUMENTS

| | | |
|---|---|---|
| JP | 2011075757 A | 4/2011 |
| JP | 2011134555 A | 7/2011 |
| JP | 4746152 B1 | 8/2011 |
| JP | 2011253205 A | 12/2011 |
| JP | 2012014103 A | 1/2012 |
| JP | 2012054115 A | 3/2012 |
| JP | 2012505517 A | 3/2012 |
| JP | 2012508402 A | 4/2012 |
| JP | 2012113276 A | 6/2012 |
| JP | 2012155175 A | 8/2012 |
| JP | 2012189830 A | 10/2012 |
| JP | 5089857 B2 | 12/2012 |
| JP | 2012255878 A | 12/2012 |
| JP | 2013045983 A | 3/2013 |
| JP | 2013058467 A | 3/2013 |
| JP | 2014026060 A | 2/2014 |
| JP | 2015179261 A | 10/2015 |
| JP | 2015187711 A | 10/2015 |
| JP | 2016512901 A | 5/2016 |
| JP | 2016519781 A | 7/2016 |
| JP | 2016520856 A | 7/2016 |
| JP | 2016524170 A | 8/2016 |
| KR | 2004046921 Y1 | 6/2004 |
| KR | 20070007266 A | 1/2007 |
| KR | 20070053744 A | 5/2007 |
| KR | 2007085011 A | 8/2007 |
| KR | 778660 B1 | 11/2007 |
| KR | 811061 B1 | 3/2008 |
| KR | 100811061 B1 | 3/2008 |
| KR | 20080034906 A | 4/2008 |
| KR | 2008040086 A | 5/2008 |
| KR | 20080040086 A | 5/2008 |
| KR | 20080101832 A | 11/2008 |
| KR | 931267 B1 | 12/2009 |
| KR | 940919 B1 | 2/2010 |
| KR | 985828 B1 | 10/2010 |
| KR | 1006184 B1 | 1/2011 |
| KR | 101033148 B1 | 5/2011 |
| KR | 101053785 B1 | 8/2011 |
| KR | 2012117126 A | 10/2012 |
| KR | 1249763 B1 | 4/2013 |
| WO | 1997048089 A1 | 12/1997 |
| WO | 1998044531 A1 | 10/1998 |
| WO | 1999041732 A2 | 8/1999 |
| WO | 1999041788 A1 | 8/1999 |
| WO | 2000013156 A1 | 3/2000 |
| WO | 2000013163 A1 | 3/2000 |
| WO | 2001057431 A1 | 8/2001 |
| WO | 2002011116 A1 | 2/2002 |
| WO | 2003055273 A3 | 12/2003 |
| WO | 2004019657 A2 | 3/2004 |
| WO | 2004042690 A1 | 5/2004 |
| WO | 2004051223 A2 | 6/2004 |
| WO | 2005001791 A1 | 1/2005 |
| WO | 2005083660 A1 | 9/2005 |
| WO | 2006017930 A1 | 2/2006 |
| WO | 2006033770 A2 | 3/2006 |
| WO | 2006126123 A1 | 11/2006 |
| WO | 2007049176 A1 | 5/2007 |
| WO | 2007061496 A2 | 5/2007 |
| WO | 2007083879 A1 | 7/2007 |
| WO | 2007107611 A1 | 9/2007 |
| WO | 2007112935 A2 | 10/2007 |
| WO | 2008015762 A1 | 2/2008 |
| WO | 2008047335 A1 | 4/2008 |
| WO | 2008117393 A1 | 10/2008 |
| WO | 2008122941 A1 | 10/2008 |
| WO | 2008157262 A2 | 12/2008 |
| WO | 2009000896 A2 | 12/2008 |
| WO | 2009060369 A2 | 5/2009 |
| WO | 2009064607 A1 | 5/2009 |
| WO | 2009126024 A1 | 10/2009 |
| WO | 2009152524 A2 | 12/2009 |
| WO | 2009152525 A2 | 12/2009 |
| WO | 2010010494 A1 | 1/2010 |
| WO | 2010033545 A2 | 3/2010 |
| WO | 2010059431 A1 | 5/2010 |
| WO | 2010079388 A1 | 7/2010 |
| WO | 2010079588 A1 | 7/2010 |
| WO | 2010086757 A1 | 8/2010 |
| WO | 2010130732 A1 | 11/2010 |
| WO | 2011000174 A1 | 1/2011 |
| WO | 2011004037 A2 | 1/2011 |
| WO | 2011041813 A1 | 4/2011 |
| WO | 2011042837 A1 | 4/2011 |
| WO | 2011062570 A1 | 5/2011 |
| WO | 2011123267 A1 | 10/2011 |
| WO | 2011134003 A1 | 11/2011 |
| WO | 2012020119 A1 | 2/2012 |
| WO | 2012021718 A1 | 2/2012 |
| WO | 2012077103 A1 | 6/2012 |
| WO | 2012086872 A1 | 6/2012 |
| WO | 2012095242 A1 | 7/2012 |
| WO | 2012121718 A1 | 9/2012 |
| WO | 2012122638 A1 | 9/2012 |
| WO | 2012139787 A1 | 10/2012 |
| WO | 2013002712 A1 | 1/2013 |
| WO | 2013143567 A1 | 10/2013 |
| WO | 2013159655 A1 | 10/2013 |
| WO | 2014005600 A2 | 1/2014 |
| WO | 2015103079 A1 | 7/2015 |

OTHER PUBLICATIONS

Defendant Samsung's Apr. 10, 2020 Preliminary Invalidity Contentions, *Ultravision v. Samsung*, Case No. 2:19-cv-252 (E.D. Tex.), Exhibit 410-06.

Defendant Samsung's Apr. 10, 2020 Preliminary Invalidity Contentions, *Ultravision v. Samsung*, Case No. 2:19-cv-252 (E.D. Tex.), Exhibit 410-07.

Defendant Samsung's Apr. 10, 2020 Preliminary Invalidity Contentions, *Ultravision v. Samsung*, Case No. 2:19-cv-252 (E.D. Tex.), Exhibit 410-10.

Defendant Samsung's Apr. 10, 2020 Preliminary Invalidity Contentions, *Ultravision v. Samsung*, Case No. 2:19-cv-252 (E.D. Tex.), Exhibit 410-11.

Defendant Samsung's Apr. 10, 2020 Preliminary Invalidity Contentions, *Ultravision v. Samsung*, Case No. 2:19-cv-252 (E.D. Tex.), Exhibit 410-12.

Defendant Samsung's Apr. 10, 2020 Preliminary Invalidity Contentions, *Ultravision v. Samsung*, Case No. 2:19-cv-252 (E.D. Tex.), Exhibit 410-13.

Defendant Samsung's Apr. 10, 2020 Preliminary Invalidity Contentions, *Ultravision v. Samsung*, Case No. 2:19-cv-252 (E.D. Tex.), Exhibit 410-14.

Defendant Samsung's Apr. 10, 2020 Preliminary Invalidity Contentions, *Ultravision v. Samsung*, Case No. 2:19-cv-252 (E.D. Tex.), Exhibit 410-15.

Defendant Samsung's Apr. 10, 2020 Preliminary Invalidity Contentions, *Ultravision v. Samsung*, Case No. 2:19-cv-252 (E.D. Tex.), Exhibit 410-16.

Defendant Samsung's Apr. 10, 2020 Preliminary Invalidity Contentions, *Ultravision v. Samsung*, Case No. 2:19-cv-252 (E.D. Tex.), Exhibit 410-17.

Defendant Samsung's Apr. 10, 2020 Preliminary Invalidity Contentions, *Ultravision v. Samsung*, Case No. 2:19-cv-252 (E.D. Tex.), Exhibit 410-18.

Defendant Samsung's Apr. 10, 2020 Preliminary Invalidity Contentions, *Ultravision v. Samsung*, Case No. 2:19-cv-252 (E.D. Tex.), Exhibit 410-19.

Defendant Samsung's Apr. 10, 2020 Preliminary Invalidity Contentions, *Ultravision v. Samsung*, Case No. 2:19-cv-252 (E.D. Tex.), Exhibit 410-01.

Defendant Samsung's Apr. 10, 2020 Preliminary Invalidity Contentions, *Ultravision v. Samsung*, Case No. 2:19-cv-252 (E.D. Tex.), Exhibit 410-03.

Defendant Samsung's Apr. 10, 2020 Preliminary Invalidity Contentions, *Ultravision v. Samsung*, Case No. 2:19-cv-252 (E.D. Tex.), Exhibit 410-04.

(56) References Cited

OTHER PUBLICATIONS

Defendant Samsung's Apr. 10, 2020 Preliminary Invalidity Contentions, *Ultravision v. Samsung*, Case No. 2:19-cv-252 (E.D. Tex.), Exhibit 410-05.
Dorland's Illustrated Medical Dictionary 30th Edition, 2003, SAUNDERS An Imprint of Elsevier, 4 pages.
Fournier, F., "Freeform Reflector Design With Extended Sources," Dissertation, 2010, University of Central Florida, Florida, USA, 232 pages.
Hugge, P.A.,"Field Results Demonstrate Reliability Gains Through Improved Cooling," Proceedings of National Aerospace and Electronics Conference, May 23-27, 1994, pp. 185-188.
Weik, M. H., Fiber Optics Standard Dictionary Third Edition, Springer-Science+Business Media, 1997, 118 pages.
Stedman's Medical dictionary 28th Edition, 2006, Lippincott Williams & Wilkins; A Wolters Kluwer Company, USA, 3 pages.
Stanley LED for street light, Stanley Electric Co. Ltd., 8 pages.
Smith, G. et al., "Simple lens types, lens systems and image formation," The eye and visual optical instruments, 1997, Cambridge University Press, Cambridge, UK, 27 pages.
O'Connor, P. D. T. et al.,"Electronic System Reliability," Practical Reliability Engineering Fourth Edition, Apr. 2003, John Wiley &. Sons Ltd, England, pp. 247-288.
Josefowicz, J., "Professionalcompetence Overview," 8 pages.
Keating, M. P.,"Lenses Revisited," Geometric; Physical; and Visual Optics, 1988, Butterworths, 15 pages.
Kinzey, B. R., "Demonstration of LED Street Lighting in Kansas City; MO," Jun. 2013, Pacific Northwest National Laboratory, Richland; Washington 99352, 64 pages.
LED Professional Review, Issue 10, Nov./Dec. 2008, 52 pages.
McGraw-Hill Dictionary of Scientific and Technical Terms; Sixth Edition, 2003, McGraw-Hill, USA, 3 pages.
Malacara, D. et al., Handbook of Optical Design Second Edition, 2004, Marcel Dekker Inc., United States of America, 522 pages.
"LED Billboard Light 40W", LeKise, Mar. 21, 2011.
"Ad-Poster I LED Billboard Fixture Description", Neptun Light, Inc., May 14, 2012, https://web.archive.org/web/20120514123442/ http://www.neptunlight.com/productdetails/64/186/adposter-i-led-billboard-fixture.html.
"General Catalog—2012," Thorlux Lighting, Dec. 2012, 164 pages.
TracePro, "LED Reflector and Lens Simulation Usingt TracePro Illumination Design and Analysis Software," White Paper, Oct. 2013, 11 pages.
Tsai, J. et al., "LED Backlight Module by a Lightguide-Diffusive Component With Tetrahedron Reflector Array," J. Display Tech., vol. 8, No. 6, Jun. 2012, pp. 321-328.
Hubbell Lighting, "Universal Lighting Technologies Invention Disclosure," Jun. 14, 2012, 15 pages.
P.R. 4-3 Joint Claim Construction and Prehearing Statement, *Ultravision Technologies v. Lamar et al.*, E.D. Texas, Case No. 2:16-cv-374, filed Jan. 27, 2017, pp. 1-20.
Wang, K. et al., "Freeform LED Lens for Rectangularly Prescribed Illumination," J. Opt. A: Pure Appl. Opt., No. 11, Aug. 2009, 105501, 10 pages.
Wang, K. et al., "New reversing design method for LED uniform illumination," Optics Express, vol. 19, Issue S4, Jul. 4, 2011, pp. A830-A840.
West, R.S. et al., "43.4: High Brightness Direct LED Backlight for LCD-TV," SID 03 Digest, May 2003, 4 pages.
Wu, D. et al., "Freeform Lens Design for Uniform Illumination with Extended Source," 2011 In▼ I Conf. Elecs. Packaging Tech. & High Density Packaging, Aug. 2011, pp. 1085-1089.
Wu, R. et al., "Optimization Design of Irradiance Array for LED Uniform Rectangular Illumination," Applied Optics, vol. 1, No. 13, May 2012, pp. 2257-2263.
Zhenrong, Z. et al., "Freeform Surface Lens for LED Uniform Illumination," Applied Optics, vol. 48, No. 35, Dec. 2009, pp. 6627-6634.
Zhu Z. et al., "Uniform Illumination Design by Configuration of LED Array and Diffuse Reflection Surface for Color Vision Application," J. Display tech, vol. 7, No. 2, Feb. 2011, pp. 84-89.
IPR2020-01312—Ex. 1023—Joint Motion to Amend DCO, Jul. 21, 2020.
IPR2020-01312—Ex. 1010—Wilcox—U.S. Pat. No. 7,618,163, Jul. 21, 2020.
IPR2020-01311—Ex. 1032—USDOE Effective White Light Options, Jul. 21, 2020.
IPR2020-01312—Ex. 1022—Wei—U.S. Pat. No. 8,960,960, Jul. 21, 2020.
IPR2020-01312—Ex. 1009—Kaiya—JP2004281352, Jul. 21, 2020.
IPR2020-01312—Ex. 1040—Hough the Plastics Copendium, Jul. 21, 2020.
IPR2020-01311—Ex. 1017—Arai—U.S. Pat. No. 8,585,254, Jul. 21, 2020.
IPR2020-01311—Ex. 1004—File Histor for U.S. Pat. No. 8,870,410, Jul. 21, 2020.
IPR2020-01312—Ex. 1043—History—DesignLights Consortium, Jul. 21, 2020.
IPR2020-01311—Ex. 1001—U.S. Pat. No. 8,870,410, Jul. 21, 2020.
IPR2020-01311—Ex. 1008—Appendix 19 Ultravision Infringment Content, Jul. 21, 2020.
IPR2020-01311—Ex. 1038—Allen—U.S. Pat. No. 8,449,150, Jul. 21, 2020.
IPR2020-01312—Ex. 1030—UFC Design_Interior and Exterior Lighting a, Jul. 21, 2020.
IPR2020-01313—Ex. 1038—Allen—U.S. Pat. No. 8,449,150, Jul. 21, 2020.
IPR2020-01313—Ex. 1036—DOE, Jul. 21, 2020.
IPR2020-01311—Ex. 1012—Marcoux—US20100128488A1, Jul. 21, 2020.
IPR2020-01311—Ex. 1040—Hough The Plastics Copendium, Jul. 21, 2020.
IPR2020-01312—Ex. 1032—USDOE Effective White Light Options, Jul. 21, 2020.
IPR2020-01311—Ex. 1041—Smith Modern Optical Engineering, Jul. 21, 2020.
IPR2020-01312—Ex. 1033—Assist, Jul. 21, 2020.
IPR2020-01311—Ex. 1013—Heller—U.S. Pat. No. 7,896,522, Jul. 21, 2020.
IPR2020-01311—Ex. 1039—Order Dismissing Samsung Display Co., Jul. 21, 2020.
IPR2020-01312—Ex. 1031—Feng—Design of LED Freeform Optical Syste, Jul. 21, 2020.
IPR2020-01312—Ex. 1041—Smith Modern Optical Engineering, Jul. 21, 2020.
IPR2020-01311—Ex. 1036—DOE, Jul. 21, 2020.
IPR2020-01312—Ex. 1026—Watanabe—US20130003370A1, Jul. 21, 2020.
Fournier, F., "Freeform Reflector Design With Extended Sources," Dissertation, 2010, University of Central Florida, Florida, USA, pp. 1-58.
Fournier, F., "Freeform Reflector Design With Extended Sources," Dissertation, 2010, University of Central Florida, Florida, USA, pp. 59-116.
Fournier, F., "Freeform Reflector Design With Extended Sources," Dissertation, 2010, University of Central Florida, Florida, USA, pp. 117-174.
Fournier, F., "Freeform Reflector Design With Extended Sources," Dissertation, 2010, University of Central Florida, Florida, USA, pp. 175-232.
Adaptive Micro Systems, LLC, "Signs—Sealed and Delivered! Adaptive's Approach to Heat Management," Mar. 2008, 2 pages.
"Advanced Lighting Guidelines," 2001 Edition, New Buildings Institute, Inc., Jul. 20, 2001, 394 pages.
Dieker, et al., U.S. Appl. No. 61/659,828, filed Jun. 14, 2012, "Asymmetric Area Lighting Lens with Improved Uniformity," 14 pages.
Barco, "DB-x20 Digital Billboard Out-of-Home Media LED Screen," Apr. 2009, 6 pages.
Batinsey, J., "Outdoor Lighting Ordinance Guide," Jun. 2006, 17 pages.

(56) References Cited

OTHER PUBLICATIONS

Chang, R. et al., "LED Backlight Module by Lightguide-Diffusive Component," Journal of Display Technology, vol. 8, No. 2, Feb. 2012, pp. 79-86.
Chen, C. et al., "P-72: Inclined LED Array for Large-Sized Backlight System," Society for Information Display, International Symposium, Digest of Technical Papers, SID 05 Digest, May 2005, pp. 558-561.
"Unified Development Code," Chapter 10 of the Tyler Code of Ordinances, City of Tyler, Apr. 23, 2008, 378 pages.
Defendants Invalidity Contentions, Appendix A, *Ultravision Technologies v. Lamar et al.*, E.D. Texas, Case No. 2:16-cv-374, Sep. 9, 2016, pp. 1-19.
Defendants Invalidity Contentions, ExhibitA01, *Ultravision Technologies v. Lamar et al.*, E.D. Texas, Case No. 2:16-cv-374, Sep. 9, 2016, pp. 1-80.
Defendants Invalidity Contentions, ExhibitA02, *Ultravision Technologies v. Lamar et al.*, E.D. Texas, Case No. 2:16-cv-374, Sep. 9, 2016, pp. 1-74.
Defendants Invalidity Contentions, ExhibitA03, *Ultravision Technologies v. Lamar et al.*, E.D. Texas, Case No. 2:16-cv-374, Sep. 9, 2016, pp. 1-52.
Defendants Invalidity Contentions, ExhibitA04, *Ultravision Technologies v. Lamar et al.*, E.D. Texas, Case No. 2:16-cv-374, Sep. 9, 2016, pp. 1-53.
Defendants Invalidity Contentions, ExhibitB01, *Ultravision Technologies v. Lamar et al.*, E.D. Texas, Case No. 2:16-cv-374, Sep. 9, 2016, pp. 1-34.
Defendants Invalidity Contentions, ExhibitB02, *Ultravision Technologies v. Lamar et al.*, E.D. Texas, Case No. 2:16-cv-374, Sep. 9, 2016, pp. 1-36.
Defendants Invalidity Contentions, ExhibitB03, *Ultravision Technologies v. Lamar et al.*, E.D. Texas, Case No. 2:16-cv-374, Sep. 9, 2016, pp. 1-21.
Defendants Invalidity Contentions, ExhibitB04, *Ultravision Technologies v. Lamar et al.*, E.D. Texas, Case No. 2:16-cv-374, Sep. 9, 2016, pp. 1-27.
Defendants Invalidity Contentions, ExhibitC01, *Ultravision Technologies v. Lamar et al.*, E.D. Texas, Case No. 2:16-cv-374, Sep. 9, 2016, pp. 1-52.
Defendants Invalidity Contentions, ExhibitC02, *Ultravision Technologies v. Lamar et al.*, E.D. Texas, Case No. 2:16-cv-374, Sep. 9, 2016, pp. 1-67.
Defendants Invalidity Contentions, ExhibitC03, *Ultravision Technologies v. Lamar et al.*, E.D. Texas, Case No. 2:16-cv-374, Sep. 9, 2016, pp. 1-35.
Defendants Invalidity Contentions, ExhibitC04, *Ultravision Technologies v. Lamar et al.*, E.D. Texas, Case No. 2:16-cv-374, Sep. 9, 2016, pp. 1-87.
Defendants Invalidity Contentions, ExhibitC05, *Ultravision Technologies v. Lamar et al.*, E.D. Texas, Case No. 2:16-cv-374, Sep. 9, 2016, pp. 1-51.
Defendants Invalidity Contentions, ExhibitC06, *Ultravision Technologies v. Lamar et al.*, E.D. Texas, Case No. 2:16-cv-374, Sep. 9, 2016, pp. 1-79.
Defendants Invalidity Contentions, ExhibitD01, *Ultravision Technologies v. Lamar et al.*, E.D. Texas, Case No. 2:16-cv-374, Sep. 9, 2016, pp. 1-109.
Defendants Invalidity Contentions, ExhibitD02, *Ultravision Technologies v. Lamar et al.*, E.D. Texas, Case No. 2:16-cv-374, Sep. 9, 2016, pp. 1-186.
Defendants Invalidity Contentions, ExhibitD03, *Ultravision Technologies v. Lamar et al.*, E.D. Texas, Case No. 2:16-cv-374, Sep. 9, 2016, pp. 1-133.
Defendants Invalidity Contentions, ExhibitD04, *Ultravision Technologies v. Lamar et al.*, E.D. Texas, Case No. 2:16-cv-374, Sep. 9, 2016, pp. 1-111.
Defendants Invalidity Contentions, ExhibitD05, *Ultravision Technologies v. Lamar et al.*, E.D. Texas, Case No. 2:16-cv-374, Sep. 9, 2016, pp. 1-133.
Defendants Invalidity Contentions, ExhibitD06, *Ultravision Technologies v. Lamar et al.*, E.D. Texas, Case No. 2:16-cv-374, Sep. 9, 2016, pp. 1-135.
Defendants Invalidity Contentions, ExhibitE01, *Ultravision Technologies v. Lamar et al.*, E.D. Texas, Case No. 2:16-cv-374, Sep. 9, 2016, pp. 1-169.
Defendants Invalidity Contentions, ExhibitE02, *Ultravision Technologies v. Lamar et al.*, E.D. Texas, Case No. 2:16-cv-374, Sep. 9, 2016, pp. 1-192.
Defendants Invalidity Contentions, ExhibitE03, *Ultravision Technologies v. Lamar et al.*, E.D. Texas, Case No. 2:16-cv-374, Sep. 9, 2016, pp. 1-443.
Defendants Invalidity Contentions, ExhibitE04, *Ultravision Technologies v. Lamar et al.*, E.D. Texas, Case No. 2:16-cv-374, Sep. 9, 2016, pp. 1-171.
Defendants Invalidity Contentions, ExhibitF01, *Ultravision Technologies v. Lamar et al.*, E.D. Texas, Case No. 2:16-cv-374, Sep. 9, 2016, pp. 1-34.
Defendants Invalidity Contentions, ExhibitF02, *Ultravision Technologies v. Lamar et al.*, E.D. Texas, Case No. 2:16-cv-374, Sep. 9, 2016, pp. 1-13.
Defendants Invalidity Contentions, ExhibitF03, *Ultravision Technologies v. Lamar et al.*, E.D. Texas, Case No. 2:16-cv-374, Sep. 9, 2016, pp. 1-100.
Defendants Invalidity Contentions, ExhibitG01, *Ultravision Technologies v. Lamar et al.*, E.D. Texas, Case No. 2:16-cv-374, Sep. 9, 2016, pp. 1-30.
Defendants Invalidity Contentions, ExhibitG02, *Ultravision Technologies v. Lamar et al.*, E.D. Texas, Case No. 2:16-cv-374, Sep. 9, 2016, pp. 1-11.
Defendants Invalidity Contentions, ExhibitG03, *Ultravision Technologies v. Lamar et al.*, E.D. Texas, Case No. 2:16-cv-374, Sep. 9, 2016, pp. 1-94.
Defendants Invalidity Contentions, ExhibitH01 (redacted), *Ultravision Technologies v. Lamar et al.*, E.D. Texas, Case No. 2:16-cv-374, Sep. 9, 2016, pp. 1-60.
Defendants Invalidity Contentions, ExhibitH02 (redacted), *Ultravision Technologies v. Lamar et al.*, E.D. Texas, Case No. 2:16-cv-374, Sep. 9, 2016, pp. 1-26.
Defendants Invalidity Contentions, ExhibitH03 (redacted), *Ultravision Technologies v. Lamar et al.*, E.D. Texas, Case No. 2:16-cv-374, Sep. 9, 2016, pp. 1-71.
Defendants Invalidity Contentions, ExhibitH04 (redacted), *Ultravision Technologies v. Lamar et al.*, E.D. Texas, Case No. 2:16-cv-374, Sep. 9, 2016, pp. 1-151.
Defendants Invalidity Contentions, ExhibitH05 (redacted), *Ultravision Technologies v. Lamar et al.*, E.D. Texas, Case No. 2:16-cv-374, Sep. 9, 2016, pp. 1-181.
Defendants Invalidity Contentions, ExhibitI01 (redacted), *Ultravision Technologies v. Lamar et al.*, E.D. Texas, Case No. 2:16-cv-374, Sep. 9, 2016, pp. 1-168.
Deepa, R. et al., "Modeling and Simulation of Multielement LED Source," The Illuminating Engineering Institute of Japan, Journal of Light & Visual Environment, vol. 35, No. 1, Jun. 21, 2011, pp. 34-41.
Deepa, R. et al., Optimization of multi-element LED source for uniform illumination of plane surface, Optical Society of America, Optics Express, vol. 19, No. S4, Jul. 4, 2011, pp. A639-A648.
Design & Engineering Services, "Advanced Lighting Systems for Externally Lit Billboards," ET 08.12 Report, Southern California Edison, Jan. 4, 2010, 58 pages.
Whang, et al., "Designing Uniform Illumination Systems by Surface-Tailored Lens and Configurations of LED Arrays," IEEE 2009, Journal of Display Technology, vol. 5, No. 3, Mar. 2009, pp. 94-103.
Ding, Y., "Freeform LED lens for uniform illumination," Optics Express, vol. 16, No. 17, Aug. 18, 2008, 9 pages.
Defendants Expert Report,"Appendix B Materials Considered", Apr. 2020, 22 pages.
"Autobahn Lighting for roadway needs," 2011, Acuity Brands Lighting Inc., 2 pages.
Cooper, M. S., "Investigation of Arrhenius Acceleration Factor for Integrated Circuit Early Life Failure Region With Several Failure

(56) References Cited

OTHER PUBLICATIONS

Mechanisms," IEEE Transactions on Components and Packaging Technologies, Sep. 2005, vol. 28, No. 3, pp. 561-563.
"BetaLED. Evolution of the species.", 23 pages.
"Cree® LMR4 LED Module with EasyWhite® Technology," Cree Inc., Durham, USA, 5 pages.
"D-Series Size 1 LED Area Luminaire," 2011, Acuity Brands Lighting Inc., 2 pages.
"Electronic LED Dimming Module OPTOTRONIC® OT DIM," OSRAM Sylvania Inc., 2 pages.
"Electronic LED Power Supply OPTOTRONIC®," OSRAM Sylvania Inc., 2007, 4 pages.
"Expanding the boundaries of lighting," 2012, Acuity Brands Lighting Inc., 76 pages.
"Granville Series," Acuity Lighting Group Inc., 2003, 8 pages.
"LED Area Light Board," Lithonia Lighting, 1 page.
"LED Area Light," Jun. 11, 2007, Lithonia Lighting, 2 pages.
"LED Lens," May 1, 2007, Lithonia Lighting, 1 page.
"LED Lens," Jul. 6, 2007, Lithonia Lighting, 1 page.
"LED Module Specification," Apr. 1 2012, Samsung Electronics Co., 10 pages.
"Media Business Plan 04 FY2011," 28 pages.
"Outdoor LED Area Light 25 K2 LEOs Per Panel (4 Panels)," Lithonia Lighting, 1 page.
"P.C. Board LED area Light," Lithonia Lighting, 1 page.
"Sign-Vue LED Assembly Drawing," Holophane Research and Development Center, Newark, USA, 14 pages.
"Sign-Vue LED Assembly Drawing," Holophane Research and Development Center, Newark, USA, 8 pages.
"SIGN-VUE® LED," 2012, Acuity Brands Lighting Inc., 2 pages.
"Street Lighting," 2012, Acuity Brands Lighting Inc., 32 pages.
"Uncompromising Brilliance," 2009, Beta Lighting Inc., USA.
A Dictionary of Science, 2006, Oxford University Press Inc., New York, USA, 7 pages.
Acuity Innovation Outdoor, 17 pages.
Bass, M. et al., Handbook of Optics vol. II Devices; Measurements; and Properties; Second Edition, 1995, McGraw-Hill Inc., United States of America, 1496 pages.
Blitzer, H. et al., "Light and Lenses," Understanding Forensic Digital Imaging, 2008, Academic Press is an imprint of Elsevier, Oxford, UK, 27 pages.
Born, M. et al., Principles of optics Seventh expanded edition, 1999, Cambridge University Press, UK, 7 pages.
Brite, J., "American Electric Lighting Autobahn Roadway Luminaire," <<architectmagazine.com/technology/products/american-electric-lighting-autobahn-roadway-luminaire_o>>, Sep. 22, 2011, 1 page.
Cassell's Cyclopaedia of Photography, Cassell and Company Ltd., 1911, 7 pages.
Chambers Dictionary of Science and Technology, Chambers Harrap Publishers Ltd, 2007, Great Britain, 4 pages.
Lee, S., "How to Select a Heat Sink," http:www.electronics-cooling.com/1995/06/how-to-select-a-heat-sink/, Jun. 1, 1995, pp. 1-10.
Huang, K. et al., "Free-form lens design for LED indoor illumination," Proc. of SPIE, vol. 7852, Nov. 15, 2010, pp. 78521D-1-78521D-8.
"The Lighting Handbook," 12-18, IES 10th Edition, Dec. 6, 2011, 1 page.
"The Lighting Handbook," 8-17, IES 10th Edition, Dec. 6, 2011, 2 pages.
Steigerwald, et al., "Illumination with Solid State Lighting Technology," IEEE Journal on Selected Topics in Quantum Electronics, vol. 8, No. 2, Mar./Apr. 2002, pp. 310-320.
Defendant Irvin International, Inc.'s Answer, Affirmative Defenses, and Counterclaims to Plaintiff's Complaint, *Ultravision Technologies v. Lamar et al.*, E.D. Texas, Case No. 2:16-cv-374, filed Jun. 6, 2016, pp. 1-41.
Jeon, H. et al., Illuminance Distribution and Photosynthetic Photon Flux Density Characteristics of LED Lighting with Periodic Lattice Arrangements, Transactions on Electrical and Electronic Materials, vol. 13, No. 1, Feb. 25, 2012, pp. 16-18.

Jiang, J., "Optical design of a freeform TIR lens for LED street-light," Optik—International Journal for Light and Electron Optics, vol. 121, Issue 19, Oct. 2010, pp. 1761-1765.
Defendants Corrected Joint Invalidity Contentions, *Ultravision Technologies v. Lamar et al.*, E.D. Texas, Case No. 2:16-cv-374, Sep. 9, 2016, pp. 1-108.
Keller, A., "Signs of the Times," Floridatrend.com, Dec. 2011, pp. 50-53.
Kim, Yu-Sin, et al., "Development of a Numerical Model for the Luminous Intensity Distribution of a Planar Prism LED Luminaire for Applying an Optimization Algorithm," Luekos, vol. 9, No. 1, Jul. 2012, pp. 57-72.
Lakkio, O., "Winning the Optical Challenges in LED Street Lighting," Digi-Key, May 27, 2011, 5 pages.
Lamar's First Amended Answer and Counterclaims to Plaintiffs Complaint, *Ultravision Technologies v. Lamar et al.*, E.D. Texas, Case No. 2:16-cv-374, filed Jun. 8, 2016, pp. 1-61.
"BILLIE—The Bright Answer for Billboard Lighting," Ledil Product Release, Dec. 8, 2013, 2 pages.
"Ledil Standard Optics for Osram LEDs," Ledil, Jan. 2011, 60 pages.
"Strada 6in1 Module for Streeting Lighting," Ledil, 2010, 1 page, <<http://ledil.fi/sites/default/files/Documents/Technical/Articles/Article_2.pdf>>.
LEDIL, "Who is LEDIL?," www.ledil.com, Mar. 22, 2011, 17 pages.
LEDIL, "Who is LEDIL?," www.ledil.com, May 22, 2011, 68 pages.
Lee, S. et al., "Driving Performance and Digital Billboards Final Report," Virginia Tech Transportation Institute, Center for Automotive Safety Research, Mar. 22, 2007, 90 pages.
Lee, Hsiao-Wen, et al., "Improvement of Illumination Uniformity for LED Flat Panel Light by Using Micro-Secondary Lens Array," Optics Express, vol. 20, No. S6, Nov. 5, 2012, 11 pages.
Lighting Solutions Techzone Magazine, "Look Inside Today's Lighting Technology," Digi-Key Corporation, TZL112.US, Jun. 7, 2011, 76 pages.
Liu, Peng, et al., "Optimized Design of LED Freeform Lens for Uniform Circular Illumination," Journal of Zhejiang University—Science C (Computers & Electronics), 2012, pp. 929-936.
Lo, Y. et al., "Optical Design of a Butterfly Lens for a Street Light Based on a Double-Cluster LED," Microelectronics Reliability, vol. 52, May 2011, pp. 889-893.
LED Professional Review, Issue 17, Jan./Feb. 2010, 52 pages.
LED Professional Review, Issue 18, Mar./Apr. 2010, 64 pages.
LED Professional Review, Issue 19, May/Jun. 2010, 64 pages.
LED Professional Review, Issue 20, Jul./Aug. 2010, 48 pages.
LED Professional Review, Issue 21, Sep./Oct. 2010, 64 pages.
LED Professional Review, Issue 22, Nov./Dec. 2010, 60 pages.
Defendant American Lighting Technologies, Inc. D/B/A Lighting Technologies Amended Answer, Affirmative Defenses and Counterclaims to Plaintiff's Complaint, *Ultravision Technologies v. Lamar et al.*, E.D. Texas, Case No. 2:16-cv-374, filed Jun. 27, 2016, pp. 1-43.
Defendant American Lighting Technologies, Inc. D/B/A Lighting Technologies' Answer and Affirmative Defenses to Plaintiff's Complaint, *Ultravision Technologies v. Lamar et al.*, E.D. Texas, Case No. 2:16-cv-374, filed Jun. 6, 2016, pp. 1-37.
Luminautics, "LED Display Primer," 2011, pp. 1-21.
Luo, X. et al., "Automated Optimization of an Aspheric Light-Emitting Diode Lens for Uniform Illumination," Applied Optics, vol. 50, No. 20, Jul. 2011, pp. 3412-3418.
Moreno, I., "Configuration of LED Arrays for Uniform Illumination," Proc. of SPIE, vol. 5622, Oct. 2004, pp. 713-718.
"LED Ad-Poster Billboard Luminaire," Neptun, Jan. 2012, 1 page.
"LED Ad-Poster Billboard Luminaire," Neptun, May 25, 2011, 1 page.
Arik, M., "Thermal Management of LEDs: Package to System," Third International Conference on Solid State Lighting, Proc. of SPIE, vol. 5187, Jan. 21, 2012, pp. 64-75.
"Street Lighting with LED Lights Sources Application Note," OSRAM Opto Semiconductors, Jan. 2009, pp. 1-10.

(56) References Cited

OTHER PUBLICATIONS

Parkyn, William A., "Segmented Illumination Lenses for Steplighting and Wall-Washing," SPIE Conference on Current Development in Optical Design and Optical Engineering VIII, Denver, Colorado, Jul. 1999, SPIE vol. 3779, pp. 363-370.
Qin, Z. et al., "Analysis of Condition for Uniform Lighting Generated by Array of Light Emitting Diodes with Large View Angle," Optics Express, vol. 18, No. 16, Aug. 2010, pp. 17460-17476.
Ramane, D. et al., "Automated Test Jig for Uniformity Evaluation of Luminaries," IJAET, vol. 3, No. 1, Mar. 2012, pp. 41-47.
"Starbeam," Thorlux Lighting, Brochure, Aug. 2012, 8 pages.
"Starbeam," Thorlux Lighting, Brochure, Jul. 2015, 4 pages.
"Starbeam," Thorlux Lighting, Brochure, Mar. 2014, 16 pages.
"Starbeam," Thorlux Lighting, Technical Information, Mar. 2014, 10 pages.
"Starflood," Thorlux Lighting, Brochure, Mar. 2016, 16 pages.
"Starflood; High performance mini LED floodlights," Thorlux Lighting, Retreived Jul. 21, 2016, 16 pages, <<http://www.thorlux.com/luminaires/starflood>>.
Cheng, et al., "The Research of LED Arrays for Uniform Illumination," Advances in Information Sciences and Service Sciences (AISS), vol. 4, No. 10, Jun. 2012, pp. 174-182.
IPR2020-01311—Ex. 1002—Declaration of Eric Bretschneider, Jul. 21, 2020.
IPR2020-01313—Ex. 1019—Rao (IN2774CHE2009A), Jul. 21, 2020.
IPR2020-01313—Ex. 1011—Shimada—US20080084693A1, Jul. 21, 2020.
IPR2020-01313—Ex. 1008—Order Dismissing SDC, Jul. 21, 2020.
IPR2020-01313—Ex. 1012—Marcoux—US20100128488A1, Jul. 21, 2020.
IPR2020-01311—Ex. 1024—Leatherdale—U.S. Pat. No. 7,390,117, Jul. 21, 2020.
IPR2020-01312—Ex. 1016—ANSI RP-8-00, Jul. 21, 2020.
IPR2020-01312—Ex. 1003—Eric Bretschneider CV, Jul. 21, 2020.
IPR2020-01312—Ex. 1044—Members—Design Lights Consortium, Jul. 21, 2020.
IPR2020-01311—Ex. 1037—Bitner—U.S. Pat. No. 2,215,900, Jul. 21, 2020.
IPR2020-01312—Ex. 1028—U.S. Appl. 61/677,340, Jul. 21, 2020.
IPR2020-01313—Ex. 1009—Kaiya—JP2004281352, Jul. 21, 2020.
IPR2020-01311—Ex. 1034—Greenville Exterior Lighting Ordinance 11-0, Jul. 21, 2020.
IPR2020-01312—Ex. 1024—Leatherdale—U.S. Pat. No. 7,390,117, Jul. 21, 2020.
IPR2020-01312—Ex. 1011—Shimada US20080084693, Jul. 21, 2020.
IPR2020-01311—Ex. 1044—Member—Desing Lights Consoritum, Jul. 21, 2020.
IPR2020-01312—Ex. 1036—DOE, Jul. 21, 2020.
IPR2020-01312—Ex. 1039—Order Dismissing Samsung Display Co., Jul. 21, 2020.
IPR2020-01311—Ex. 1011—Shimada US20080084693, Jul. 21, 2020.
IPR2020-01311—Ex. 1018—DES (Advanced Lighting Systems), Jul. 21, 2020.
IPR2020-01311—Ex. 1005—Complaint EDTX-2-19-cv-00252-1, Jul. 21, 2020.
IPR2020-01311—Ex. 1023—Joint Motion to Amend DCO, Jul. 21, 2020.
IPR2020-01312—Ex. 1013—Heller—U.S. Pat. No. 7,896,522, Jul. 21, 2020.
IPR2020-01311—Ex. 1030—UFC Design_Interior and Exterior Lighting a, Jul. 21, 2020.
IPR2020-01312—Ex. 1020—Holder—U.S. Pat. No. 7,674,018, Jul. 21, 2020.
IPR2020-01312—Ex. 1007—Appendix 18 Ultravision Infringment Content, Jul. 21, 2020.
IPR2020-01313—Ex. 1003—Eric Bretschneider CV, Jul. 21, 2020.
IPR2020-01312—Ex. 1042—Guang He—Physics of Nonlinear Optics, Jul. 21, 2020.
IPR2020-01312—Ex. 1038—Allen—U.S. Pat. No. 8,449,150, Jul. 21, 2020.
IPR2020-01311—Ex. 1010—Wilcox—U.S. Pat. No. 7,618,163, Jul. 21, 2020.
IPR2020-01311—Ex. 1016—ANSI RP-8-00, Jul. 21, 2020.
IPR2020-01311—Ex. 1003—Eric Bretschneider CV, Jul. 21, 2020.
IPR2020-01311—Ex. 1042—Guang He—Physics of Nonlinear Optics, Jul. 21, 2020.
IPR2020-01312—Ex. 1034—Greenville Exterior Lighting Ordinance 11-0, Jul. 21, 2020.
IPR2020-01311—Ex. 1022—Wei—U.S. Pat. No. 8,960,960, Jul. 21, 2020.
IPR2020-01311—Ex. 1009—Kaiya—JP2004281352, Jul. 21, 2020.
IPR2020-01312—Ex. 1001—U.S. Pat. No. 8,870,410, Jul. 21, 2020.
IPR2020-01313—Ex. 1037—Bitner—U.S. Pat. No. 2,215,900, Jul. 21, 2020.
IPR2020-01312—Ex. 1037—Bitner—U.S. Pat. No. 2,215,900, Jul. 21, 2020.
IPR2020-01311—Ex. 1033—ASSIST, Jul. 21, 2020.
IPR2020-01313—Ex. 1016—14630500 (946 parent file history)_Part2, Jul. 21, 2020.
IPR2020-01313—Ex. 1016—14630500 (946 parent file history)_Part3, Jul. 21, 2020.
IPR2020-01313—Ex. 1016—14630500 (946 parent file history)_Part1, Jul. 21, 2020.
IPR2020-01313—Ex. 1020—Holder—U.S. Pat. No. 7,674,018, Jul. 21, 2020.
IPR2020-01313—Ex. 1017—U.S. Pat. No. 8,310,158—Coplin, Jul. 21, 2020.
IPR2020-01313—Ex. 1028—U.S. Appl. No. 61/677,346, Jul. 21, 2020.
IPR2020-01313—Ex. 1007—Appendix 5 of Ultravision infringement cont, Jul. 21, 2020.
IPR2020-01313—Ex. 1013—Heller—U.S. Pat. No. 7,896,522, Jul. 21, 2020.
IPR2020-01313—Ex. 1010—Cocciardi U.S. Pat. No. 7,217,015, Jul. 21, 2020.
IPR2020-01311—Ex. 1021—Hsieh-Yee Declaration, Jul. 21, 2020.
IPR2020-01313—Ex. 1018—DES (Advanced Lighting Systems), Jul. 21, 2020.
IPR2020-01313—Ex. 1021—Hsieh-Yee Declaration, Jul. 21, 2020.
IPR2020-01313—Ex. 1005—Complaint—EDTX-2-20-cv-00053-1, Jul. 21, 2020.
IPR2020-01313—Ex. 1006—Appendix 4 of Ultravision infringement cont, Jul. 21, 2020.
IPR2020-01313—Ex. 1015—DLC Members, Jul. 21, 2020.
IPR2020-01313—Ex. 1014—History—DesignLights Consortium, Jul. 21, 2020.
IPR2020-01312—Ex. 1021—Hsieh-Yee Declaration, Jul. 21, 2020.
IPR2020-01313—Ex. 1004—File History U.S. Pat. No. 10,223,946, Jul. 21, 2020.
IPR2020-01313—Ex. 1001—U.S. Pat. No. 10,223,946, Jul. 21, 2020.
IPR2020-01313—Ex. 1002—Declaration of Eric Bretschneider, Jul. 21, 2020.
IPR2020-01311—Ex. 1028—U.S. Appl. No. 61/677,340, Jul. 21, 2020.
IPR2020-01312—Ex. 1019—Rao—IN2774CHE2009A, Jul. 21, 2020.
IPR2020-01312—Ex. 1006—Joint Claim Construction Statement, Jul. 21, 2020.
IPR2020-01311—Ex. 1026—Watanabe—US20130003370A1, Jul. 21, 2020.
IPR2020-01312—Ex. 1018—DES (Advanced Lighting Systems), Jul. 21, 2020.
IPR2020-01312—Ex. 1005—Complaint EDTX-2-19-cv-00252-1, Jul. 21, 2020.
IPR2020-01312—Ex. 1008—Appendix 19 Ultravision Infringment Content, Jul. 21, 2020.
IPR2020-01311—Ex. 1031—Feng—Design of LED Freeform Optical Syste, Jul. 21, 2020.

(56) References Cited

OTHER PUBLICATIONS

IPR2020-01313—Ex. 1034—Greenville Exterior Lighting Ordinance 11-0, Jul. 21, 2020.
IPR2020-01311—Ex. 1035—Haitz—Case for National Research Program, Jul. 21, 2020.
IPR2020-01312—Ex. 1025—Chiang—US20070110386A1, Jul. 21, 2020.
IPR2020-01312—Ex. 1012—Marcoux—US20100128488A1, Jul. 21, 2020.
IPR2020-01313—Ex. 1035—Haitz—Case for National Research Program, Jul. 21, 2020.
IPR2020-01311—Ex. 1020—Holder—U.S. Pat. No. 7,674,018, Jul. 21, 2020.
IPR2020-01311—Ex. 1019—Rao—IN2774CHE2009A, Jul. 21, 2020.
IPR2020-01311—Petitioner's Notice Regarding Multiple Petitions, Jul. 21, 2020.
IPR2020-01311—Petition, Jul. 21, 2020.
IPR2020-01312—Petitioner's Notice Regarding Multiple Petitions, Jul. 21, 2020.
IPR2020-01312—Petition, Jul. 21, 2020.
IPR2020-01311—Ex. 1006—Joint Claim Construction Statement, Jul. 21, 2020.
IPR2020-01311—Ex. 1043—History—DesignLights Consortium, Jul. 21, 2020.
IPR2020-01312—Ex. 1035—Haitz—Case for National Research Program, Jul. 21, 2020.
IPR2020-01312—Ex. 1004—File Histor for U.S. Pat. No. 8,870,410, Jul. 21, 2020.
IPR2020-01311—Ex. 1007—Appendix 18 Ultravision Infringment Content, Jul. 21, 2020.
IPR2020-01312—Ex. 1017—Arai—U.S. Pat. No. 8,585,254, Jul. 21, 2020.
IPR2020-01311—Ex. 1025—Chiang—US20070110386A1, Jul. 21, 2020.
IPR2020-01313—Petition, Jul. 21, 2020.
IPR2020-01312—Ex. 1002—Declaration of Eric Bretschneider, Jul. 21, 2020.
Invalidity Contentions, *Ultravision v Holophane*, Case No. 2:19-cv-00291-JRG-RSP, ED Texas, Apr. 7, 2020.
Invalidity Contentions, Exhibit A1, *Ultravision v Holophane*, ED Texas, Apr. 7, 2020.
Invalidity Contentions Exhibit A2, *Ultravision v Holophane*, ED Texas, Apr. 7, 2020.
Invalidity Contentions Exhibit A3, *Ultravision v Holophane*, ED Texas, Apr. 7, 2020.
Invalidity Contentions Exhibit A4, *Ultravision v Holophane*, ED Texas, Apr. 7, 2020.
Invalidity Contentions Exhibit A5, *Ultravision v Holophane*, ED Texas, Apr. 7, 2020.
Invalidity Contentions Exhibit A6, *Ultravision v Holophane*, ED Texas, Apr. 7, 2020.
Invalidity Contentions Exhibit A7, *Ultravision v Holophane*, ED Texas, Apr. 7, 2020.
Invalidity Contentions Exhibit A8, *Ultravision v Holophane*, ED Texas, Apr. 7, 2020.
Invalidity Contentions Exhibit A9, *Ultravision v Holophane*, ED Texas, Apr. 7, 2020.
Invalidity Contentions Exhibit A10, *Ultravision v Holophane*, ED Texas, Apr. 7, 2020.
Invalidity Contentions Exhibit A11, *Ultravision v Holophane*, ED Texas, Apr. 7, 2020.
Invalidity Contentions Exhibit A12, *Ultravision v Holophane*, ED Texas, Apr. 7, 2020.
Invalidity Contentions Exhibit A13, *Ultravision v Holophane*, ED Texas, Apr. 7, 2020.
Invalidity Contentions Exhibit A14, *Ultravision v Holophane*, ED Texas, Apr. 7, 2020.
Invalidity Contentions Exhibit A15, *Ultravision v Holophane*, ED Texas, Apr. 7, 2020.
Invalidity Contentions Exhibit A16, *Ultravision v Holophane*, ED Texas, Apr. 7, 2020.
Invalidity Contentions Exhibit A17, *Ultravision v Holophane*, ED Texas, Apr. 7, 2020.
Invalidity Contentions Exhibit A18, *Ultravision v Holophane*, ED Texas, Apr. 7, 2020.
Invalidity Contentions Exhibit A19, *Ultravision v Holophane*, ED Texas, Apr. 7, 2020.
Invalidity Contentions Exhibit B1, *Ultravision v Holophane*, ED Texas, Apr. 7, 2020.
Invalidity Contentions Exhibit B2, *Ultravision v Holophane*, ED Texas, Apr. 7, 2020.
Invalidity Contentions Exhibit B3, *Ultravision v Holophane*, ED Texas, Apr. 7, 2020.
Invalidity Contentions Exhibit B4, *Ultravision v Holophane*, ED Texas, Apr. 7, 2020.
Invalidity Contentions Exhibit B5, *Ultravision v Holophane*, ED Texas, Apr. 7, 2020.
Invalidity Contentions Exhibit B6, *Ultravision v Holophane*, ED Texas, Apr. 7, 2020.
Invalidity Contentions Exhibit B7, *Ultravision v Holophane*, ED Texas, Apr. 7, 2020.
Invalidity Contentions Exhibit B8, *Ultravision v Holophane*, ED Texas, Apr. 7, 2020.
Invalidity Contentions Exhibit B9, *Ultravision v Holophane*, ED Texas, Apr. 7, 2020.
Invalidity Contentions Exhibit B10, *Ultravision v Holophane*, ED Texas, Apr. 7, 2020.
Invalidity Contentions Exhibit B11, *Ultravision v Holophane*, ED Texas, Apr. 7, 2020.
Invalidity Contentions Exhibit B12, *Ultravision v Holophane*, ED Texas, Apr. 7, 2020.
Invalidity Contentions Exhibit B13, *Ultravision v Holophane*, ED Texas, Apr. 7, 2020.
Invalidity Contentions Exhibit B14, *Ultravision v Holophane*, ED Texas, Apr. 7, 2020.
Invalidity Contentions Exhibit B15, *Ultravision v Holophane*, ED Texas, Apr. 7, 2020.
Invalidity Contentions Exhibit B16, *Ultravision v Holophane*, ED Texas, Apr. 7, 2020.
Invalidity Contentions Exhibit B17, *Ultravision v Holophane*, ED Texas, Apr. 7, 2020.
Invalidity Contentions Exhibit B18, *Ultravision v Holophane*, ED Texas, Apr. 7, 2020.
Invalidity Contentions Exhibit B19, *Ultravision v Holophane*, ED Texas, Apr. 7, 2020.
Invalidity Contentions Exhibit C1, *Ultravision v Holophane*, ED Texas, Apr. 7, 2020.
Invalidity Contentions Exhibit C2, *Ultravision v Holophane*, ED Texas, Apr. 7, 2020.
Invalidity Contentions Exhibit C3, *Ultravision v Holophane*, ED Texas, Apr. 7, 2020.
Invalidity Contentions Exhibit C4, *Ultravision v Holophane*, ED Texas, Apr. 7, 2020.
Invalidity Contentions Exhibit C5, *Ultravision v Holophane*, ED Texas, Apr. 7, 2020.
Invalidity Contentions Exhibit C6, *Ultravision v Holophane*, ED Texas, Apr. 7, 2020.
Invalidity Contentions Exhibit C7, *Ultravision v Holophane*, ED Texas, Apr. 7, 2020.
Invalidity Contentions Exhibit C8, *Ultravision v Holophane*, ED Texas, Apr. 7, 2020.
Invalidity Contentions Exhibit C9, *Ultravision v Holophane*, ED Texas, Apr. 7, 2020.
Invalidity Contentions Exhibit C10, *Ultravision v Holophane*, ED Texas, Apr. 7, 2020.
Invalidity Contentions Exhibit C11, *Ultravision v Holophane*, ED Texas, Apr. 7, 2020.
Invalidity Contentions Exhibit C12, *Ultravision v Holophane*, ED Texas, Apr. 7, 2020.
Invalidity Contentions Exhibit C13, *Ultravision v Holophane*, ED Texas, Apr. 7, 2020.

(56) References Cited

OTHER PUBLICATIONS

Invalidity Contentions Exhibit C14, *Ultravision* v *Holophane*, ED Texas, Apr. 7, 2020.
Invalidity Contentions Exhibit C15, *Ultravision* v *Holophane*, ED Texas, Apr. 7, 2020.
Invalidity Contentions Exhibit C16, *Ultravision* v *Holophane*, ED Texas, Apr. 7, 2020.
Invalidity Contentions Exhibit C17, *Ultravision* v *Holophane*, ED Texas, Apr. 7, 2020.
Invalidity Contentions Exhibit D1, *Ultravision* v *Holophane*, ED Texas, Apr. 7, 2020.
Invalidity Contentions Exhibit D2, *Ultravision* v *Holophane*, ED Texas, Apr. 7, 2020.
Invalidity Contentions Exhibit D3, *Ultravision* v *Holophane*, ED Texas, Apr. 7, 2020.
Invalidity Contentions Exhibit D4, *Ultravision* v *Holophane*, ED Texas, Apr. 7, 2020.
Invalidity Contentions Exhibit D5, *Ultravision* v *Holophane*, ED Texas, Apr. 7, 2020.
Invalidity Contentions Exhibit D6, *Ultravision* v *Holophane*, ED Texas, Apr. 7, 2020.
Invalidity Contentions Exhibit D7, *Ultravision* v *Holophane*, ED Texas, Apr. 7, 2020.
Invalidity Contentions Exhibit D8, *Ultravision* v *Holophane*, ED Texas, Apr. 7, 2020.
Invalidity Contentions Exhibit D9, *Ultravision* v *Holophane*, ED Texas, Apr. 7, 2020.
Invalidity Contentions Exhibit D10, *Ultravision* v *Holophane*, ED Texas, Apr. 7, 2020.
Invalidity Contentions Exhibit D11, *Ultravision* v *Holophane*, ED Texas, Apr. 7, 2020.
Invalidity Contentions Exhibit D12, *Ultravision* v *Holophane*, ED Texas, Apr. 7, 2020.
Invalidity Contentions Exhibit D13, *Ultravision* v *Holophane*, ED Texas, Apr. 7, 2020.
Invalidity Contentions Exhibit D14, *Ultravision* v *Holophane*, ED Texas, Apr. 7, 2020.
Invalidity Contentions Exhibit D15, *Ultravision* v *Holophane*, ED Texas, Apr. 7, 2020.
Invalidity Contentions Exhibit D16, *Ultravision* v *Holophane*, ED Texas, Apr. 7, 2020.
Invalidity Contentions Exhibit D17, *Ultravision* v *Holophane*, ED Texas, Apr. 7, 2020.
Invalidity Contentions Exhibit E1, *Ultravision* v *Holophane*, ED Texas, Apr. 7, 2020.
Invalidity Contentions Exhibit E2, *Ultravision* v *Holophane*, ED Texas, Apr. 7, 2020.
Invalidity Contentions Exhibit E3, *Ultravision* v *Holophane*, ED Texas, Apr. 7, 2020.
Invalidity Contentions Exhibit E4, *Ultravision* v *Holophane*, ED Texas, Apr. 7, 2020.
Invalidity Contentions Exhibit E5, *Ultravision* v *Holophane*, ED Texas, Apr. 7, 2020.
Invalidity Contentions Exhibit E6, *Ultravision* v *Holophane*, ED Texas, Apr. 7, 2020.
Invalidity Contentions Exhibit E7, *Ultravision* v *Holophane*, ED Texas, Apr. 7, 2020.
Invalidity Contentions Exhibit E8, *Ultravision* v *Holophane*, ED Texas, Apr. 7, 2020.
Invalidity Contentions Exhibit E9, *Ultravision* v *Holophane*, ED Texas, Apr. 7, 2020.
Invalidity Contentions Exhibit E10, *Ultravision* v *Holophane*, ED Texas, Apr. 7, 2020.
Invalidity Contentions Exhibit E11, *Ultravision* v *Holophane*, ED Texas, Apr. 7, 2020.
Invalidity Contentions Exhibit E12, *Ultravision* v *Holophane*, ED Texas, Apr. 7, 2020.
Invalidity Contentions Exhibit E13, *Ultravision* v *Holophane*, ED Texas, Apr. 7, 2020.
IPR2020-01638, U.S. Pat. No. 10,223,946, filed Sep. 18, 2020.
IPR2020-01638, U.S. Pat. No. 10,223,946, filed Sep. 18, 2020, Exhibit 1001.
IPR2020-01638, U.S. Pat. No. 10,223,946, filed Sep. 18, 2020, Exhibit 1010.
IPR2020-01638, U.S. Pat. No. 10,223,946, filed Sep. 18, 2020, Exhibit 1011.
IPR2020-01638, U.S. Pat. No. 10,223,946, filed Sep. 18, 2020, Exhibit 1012.
IPR2020-01638, U.S. Pat. No. 10,223,946, filed Sep. 18, 2020, Exhibit 1013.
IPR2020-01638, U.S. Pat. No. 10,223,946, filed Sep. 18, 2020, Exhibit 1014.
IPR2020-01638, U.S. Pat. No. 10,223,946, filed Sep. 18, 2020, Exhibit 1015.
IPR2020-01638, U.S. Pat. No. 10,223,946, filed Sep. 18, 2020, Exhibit 1016.
IPR2020-01638, U.S. Pat. No. 10,223,946, filed Sep. 18, 2020, Exhibit 1017.
IPR2020-01638, U.S. Pat. No. 10,223,946, filed Sep. 18, 2020, Exhibit 1018.
IPR2020-01638, U.S. Pat. No. 10,223,946, filed Sep. 18, 2020, Exhibit 1019.
IPR2020-01638, U.S. Pat. No. 10,223,946, filed Sep. 18, 2020, Exhibit 1002.
IPR2020-01638, U.S. Pat. No. 10,223,946, filed Sep. 18, 2020, Exhibit 1020.
IPR2020-01638, U.S. Pat. No. 10,223,946, filed Sep. 18, 2020, Exhibit 1021.
IPR2020-01638, U.S. Pat. No. 10,223,946, filed Sep. 18, 2020, Exhibit 1003.
IPR2020-01638, U.S. Pat. No. 10,223,946, filed Sep. 18, 2020, Exhibit 1004.
IPR2020-01638, U.S. Pat. No. 10,223,946, filed Sep. 18, 2020, Exhibit 1005.
IPR2020-01638, U.S. Pat. No. 10,223,946, filed Sep. 18, 2020, Exhibit 1006.
IPR2020-01638, U.S. Pat. No. 10,223,946, filed Sep. 18, 2020, Exhibit 1007.
IPR2020-01638, U.S. Pat. No. 10,223,946, filed Sep. 18, 2020, Exhibit 1008.
IPR2020-01638, U.S. Pat. No. 10,223,946, filed Sep. 18, 2020, Exhibit 1009.

LIGHTING ASSEMBLY WITH LEDS AND OPTICAL ELEMENTS

CROSS-REFERENCE TO RELATED APPLICATIONS

This is a continuation of U.S. patent application Ser. No. 16/459,127, filed Jul. 1, 2019, which is a continuation of U.S. patent application Ser. No. 15/939,565, filed Mar. 29, 2018, which is a continuation of U.S. patent application Ser. No. 15/676,823, filed Aug. 14, 2017, which is a continuation of U.S. patent application Ser. No. 15/162,278, filed May 23, 2016, which is a continuation of U.S. patent application Ser. No. 14/992,680, filed Jan. 11, 2016, which is a continuation of U.S. patent application Ser. No. 14/635,907, filed Mar. 2, 2015, which is a continuation of U.S. patent application Ser. No. 13/836,517, filed Mar. 15, 2013, which claims the benefit of U.S. Provisional Application No. 61/677,346, filed on Jul. 30, 2012, which applications are hereby incorporated herein by reference.

The following patents and applications are related:
U.S. Pat. Appl. No. 61/677,340, filed Jul. 20, 2012
U.S. Pat. Appl. No. 61/677,346, filed Jul. 30, 2012
U.S. Pat. Appl. No. 61/677,352, filed Jul. 30, 2012
U.S. patent application Ser. No. 13/836,517, filed Mar. 15, 2013 (now U.S. Pat. No. 8,974,077)
U.S. patent application Ser. No. 13/836,612, filed Mar. 15, 2013 (now U.S. Pat. No. 8,870,410)
U.S. patent application Ser. No. 13/836,710, filed Mar. 15, 2013 (now U.S. Pat. No. 9,062,873)
U.S. patent application Ser. No. 14/137,306, filed Dec. 30, 2013 (now U.S. Pat. No. 8,985,806)
U.S. patent application Ser. No. 14/137,343, filed Dec. 20, 2013 (now U.S. Pat. No. 8,870,413)
U.S. patent application Ser. No. 14/137,380, filed Dec. 20, 2013 (now U.S. Pat. No. 9,068,738)
U.S. patent application Ser. No. 14/630,500, filed Feb. 24, 2015 (now U.S. Pat. No. 9,812,043))
U.S. patent application Ser. No. 14/635,907, filed Mar. 2, 2015 (now U.S. Pat. No. 9,234,642)
U.S. patent application Ser. No. 14/706,634, filed May 7, 2015 (now U.S. Pat. No. 9,212,803)
U.S. patent application Ser. No. 14/968,520, filed Dec. 14, 2015 (now U.S. Pat. No. 9,589,488)
U.S. patent application Ser. No. 14/992,680, filed Jan. 11, 2016 (now U.S. Pat. No. 9,349,307)
U.S. patent application Ser. No. 15/162,278, filed May 23, 2016 (now U.S. Pat. No. 9,734,737)
U.S. patent application Ser. No. 15/208,483, filed Jul. 12, 2016 (now U.S. Pat. No. 9,514,663)
U.S. patent application Ser. No. 15/208,521, filed Jul. 12, 2016 (now U.S. Pat. No. 9,524,661)
U.S. patent application Ser. No. 15/216,562, filed Jul. 21, 2016 (now U.S. Pat. No. 9,659,511)
U.S. patent application Ser. No. 15/216,595, filed Jul. 21, 2016 (now U.S. Pat. No. 9,542,870)
U.S. patent application Ser. No. 15/413,277, filed Jan. 23, 2017 (now U.S. Pat. No. 9,734,738)
U.S. patent application Ser. No. 15/413,306, filed Jan. 23, 2017 (now U.S. Pat. No. 9,732,932)
U.S. patent application Ser. No. 15/429,320, filed Feb. 10, 2017 (now U.S. Pat. No. 9,685,102)
U.S. patent application Ser. No. 15/627,089, filed Jun. 19, 2017 (now U.S. Pat. No. 10,410,551)
U.S. patent application Ser. No. 15/676,823, filed Aug. 14, 2017 (now U.S. Pat. No. 9,947,248)
U.S. patent application Ser. No. 15/939,565, filed Mar. 29, 2018 (now U.S. Pat. No. 10,339,841)
U.S. patent application Ser. No. 15/969,511 filed May 2, 2018 (now U.S. Pat. No. 10,223,946)
U.S. patent application Ser. No. 15/969,392, filed May 2, 2018 (co-pending)
U.S. patent application Ser. No. 16/241,067, filed Jan. 7, 2019 (now U.S. Pat. No. 10,460,624)
U.S. patent application Ser. No. 16/459,127, filed Jul. 1, 2019 (co-pending)

TECHNICAL FIELD

The following disclosure relates to lighting systems and, more particularly, to lighting systems using light emitting diodes to externally illuminate signs.

SUMMARY

The present invention, in one aspect thereof, comprises a back panel for use in a light emitting diode (LED) lighting assembly. An extruded substrate formed of a thermally conductive material is provided, the substrate having a plurality of fins extending from a first side of the substrate, each of the fins having a substantially rectangular shape oriented so that a longitudinal axis of the fin is substantially parallel to a longitudinal axis of the substrate. At least some of the fins include a hole formed through the fin to enable heated air to rise through the fins. A plurality of LEDs are mounted on a second side of the substrate, and oriented in a longitudinal orientation with the fins oriented parallel to the bottom edge of a surface to be illuminated, such that heat rises perpendicular to the surface of the fin.

BRIEF DESCRIPTION OF THE DRAWINGS

For a more complete understanding, reference is now made to the following description taken in conjunction with the accompanying drawings in which.

DETAILED DESCRIPTION OF ILLUSTRATIVE EMBODIMENTS

Billboards, such as those commonly used for advertising in cities and along roads, often have a picture and/or text that must be externally illuminated to be visible in low-light conditions. As technology has advanced and introduced new lighting devices such as the light emitting diode (LED), such advances have been applied to billboards. However, current lighting designs have limitations and improvements are needed. Although billboards are used herein for purposes of example, it is understood that the present disclosure may be applied to lighting for any type of sign that is externally illuminated.

Figure 1A:
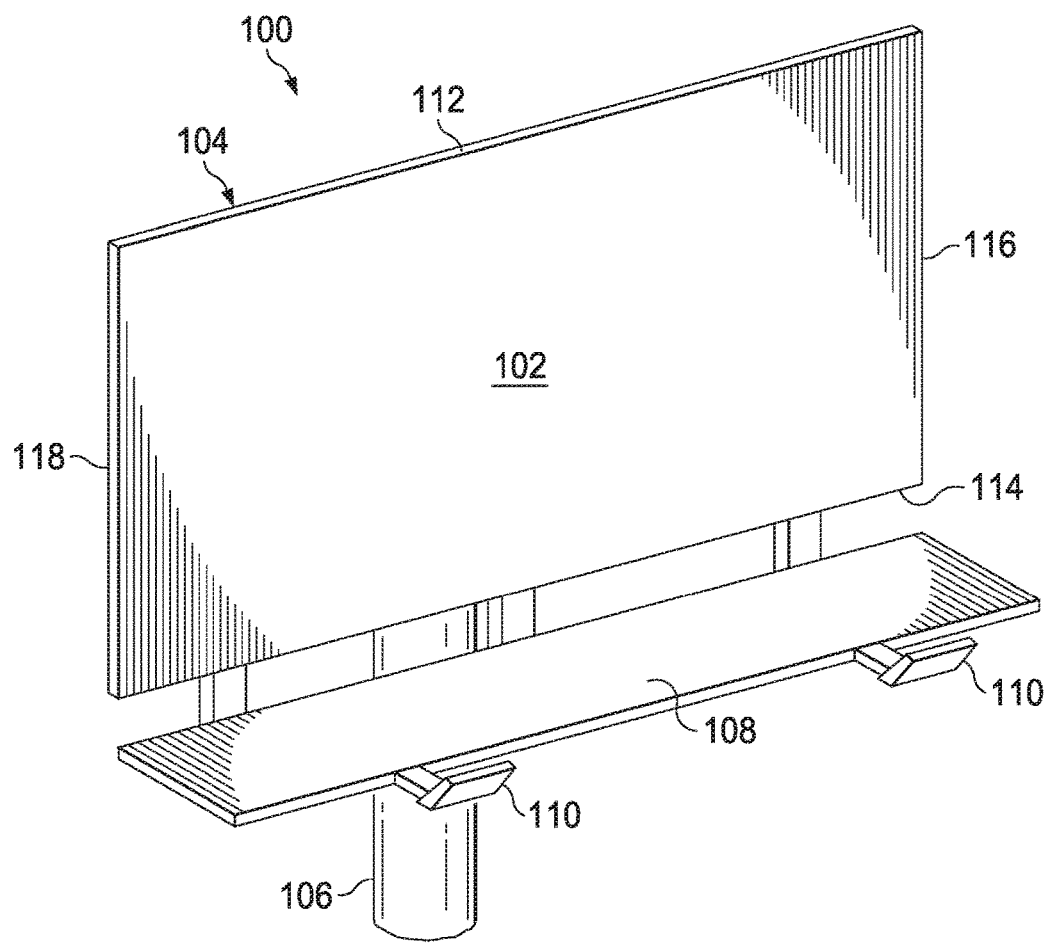
FIG. 1A illustrates one embodiment of a billboard that may be externally lighted by one or more lighting assemblies.

Referring to FIG. 1A, one embodiment of a billboard 100 is illustrated. The billboard 100 includes a surface 102 onto which a picture and/or text may be painted, mounted, or otherwise affixed. The surface 102 may be any size, such as a commonly used size having a width of forty-eight feet wide and a height of fourteen feet. The surface 102 may be provided by placing a backing material on a frame 104 made of steel and/or other materials. The frame 104 may be mounted on one or more support poles 106, which may be considered part of the frame 104 or separate from the frame 104. The billboard 100 may include a walkway or other support structure 108 that enables the surface 102 to be more easily accessed.

One or more lighting assemblies 110 may be coupled to the walkway 108 (e.g., to a safety rail or to the walkway itself) and/or to another structural member of the billboard 100 to illuminate some or all of the surface 102 in low light conditions. The lighting assembly 110 may be mounted at or near a top edge 112 of the billboard 100, a bottom edge 114 of the billboard 1000, a right edge 116 of the billboard 100, and/or a bottom edge 118 of the billboard 100. The lighting assembly 110 may be centered (e.g., located in approximately the center of the billboard 100) or off center as illustrated in FIG. 1A.

Figure 1B:
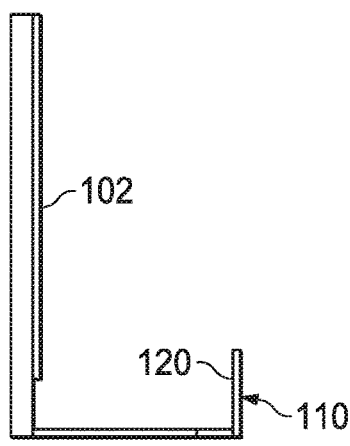
FIGS. 1B-1D illustrate embodiments of angular positions of the lighting assembly of FIG. 1 relative to the billboard.
Figure 1C:
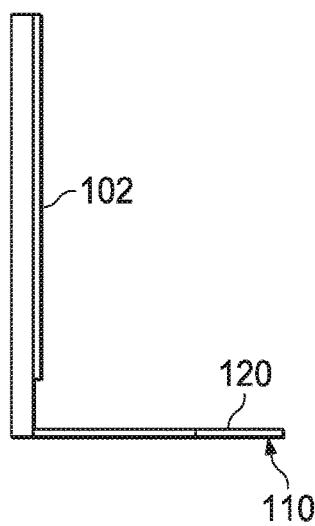
Figure 1D:
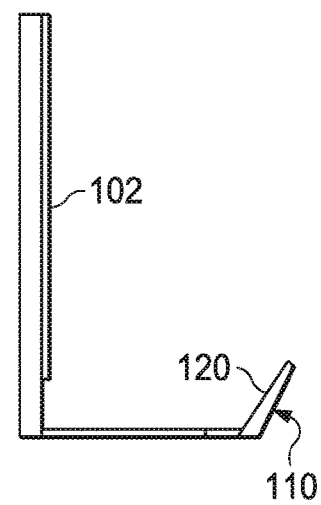

With additional reference to FIGS. 1B-1D, a surface 120 of the lighting assembly 110 may be parallel with respect to the surface 102 of the billboard 100 (FIG. 1B), may be perpendicular with respect to the surface 102 (FIG. 1C), or may be angled with respect to the surface 102 (FIG. 1D). It is understood that the lighting assembly 110 may be placed in many different orientations and locations relative to the billboard 100 and to one another, and the illustrated positions are only for purposes of example. Furthermore, it is understood that references to "top," "bottom," "left," and "right" are used in the present disclosure for purposes of description and do not necessarily denote a fixed position. For example, the billboard 100 may be turned on end, and the referenced "top," "bottom," "left," and "right" edges may still be readily identifiable although the "top" edge would be the "left" edge or the "right" edge.

One problem with current lighting technology is that it can be difficult to direct light only onto the surface 102 and even more difficult to do so evenly. This may be due partly to the placement of the lighting assembly 110, as shown in FIGS. 1B-1D. As the lighting assembly 110 is off center relative to the surface 102, light emitted from the lighting assembly 110 may not evenly strike the surface 102. One problem with uneven illumination is that certain parts of the surface 102 may be more brightly illuminated than other parts. This creates "hot spots" that may be undesirable. Attempting to evenly illuminate the surface 102 may cause light to be directed past the edges 112, 114, 116, and 118 as attempts are made to balance out hot spots in particular areas. However, light that does not strike the surface 102 is wasted and may create problems (e.g., light pollution), as well as waste illumination that could be used for the surface 102.

In addition to the difficulties of evenly illuminating the surface 102, the use of LEDs in an exterior lighting environment involves issues such as heat dissipation and protecting the LEDs against environmental conditions such as moisture. The presence of moving mechanical features such as fans that may be used to provide increased airflow for cooling may create additional reliability problems. Due to the difficulty and expense of replacing and/or repairing the lighting assembly 110 in combination with the desire to provide consistent lighting while minimizing downtime, such issues should be addressed in a manner that enhances reliability and uptime.

Figure 2:
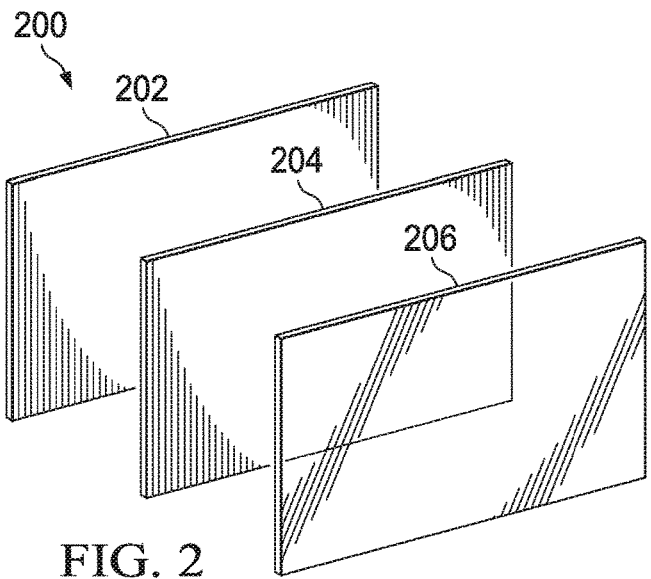
FIG. 2 illustrates one embodiment of a lighting assembly that may be used to light the billboard of FIG. 1.

Referring to FIG. 2, one embodiment of a lighting assembly 200 is illustrated. The lighting assembly 200 provides a more detailed embodiment of the lighting assembly 110 of FIG. 1. The lighting assembly 200 includes a back panel 202, a light panel 204 (e.g., a printed circuit board (PCB)) having a plurality of LEDs (not shown) mounted thereon, and an optics panel 206. As will be described below in more detailed examples, light from the LEDs of the light panel 204 may be directed by the optics panel 206 to illuminate the surface 102 of the billboard 100 of FIG. 1. The back panel 202 may be configured to serve as a supporting substrate for the light panel 204 and optics panel 206, as well as to dissipate heat produced by the LEDs.

It is understood that any of the back panel 202, light panel 204, and optics panel 206 may actually be two or more physical substrates rather than a single panel as illustrated in FIG. 2. Furthermore, it is understood that there may be additional panels positioned behind the back panel 202, in front of the optics panel 206, and/or between the back panel 202 and light panel 204 and/or between the light panel 204 and optics panel 206.

Figure 3B:
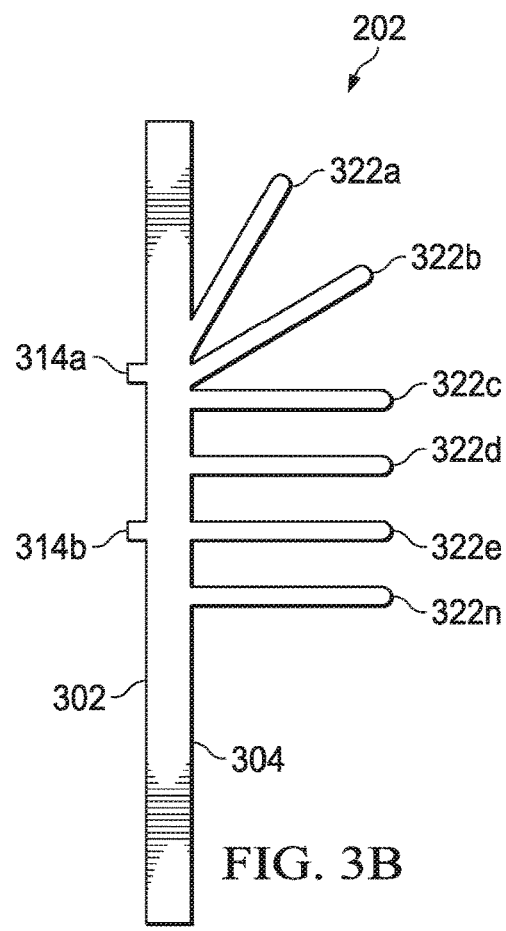
FIGS. 3A and 3B illustrate one embodiment of a back panel that may be used in the lighting assembly of FIG. 2.
Figure 3A:
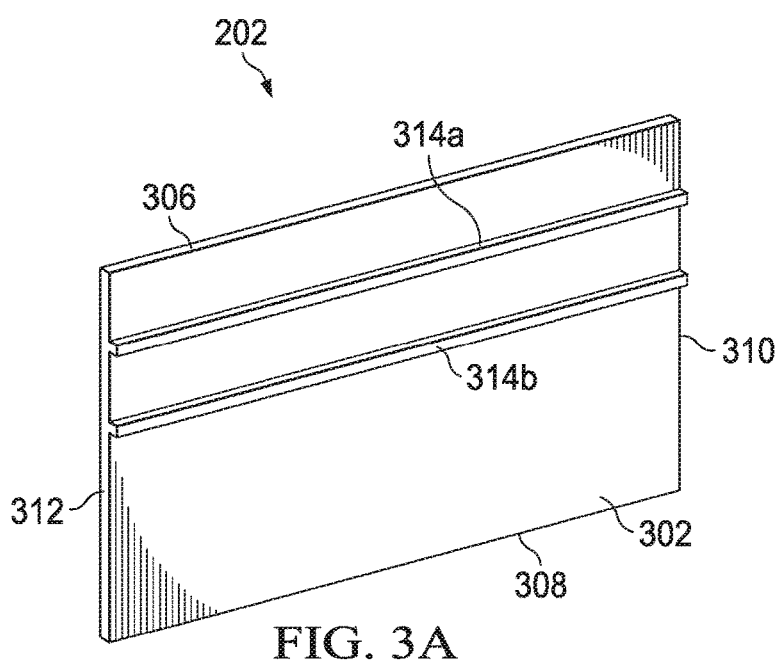
Figure 3C:
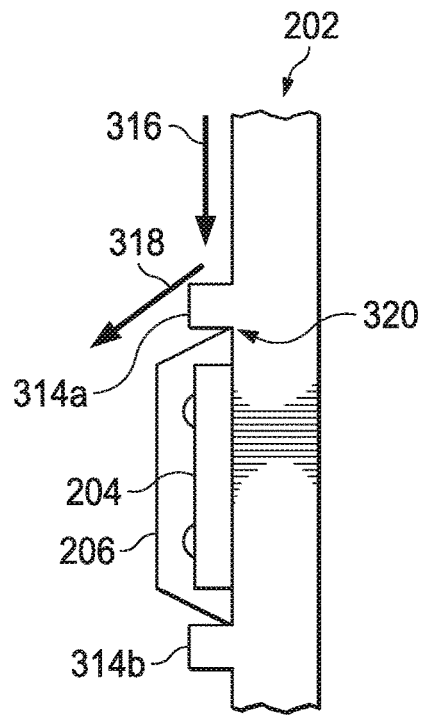
FIG. 3C illustrates one embodiment of the back panel of FIGS. 3A and 3B with a light panel and an optics panel that may also be used in the lighting assembly of FIG. 2.

Referring to FIGS. 3A-3C, one embodiment of the back panel 202 is illustrated with a front surface 302 and a back surface 304. The back panel 202 includes a top edge 306, a bottom edge 308, a right edge 310, and a left edge 312. The panel 202 may be formed of one or more thermally conductive materials (e.g., aluminum) and/or other materials.

The front surface 302 provides a mounting surface for the light panel 204. In some embodiments, the front surface 302 of the panel 202 may include one or more protrusions 314a and 314b that are substantially parallel to the top edge 306. The protrusions 314a and 314b may be configured to protect the light panel 204 from moisture. Although only two protrusions 314a and 314b are illustrated, it is understood that a single protrusion may be provided or three or more protrusions may be provided. Furthermore, such protrusions may vary in length, shape (e.g., may have angled or curved surfaces), orientation, and/or location on the front surface 302.

Referring specifically to FIG. 3C, a light panel 204 and an optical panel 206 may be mounted under the protrusion 314a (FIG. 3C). Moisture running down the front surface 302 in the direction of arrow 316 may strike the protrusion 314a and be directed away from the light panel 204 and optical panel 206 as shown by arrow 318. Although not shown, moisture may also be directed length down the protrusion 314a. Accordingly, protrusion 314a may serve as a gutter and aid in directing moisture away from a joint 320 where the optical panel 206 abuts the front surface 302. This may be beneficial even when a moisture resistant compound is used to seal the joint 320. In embodiments where there are multiple light panels 204 arranged vertically on the front surface 302, there may be a protrusion positioned above each light panel 204. For example, the protrusion 314a may be positioned directly above one light panel 204 and the protrusion 314b may be positioned directly above another light panel 204.

Referring specifically to FIG. 3B, the back surface 304 may be configured to increase heat dissipation. For example, the back surface 304 may be configured with a heat sink provided by fins 322a-322N, where N denotes a total number of fins. The fins 322a-322N increase the surface area of the back surface 304, thereby providing for additional heat dissipation to the surrounding air. The fins 322a-322N may be formed as part of the panel 202 or may be otherwise coupled to the panel 202 (e.g., may be part of a discrete heat sink that is coupled to the back surface 304). Some or all of the fins 322a-322N may be angled, as shown by fins 322a and 322b. In some embodiments, holes (not shown) may be provided in some or all of the fins 322a-322N to aid in air circulation. In such embodiments, the holes may cause a chimney effect in which heated air rises through the holes and is replaced by cooler air. This may be particularly effective in environments where natural air movement is limited.

Figure 4B:
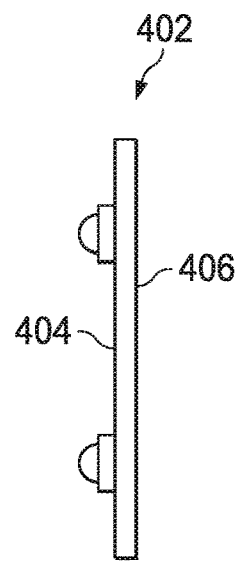
FIGS. 4A and 4B illustrate one embodiment of a light panel that may be used with the lighting assembly of FIG. 2.
Figure 4A:
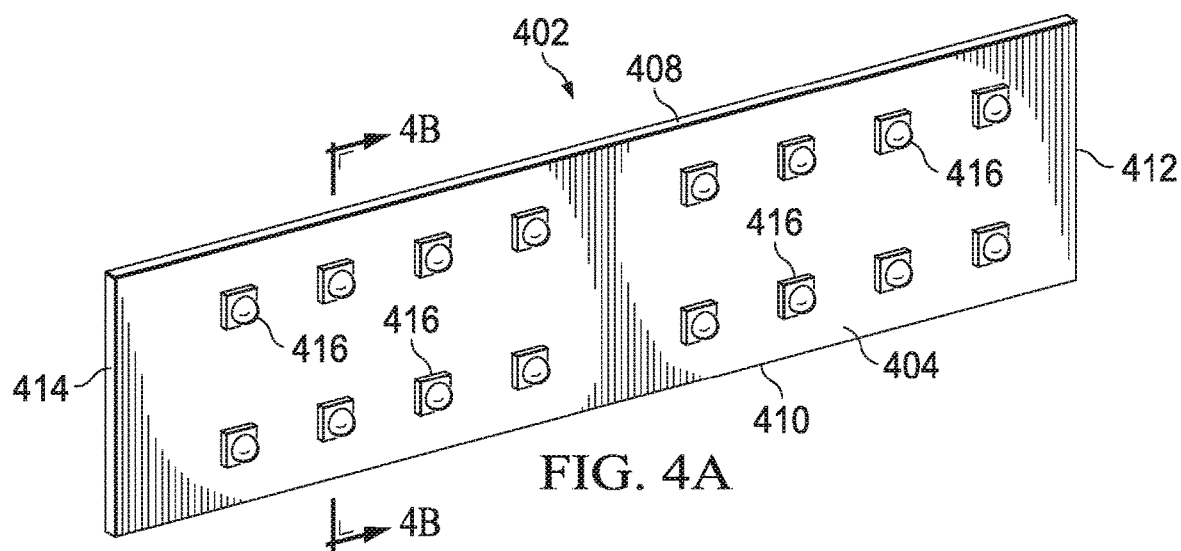

Referring to FIGS. 4A and 4B, one embodiment of a single PCB 402 of the light panel 204 is illustrated. In the present example, the light panel 204 may include multiple PCBs 402, although it is understood that any number of PCBs may be used based on design issues such as the amount of illumination needed, the amount of illumination provided by a single PCB 402, the size of the surface 102 of the billboard 100, and/or other factors. As shown in the present embodiment with a substantially rectangular cross-section, the PCB 402 includes a front surface 404, a back surface 406, a top edge 408, a bottom edge 410, a right edge 412, and a left edge 414.

The PCB 402 may include one or more strings of LEDs 416, with multiple LEDs 416 in a string. For example, a string may include eight LEDs 416 and each PCB 402 may include two strings for a total of sixteen LEDs 416. In this configuration, a light panel 204 having eight PCBs 402 would include ninety-six LEDs 416. It is understood that although the PCBs 402 are shown as being substantially identical, they may be different in terms of size, shape, and other factors for a single light panel 204.

In the present example, the LEDs 416 are surface mounted, but it is understood that the LEDs 416 may be coupled to the panel 204 using through hole or another coupling process. The surface mounted configuration may ensure that a maximum surface area of each LED 416 is in contact with the PCB 402, which is in turn in contact with the back panel 202 responsible for heat dissipation. Each string of LEDs may receive a constant current with the current divided evenly among the LEDs 416.

Referring to FIGS. 5A, 5B, 5C and 5D, one embodiment of a single lens panel 500 of the optics panel 206 is illustrated. In the present example, the optics panel 206 may include multiple lens panels 500, although it is understood that any number of lens panels may be used based on design issues such as the number, arrangement, and orientation of the LEDs 416, the size of the surface 102, and/or other factors. As shown in the present embodiment with a substantially rectangular cross-section that is configured for use with the PCB 402 of FIG. 4, a single lens panel 500 includes a front surface 502, a back surface 504, a top side 506, a bottom side 508, a right side 510, and a left side 512. The sides 506, 508, 510, and 512 may form a cavity into which the PCB 402 may fit, thereby providing protection for the PCB 402 from environmental conditions such as moisture.

Figure 5A:
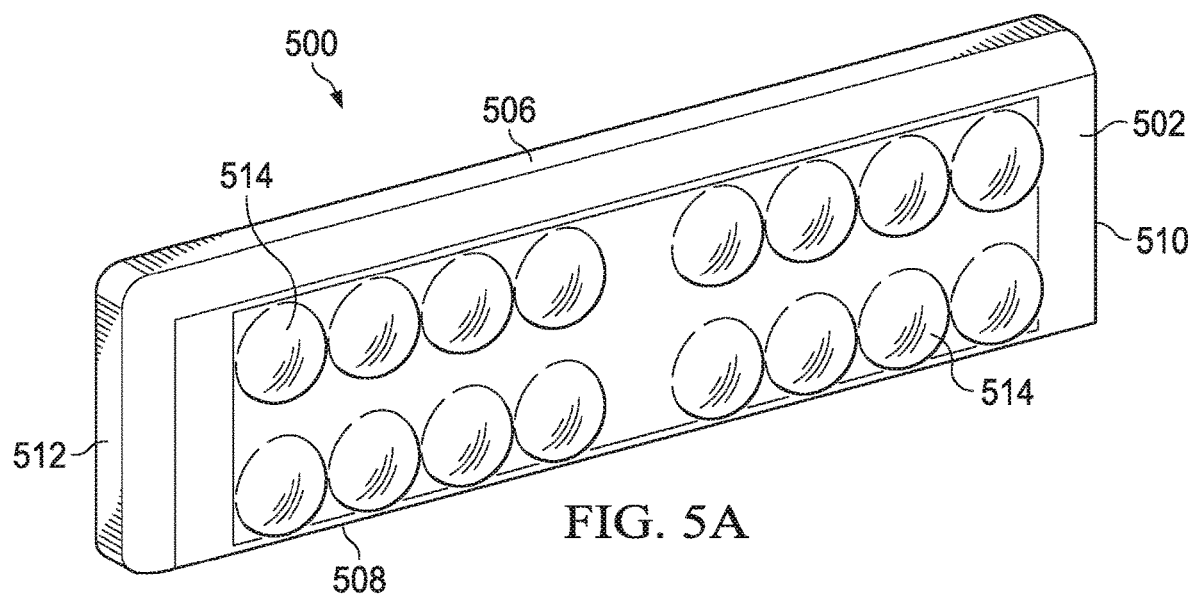
FIGS. 5A, 5B, 5C and 5D illustrate one embodiment of an optics panel that may be used with the lighting assembly of FIG. 2.
Figure 5C:
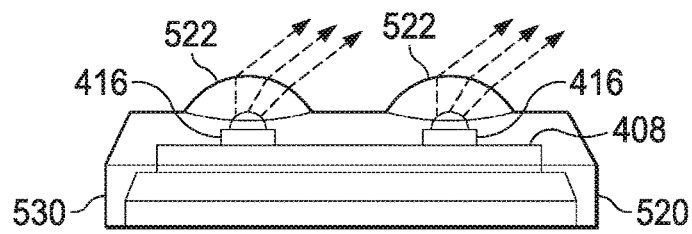
Figure 5B:
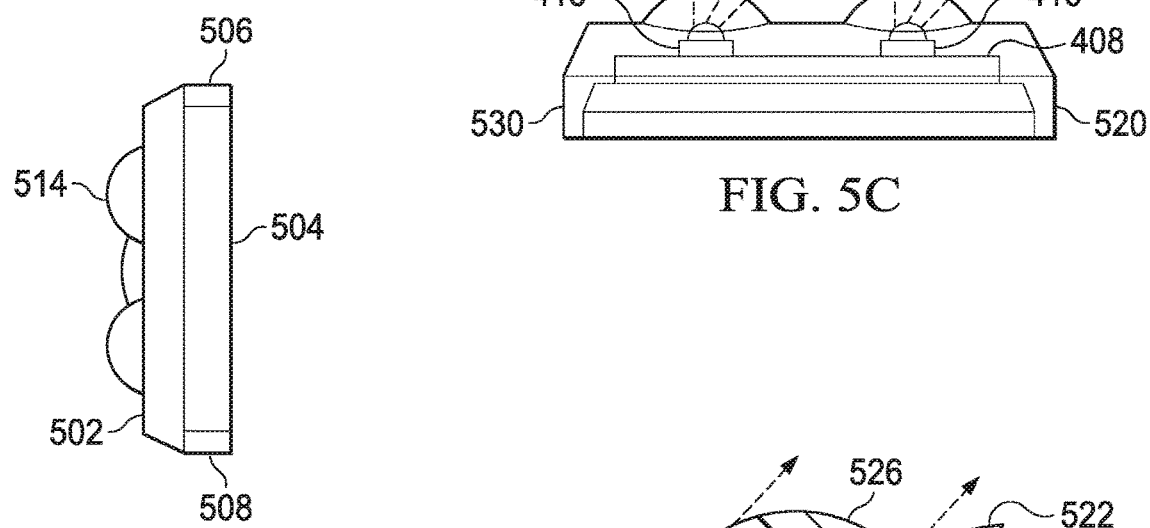

The lens panel 500 may include a beveled or angled top side 506 and/or bottom side 508 as illustrated in FIG. 5B. The beveling/angling may aid in preventing moisture from reaching the PCB 402 under the lens panel 500, as water will more readily flow from the area of the joint 320 (FIG. 3C) due to the angled surface than if the top side 50o6 was relatively flat.

The lens panel 500 may include multiple optical elements 514. A single optical element 514 may be provided for each LED 416, a single optical element 514 may be provided for multiple LEDs 416, and/or multiple optical elements 514 may be provided for a single LED 416. In some embodiments, the optical elements 514 may be provided by a single multi-layer optical element system provided by the lens panel 500.

In the present example, the optical elements 514 are configured so that the light emitted from each LED 416 is projected onto the entire surface 102 of the billboard 100. In other words, if all other LEDs 416 were switched off except for a single LED 416, the entire surface 102 would be illuminated at the level of illumination provided by the single LED 416. In one embodiment, the rectangular target area of the surface 102 would be evenly illuminated by the LED 416, while areas beyond the edges 112, 114, 116, and 118 would receive no illumination at all or at least a minimal amount of illumination from the LED 416. What is meant by "evenly" is that the illumination with a uniformity that achieves a 3:1 ratio of the average illumination to the minimum. Thus, by designing the lens in such a manner, when all LEDs are operating, the light form the collective thereof will illuminate the surface at the 3:1 ratio. When one or more LEDs fail, the overall illumination decreases, but the uniformity maintains the same uniformity. Also, as described hereinabove, the "surface" refers to the surface that is associated with a particular LED panel. It may be that an overall illuminated surface is segmented and multiple panels are provided, each associated with a particular segment.

FIG. 5C illustrates a detail of the lens assembly. Each of the diodes 416 is mounted on the board 408 at a minimum distance. Overlying the board and LEDs 416 is transparent lens substrate 520. This substrate 520 has a plurality of lens structures 522, each associated with one of the LEDs 416, such that each of the LEDs 416 has the light emitted therefrom directed outward towards the surface, each lens structure being substantially the same. The minimum distance is designed such that overlapping light from adjacent LEDs does not create interference patterns and result in dead spots on the surface. The lens structure 522 is designed to create the 3:1 uniformity and also, the lens structure is designed to "direct" the light from an edge of the surface to cover the entire surface. This is shown by the angle of the light rays in FIG. 5C. Also, the beveled edge 530 will basically surround the PCB 402, thus protecting it from moisture. The lens substrate 520 is secured with screws (not shown).

Figure 5D:
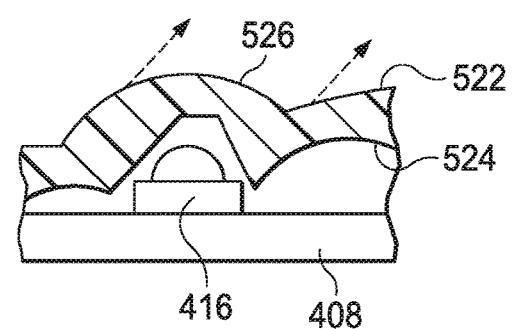

FIG. 5D illustrates a detail of the lens structure 522. This structure includes an interior surface 524 and an exterior surface 526 that shapes and directs the light in the correct pattern. This is an acrylic material. With such a design, the lighting assembly can be disposed at an edge of the surface to illuminate the entire surface.

In some embodiments, as shown in FIG. 1, two lighting assemblies 110 may be used. Each lighting assembly may be powered by a separate power supply (not shown), and may be configured to illuminate the entire surface 102. In such an embodiment, if one power supply fails, the remaining lighting assembly 110 will still illuminate the entire surface 102, although at a lesser intensity than when both lighting assemblies 110 are functioning. This provides evenly distributed illumination when both lighting assemblies 110 are functioning correctly, and continues to provide evenly distributed illumination when one lighting assembly 110 malfunctions. Accordingly, the entire surface 102 of the billboard 100 may be illuminated even when an entire lighting assembly 110 has malfunctioned and is providing no illumination at all due to the redundancy provided by configuration of the lighting assemblies 110.

Furthermore, in some embodiments as described above, each LED 416 of a single lighting assembly 110 may be configured via the optical elements 514 to illuminate the entire surface 102. In such embodiments, if one or more LEDs 416 or strings of LEDs fails, the remaining LEDs 416 will still illuminate the entire surface 102, although at a lesser intensity than when the failed LEDs 416 are functioning. This provides evenly distributed illumination when all LEDs 416 are functioning correctly, and continues to provide evenly distributed illumination when one or more LEDs are malfunctioning. Accordingly, the billboard 100 may be illuminated even when multiple LEDs 416 have malfunctioned and are providing no illumination at all due to the redundancy provided by configuration of the lighting assemblies 110.

It is understood that some embodiments may direct substantially all illumination from a lighting assembly 110 evenly across the surface 102 while some illumination is not evenly distributed. For example, substantially all LEDs 416 may be directed to each evenly illuminate the surface 102 with the exception of a relatively small number of LEDs 416. In such cases, the illumination provided by the remaining LED or LEDs 416 may be directed to one or more portions of the surface 102. If done properly, this may be accomplished while minimizing any noticeable unevenness in the overall illumination, even if one of the remaining LEDs 416 malfunctions. For example, the lighting assembly 110 may be configured to direct the illumination provided by one LED 416 to only the left half of the surface 102, while directing the illumination from another LED 416 to only the right half of the surface 102. The loss of one of these two LEDs may not noticeably impact the illumination of the surface 102. It is understood that such variations are within the scope of this disclosure.

In embodiments where the illumination is evenly distributed across the surface 102, it is understood that the optics panel 206 may be configured specifically for the light panel 204 and the surface 102. For example, assuming the surface 102 is forty-eight feet wide and sixteen feet high, the lens panel 500 of FIG. 5 may be specifically designed for use with the PCB 402 of FIG. 4. This design may be based on the particular layout of the PCB 402 (e.g., the number and arrangement of the LEDs 416), the amount of illumination provided by the LEDs 416, the size of the surface 102, the distance between the lens panel 500 and the surface 102, the angle at which the lens panel 500 is mounted relative to the surface 102 (e.g., FIGS. 1B-1D), and/or other factors. Accordingly, changes in any of these factors may entail a change in the design of the lens panel 500 in order to again evenly distribute the illumination provided by each LED 416 across the entire surface 102. It is understood that various standard configurations of the lighting assembly 110 may be developed for various billboard and/or other externally illuminated signs so that a particular configuration may be provided based on the parameters associated with a particular billboard and/or externally illuminated sign.

Figure 6A:
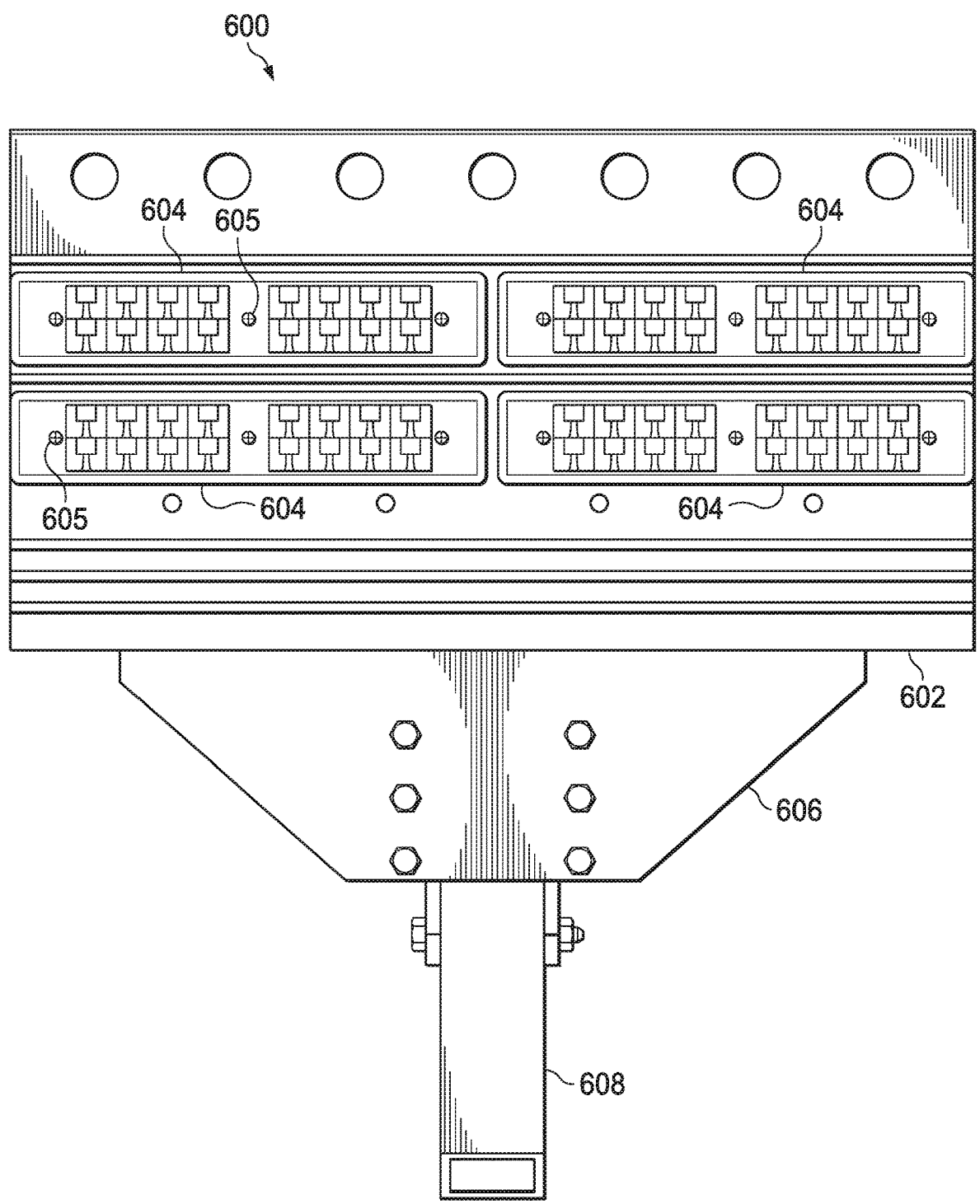
FIGS. 6A-6C illustrate a more detailed embodiment of the lighting assembly of FIG. 2.
Figure 6B:
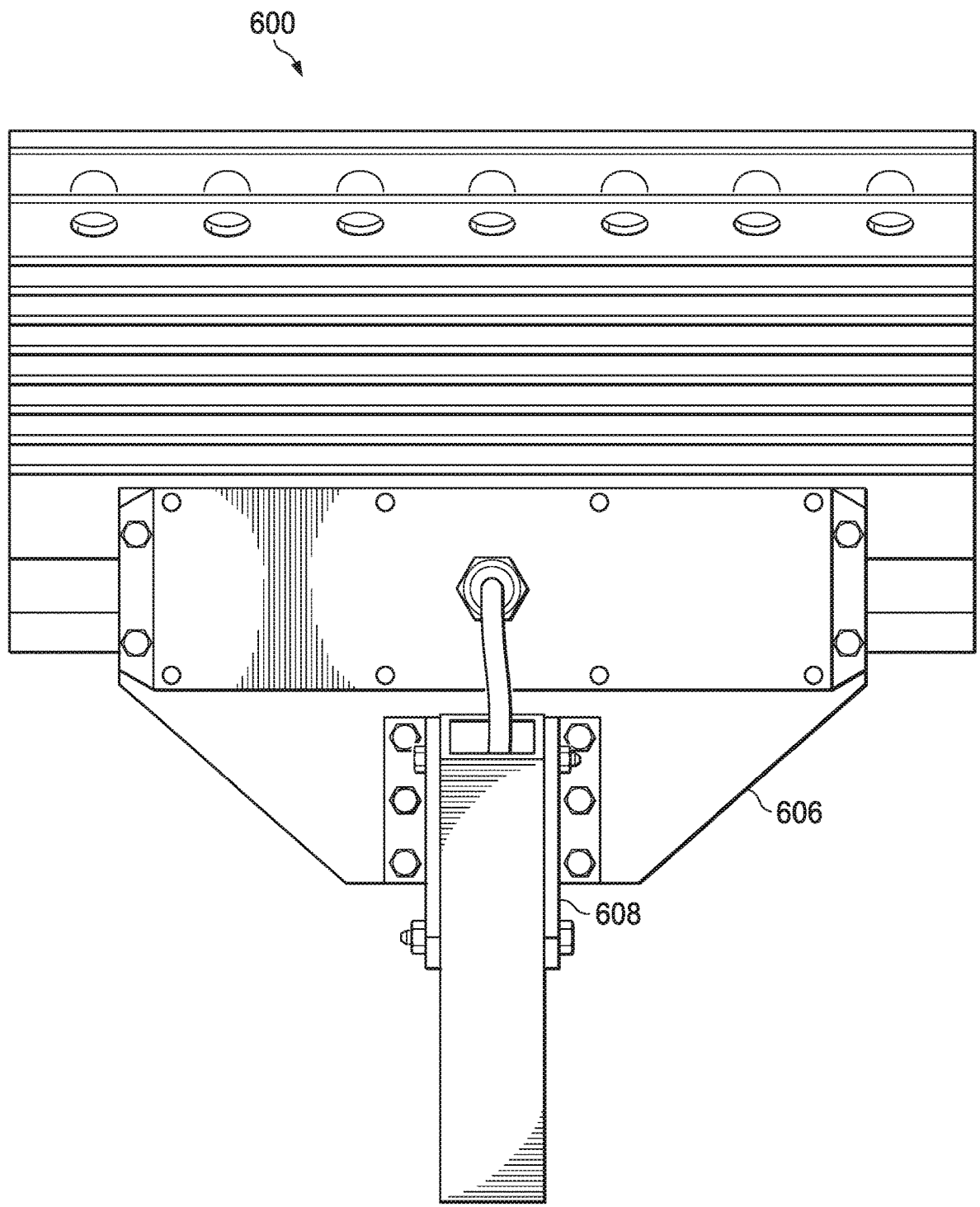
Figure 6C:
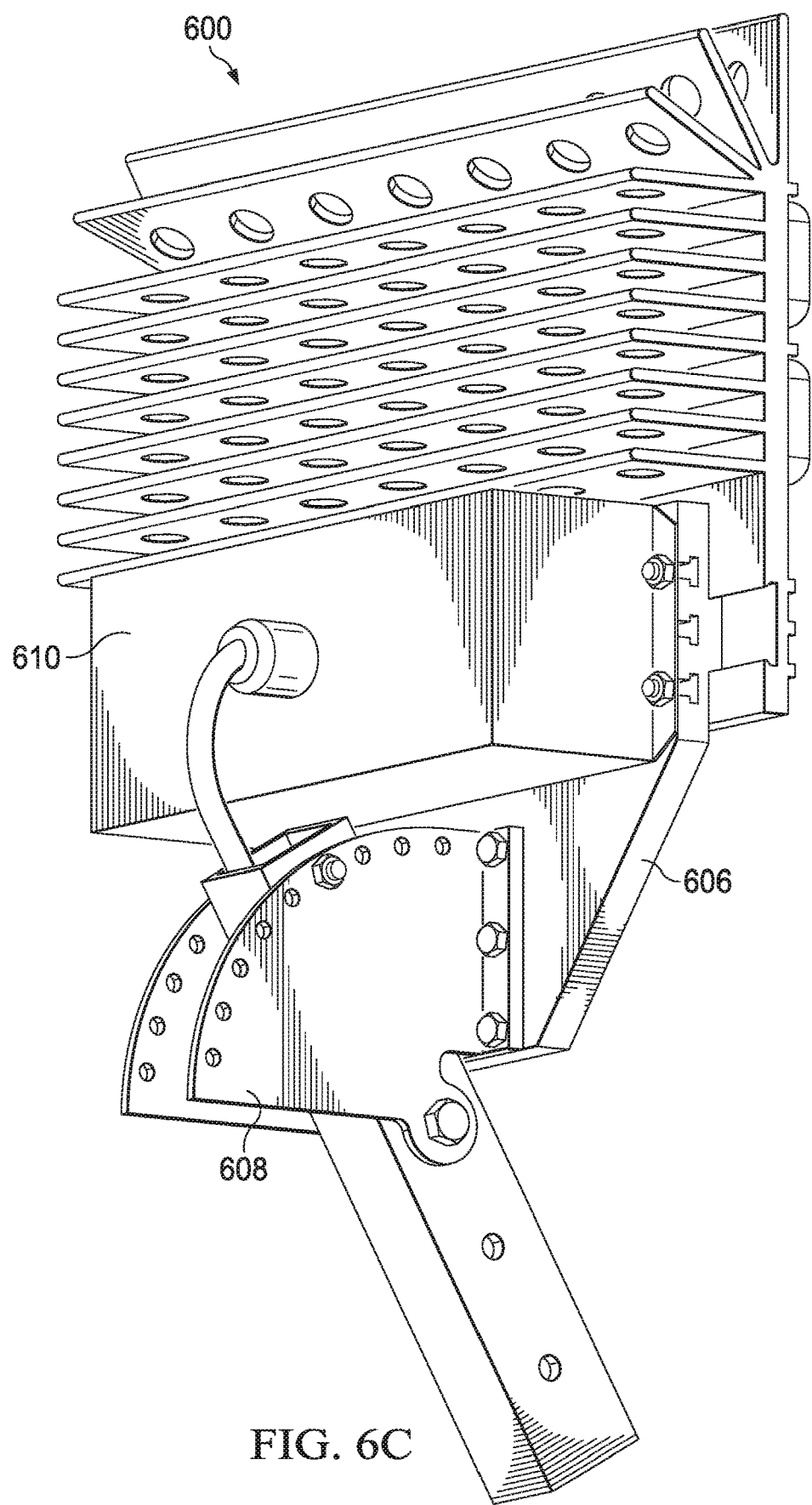

Referring to FIGS. 6A-6C, one embodiment of a lighting assembly 600 is illustrated that provides a more detailed embodiment of the lighting assembly 200 of FIG. 2. The lighting assembly 600 includes a back panel 602, a light panel formed by multiple LED assemblies (denoted by reference number 800 in FIG. 8A), and an optics panel formed by multiple lens panels 604. Accordingly, as described previously, the light panel 204 in the current example is represented by multiple LED assemblies 800 and the optics panel 206 is represented by multiple lens panels 604. In the present embodiment, the lighting assembly 600 includes four LED assemblies 800 and four lens panels 604.

Although various attachment mechanisms (e.g., threaded screws, bolts, and/or other fasteners) may be used to coupled the lens panels and LED assemblies to the back panel 602, the present embodiment uses multiple threaded fasteners 605 (e.g., screws) that extend through the lens panels and the LED assemblies and engage threaded holes in the back panel 602.

The lighting assembly 600 is also illustrated with a mounting plate 606 that couples to the back panel 602 and to an adjustable mounting bracket 608. The adjustable mounting bracket 608 may be used to couple the lighting assembly 600 to a portion of the billboard 100 (FIG. 1) and/or to another support member. A power supply enclosure 610 may be coupled to the mounting plate 606 and configured contain a power supply (not shown) capable of supplying power to LEDs of the LED assemblies 800. It is noted that separating the power supply from the back panel 602 may aid in heat dissipation by the back panel 602 as it does not have to dissipate heat from the power supply to the same extent as if the power supply was mounted directly to the back panel 602.

The location of the power supply may also be beneficial as snow not melted by the heat produced by the LED may be melted by heat produced by the power supply. This may aid in reducing snow buildup on the LEDs.

Figure 7A:
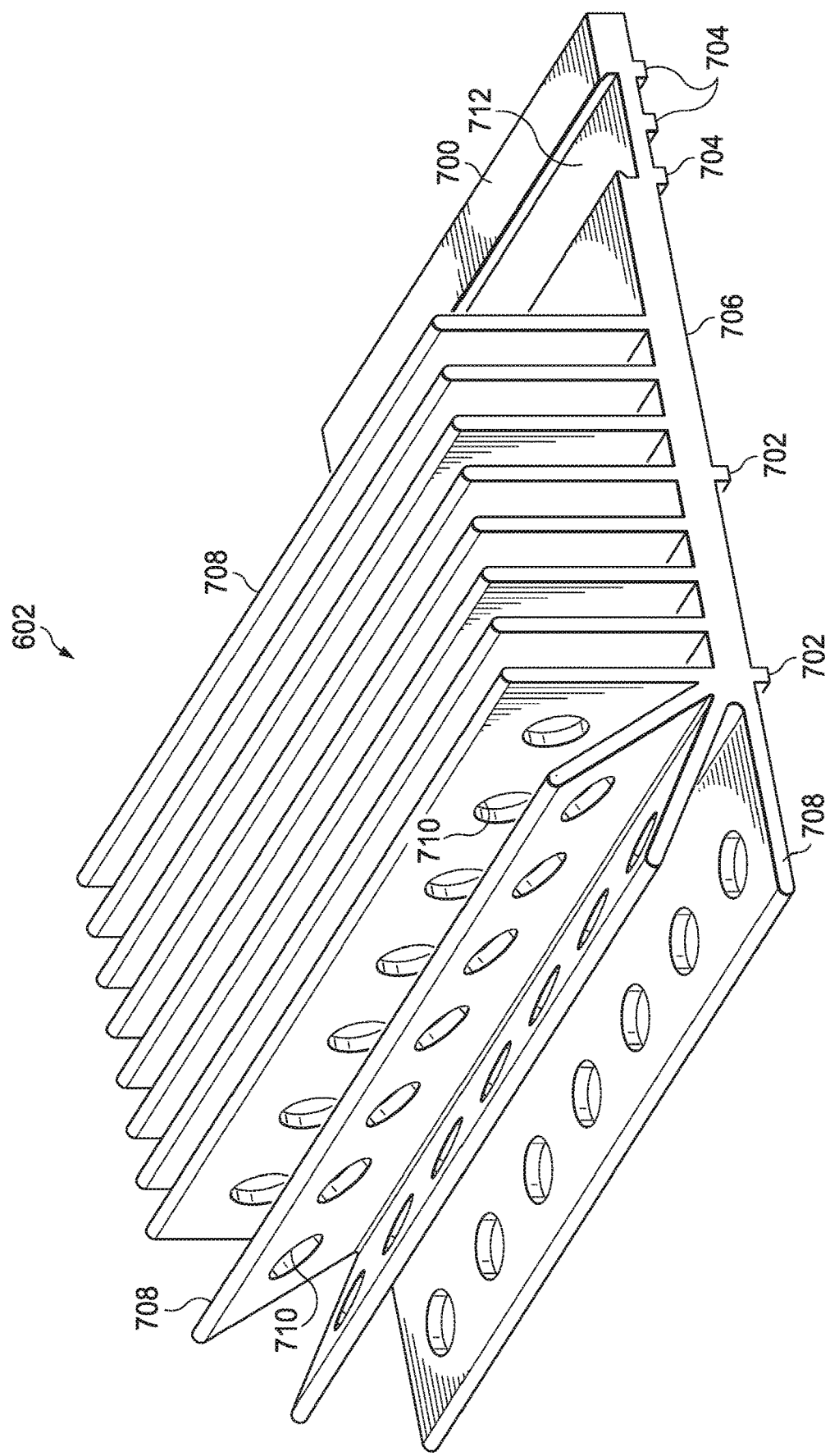
FIGS. 7A and 7B illustrate an embodiment of a back panel that may be used with the lighting assembly of FIGS. 6A-6C.
Figure 7B:
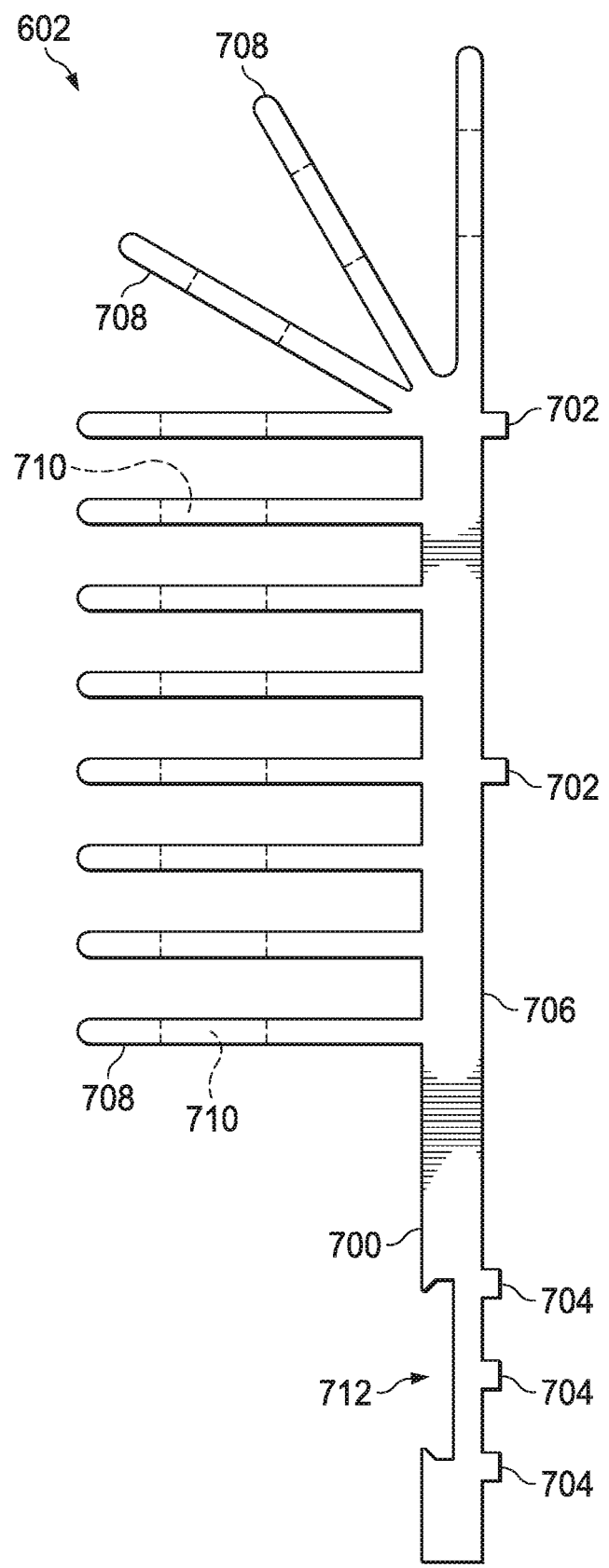

With additional reference to FIGS. 7A and 7B, one embodiment of the back panel of FIG. 602 is illustrated. A front surface 700 includes multiple protrusions 702 that may be configured to protect the light panels (not shown) against moisture as previously described. The front surface 700 may include additional protrusions 704.

A back surface 706 includes multiple fins 708 that form a heat sink to aid in the dissipation of heat from the back panel 602. In the present example, the fins 708 are substantially rectangular in shape. In the present example, the back panel 602 is extruded and the fins 708 run parallel to the top edge with a longitudinal axis of each fin 708 being substantially parallel to a longitudinal axis of the back panel 602. Forming the fins 708 in a vertical manner is possible, but may increase the cost of the back panel 602 due to the extrusion process. As shown, the fins 708 may be substantially perpendicular to the back surface 706, and/or may be angled. In the present example, the fins 708 are angled such that near the top of the back panel 702, the fins 708 are angled towards the top.

Because the fins 708 are parallel to the top edge, heat may be trapped due to its inability to rise vertically. Accordingly, holes 710 may be present in some or all of the fins 708 (marked but not actually visible in the side view of FIG. 7B) to provide paths for the heat to rise vertically in spite of the orientation of the fins 708. The holes 710 may create a chimney effect that increases air flow across the fins 708 and aids in the cooling process. In some embodiments, some or all of the fins 708 may be angled such that heat is not trapped.

The back surface 706 may also include a groove 712 that is configured to receive a tongue of the mounting plate 606 in a tongue-in-groove manner.

With additional reference to FIGS. 8A-8J, embodiments of a single LED assembly 800 and a single lens panel 604 that may be used with the lighting assembly 600 are illustrated. As shown, the single LED assembly 800 and the single optics panel 604 may be configured for use together.

Figure 8A:
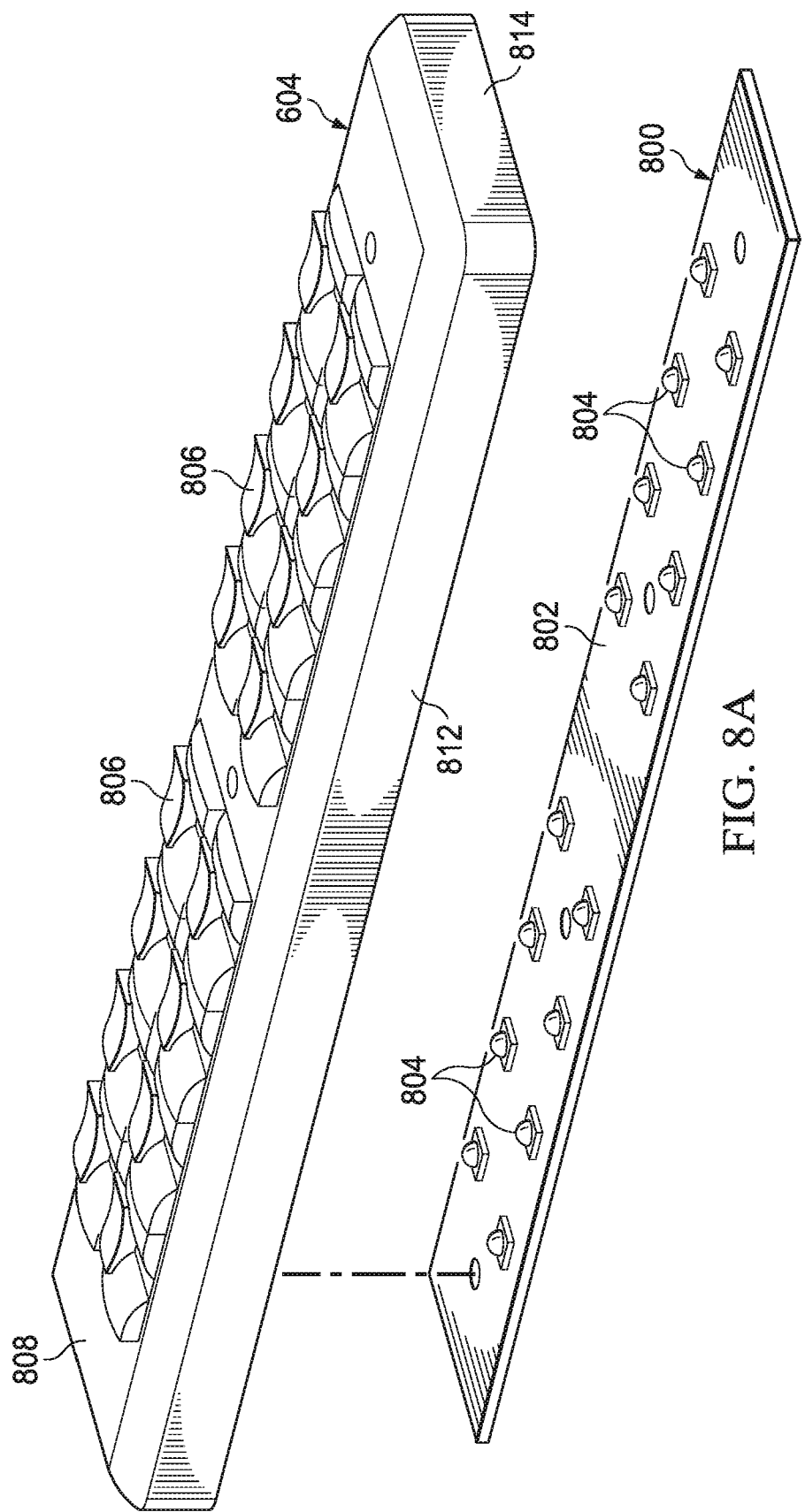
FIG. 8A illustrates an embodiment of an LED assembly and an optics panel that may be used with the lighting assembly of FIG. 6.
Figure 8B:
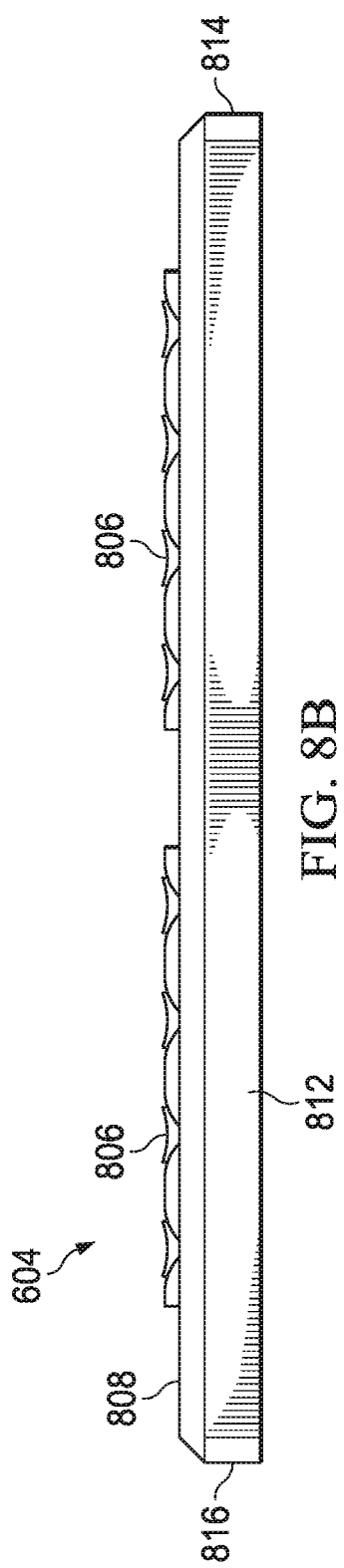
FIGS. 8B-8J illustrates embodiments of the optics panel of FIG. 8A and optical elements that may be used to form part of the optics panel.
Figure 8C:
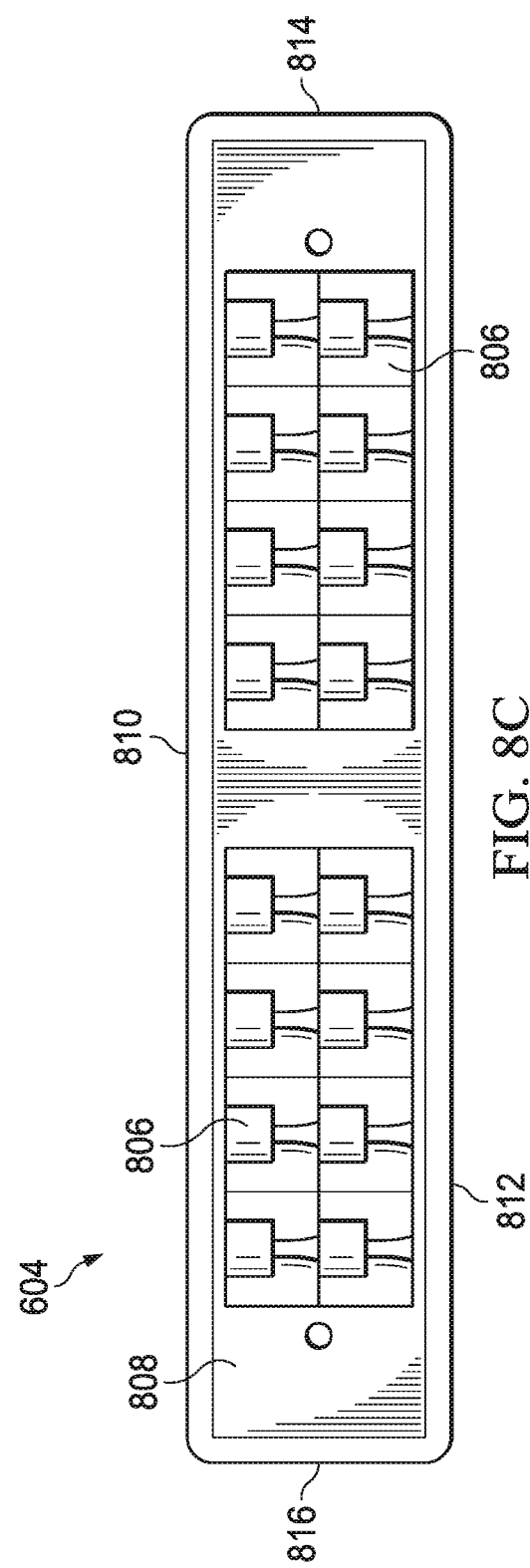
Figure 8G:
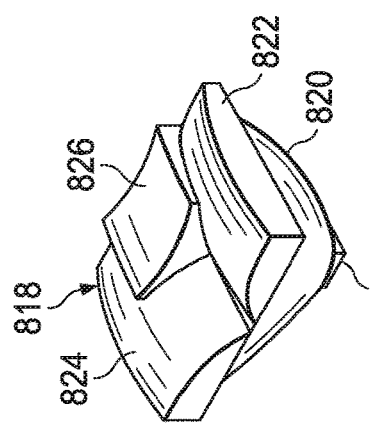
Figure 8F:
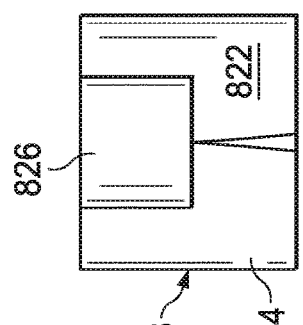
Figure 8E:
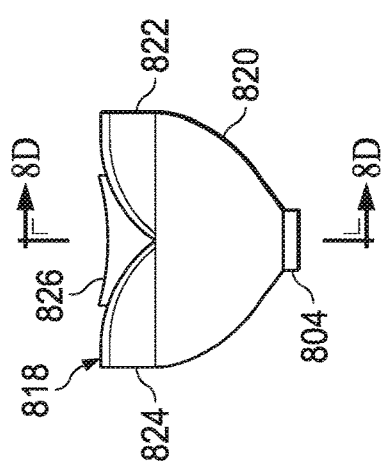
Figure 8D:
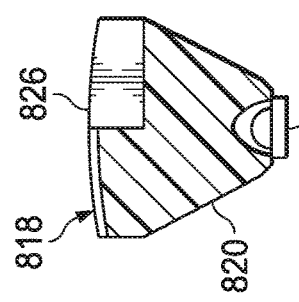
Figure 8J:
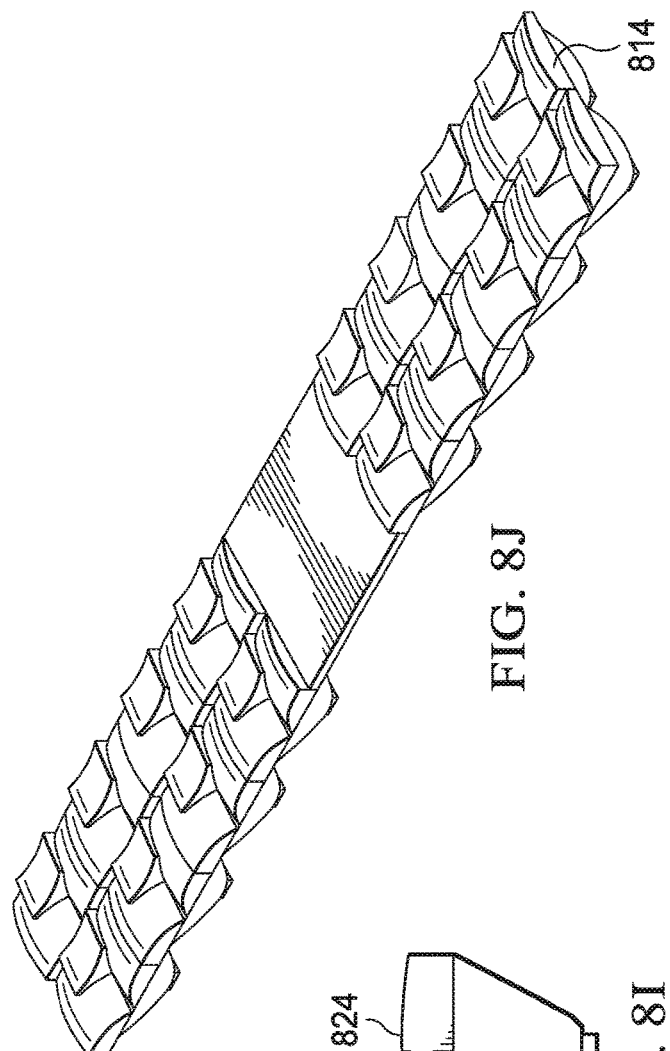
Figure 8I:
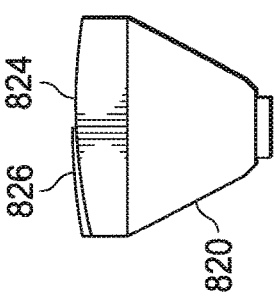
Figure 8H:
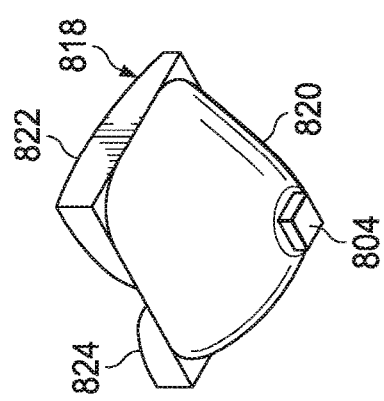

Referring specifically to FIG. 8A, the LED assembly 800 includes a substrate 802 (e.g., a PCB) onto which are mounted multiple LEDs 804. In the present example, the LED assembly 800 includes two strings of eight LEDs 804 each for a total of sixteen LEDs 804. It is understood that this is merely an example, and there may be more or fewer LEDs 804 on the light panel 800, and the LEDs 804 may be arranged in many different ways on the substrate 802.

Referring also to FIGS. 8B-8J, the optics panel 604 may include optical elements 806 arranged on an upper surface 808 of the optics panel 604. The optics panel 604 may further include sides 810, 812, 814, and 816 that are configured to fit around the edge of the substrate 802 of the light panel 800. The bottom edge of each side 810, 812, 814, and 816 abuts the front surface 700 of the back panel 602 and may be sealed to the front surface 700 using a moisture resistant sealant.

As shown in FIGS. 8D-8H, a single optical element 806 may include multiple lens elements designed to distribute the illumination provided by a single LED 804 across a surface such as the surface 102 of FIG. 1. A first lens element 820 may be positioned proximate to the LED 804, and additional lens elements 822, 824, and 826 may be positioned above the lens element 820. Multiple optical elements 806 may be combined and formed as a single optics panel 604 that is configured to operate with the LED assembly 800.

Figure 9:
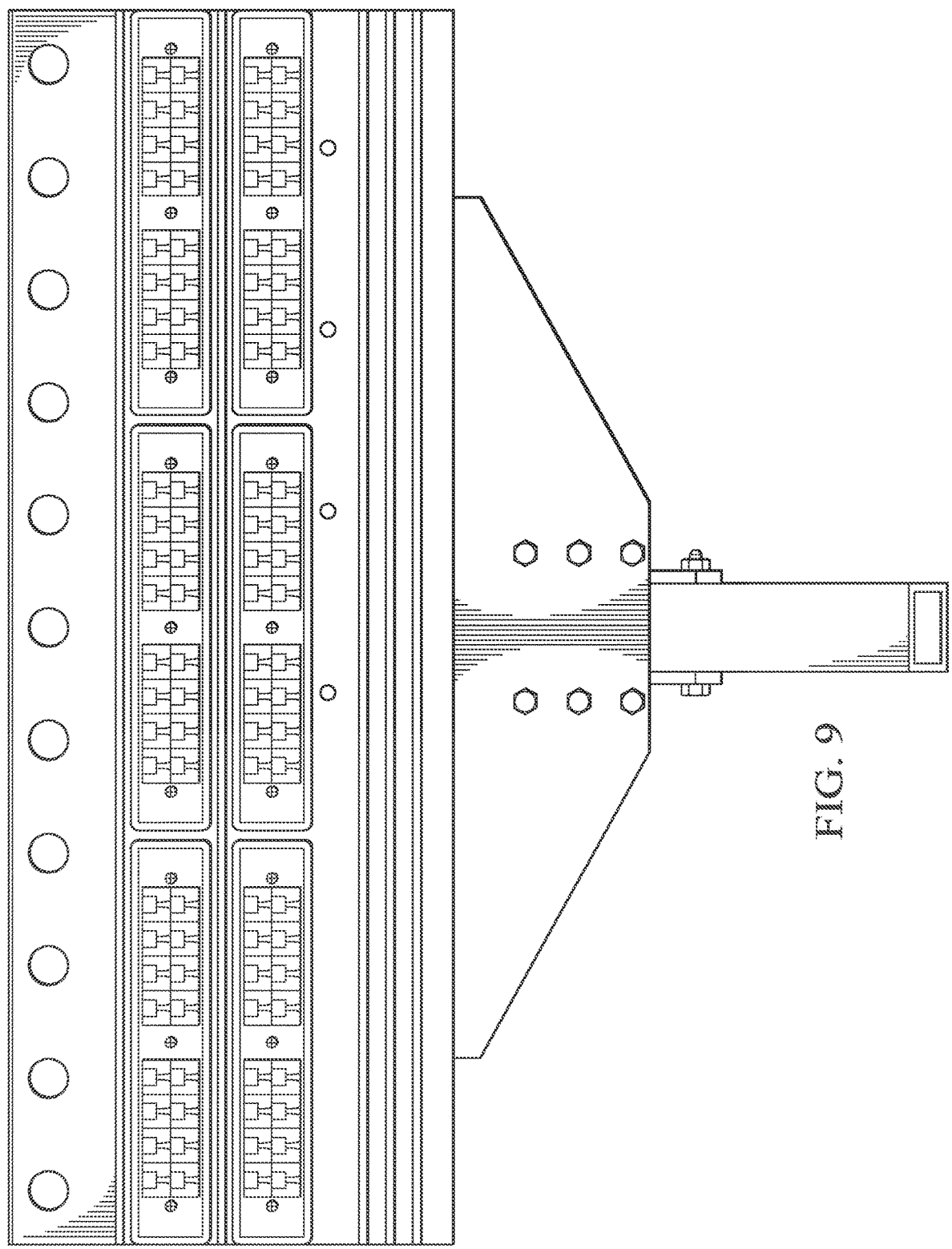
FIG. 9 illustrates a more detailed embodiment of the lighting assembly of FIG. 2.

Referring to FIG. 9, another embodiment of a lighting assembly 900 is illustrated that provides a more detailed embodiment of the lighting assembly 200 of FIG. 2. The lighting assembly 900 is similar to the lighting assembly 600 of FIG. 6, but includes six LED assemblies rather than the four six LED assemblies of the lighting assembly 600. It is understood that the lighting assembly 900 may require a larger power supply than the lighting assembly 600 (e.g., a one hundred and fifty watt power supply instead of a one hundred and twenty watt power supply).

Although the preferred embodiment has been described in detail, it should be understood that various changes, substitutions and alterations can be made therein without departing from the spirit and scope of the invention as defined by the appended claims.

What is claimed is:

1. A lighting apparatus comprising:
   a circuit board;
   a plurality of light emitting diodes (LEDs) attached to the circuit board, the LEDs being arranged in an array of row and columns, wherein all of the LEDs attached to the circuit board are arranged in a single plane;
   a support substrate supporting the circuit board, the support structure made of a thermally conductive material and configured to dissipate heat during operation of the LEDs; and
   a plurality of optical elements configured to redirect light from the plurality of LEDs, each optical element being substantially the same as all other optical elements and configured to shape and direct light in a rectangular waveform, wherein each LED is associated with a single optical element and each optical element is associated with a single LED, wherein each optical element comprises a convex portion at least partially overlying the associated LED, and wherein the optical elements are part of an outer surface that forms an exposed surface of the lighting apparatus;
   wherein the lighting apparatus is configured so that when all of the LEDs are operating a substantially rectangular surface that is off-center relative to the lighting apparatus is illuminated with an illumination level and a uniformity; and
   wherein failure of one or more of the LEDs will cause the illumination level of light impinging the substantially rectangular surface to decrease while the uniformity of light impinging the substantially rectangular surface remains substantially the same.

2. The lighting apparatus of claim 1, further comprising an adjustable mount connected to the support structure, the adjustable mount having an angle of tilt that ranges between 0 degrees and 45 degrees.

3. The lighting apparatus of claim 1, wherein the optical elements and the support structure are sealed to protect the LEDs from rainwater.

4. The lighting apparatus of claim 1, wherein the support structure is directly exposed to the outside atmosphere.

5. The lighting apparatus of claim 1, wherein the optical elements are integrated into a single substrate so that all LEDs attached to the circuit board are between the single substrate and the circuit board.

6. The lighting apparatus of claim 1, wherein the optical elements are integrated into a light panel that comprises a plurality of substrates.

7. The lighting apparatus of claim 1, further comprising a 150 watt power supply electrically coupled to the LEDs.

8. The lighting apparatus of claim 1, further comprising a 120 watt power supply electrically coupled to the LEDs.

9. The lighting apparatus of claim 1, wherein each optical element comprises a first portion, a second portion and a third portion.

10. The lighting apparatus of claim 1, wherein each optical element includes a first portion and a second portion, the second portion intersects with the first portion in a region between the first portion and the second portion, wherein the first portion and the second portion are shaped so that at least one surface normal of the first portion intersects with at least one surface normal of the second portion.

11. The lighting apparatus of claim 10, wherein each optical element further includes a third portion that extends beyond the region between the first portion and the second portion in a direction away from the circuit board.

12. The lighting apparatus of claim 1, wherein each optical element of the plurality of optical elements includes a first portion, a second portion, and a third portion;
   wherein the first portion of each optical element is configured to redirect light from the associated LED in the first lateral direction;

wherein the second portion of each optical element is configured to redirect light from the associated LED in the second lateral direction; and wherein the third portion of each optical element is configured to redirect light from the first and second portions in the third direction so that the light is directed asymmetrically in the third direction so as to illuminate the rectangular surface off-center relative to the lighting apparatus.

13. The lighting apparatus of claim 1, wherein the lighting apparatus is configured to illuminate the surface in a manner that does not create interference patterns or result in dead spots.

14. The lighting apparatus of claim 1, wherein the lighting apparatus is configured to illuminate the surface in a manner that avoids light pollution.

15. The lighting apparatus of claim 1, wherein the lighting apparatus is configured to evenly illuminate the surface.

16. The lighting apparatus of claim 15, wherein the lighting apparatus is configured to illuminate the surface with a 3:1 ratio of average illumination to minimum illumination.

17. The lighting apparatus of claim 16, wherein each LED is configured to illuminate the entire surface with a 3:1 ratio of average illumination to minimum illumination.

18. The lighting apparatus of claim 1, wherein the lighting apparatus is configured to illuminate the substantially rectangular surface being parallel to the circuit board.

19. A lighting apparatus comprising:
a circuit board;
a plurality of light emitting diodes (LEDs) attached to the circuit board, the LEDs being arranged in an array of row and columns, wherein all of the LEDs attached to the circuit board are arranged in a single plane;
a heat sink thermally coupled to the circuit board, the heat sink made of a thermally conductive material and configured to dissipate heat during operation of the LEDs; and
a plurality of optical elements configured to redirect light from the plurality of LEDs, each optical element being substantially the same as all other optical elements and configured to shape and direct light in a rectangular waveform, wherein each LED is associated with a single optical element and each optical element is associated with a single LED and wherein each optical element is configured to direct light from each LED away from the circuit board so as to illuminate a same substantially rectangular surface that is off-center relative to the lighting apparatus, the substantially rectangular surface having an edge that is at least 14 feet in length.

20. The lighting apparatus of claim 19, wherein the lighting apparatus is configured so that when all of the LEDs are operating, the substantially rectangular surface is illuminated with an illumination level and a uniformity, and wherein failure of one or more of the LEDs will cause the illumination level of light impinging the substantially rectangular surface to decrease while the uniformity of light impinging the substantially rectangular surface remains substantially the same.

21. The lighting apparatus of claim 19, wherein the optical elements are part of an outer surface that forms an exposed surface of the lighting apparatus.

22. The lighting apparatus of claim 19, wherein the optical elements are integrated into a single substrate so that all LEDs attached to the circuit board are between the single substrate and the circuit board.

23. The lighting apparatus of claim 19, wherein the lighting apparatus is configured to illuminate the substantially rectangular surface being parallel to the circuit board.

24. The lighting apparatus of claim 19, wherein the lighting apparatus is configured to illuminate the surface in a manner that does not create interference patterns or result in dead spots and in a manner that avoids light pollution.

25. The lighting apparatus of claim 19, wherein the length of the edge of the substantially rectangular surface is at least 24 feet.

26. The lighting apparatus of claim 19, wherein the lighting apparatus is configured to evenly illuminate the surface.

27. The lighting apparatus of claim 26, wherein the lighting apparatus is configured to illuminate the surface with a 3:1 ratio of average illumination to minimum illumination.

28. The lighting apparatus of claim 27, wherein each LED is configured to illuminate the entire surface with a 3:1 ratio of average illumination to minimum illumination.

29. A lighting apparatus comprising:
a circuit board;
a plurality of light emitting diodes (LEDs) attached to the circuit board, the LEDs being arranged in an array of row and columns, wherein all of the LEDs attached to the circuit board are arranged in a single plane;
a heat sink thermally coupled to the circuit board, the heat sink made of a thermally conductive material and configured to dissipate heat during operation of the LEDs; and
a plurality of optical elements configured to redirect light from the plurality of LEDs, each optical element being substantially the same as all other optical elements and configured to shape and direct light in a rectangular waveform;
wherein each LED is associated with a single optical element and each optical element is associated with a single LED;
wherein the lighting apparatus is configured so that when all of the LEDs are operating, a substantially rectangular surface is illuminated with an illumination level and a uniformity;
wherein failure of one or more of the LEDs will cause the illumination level of light impinging the substantially rectangular surface to decrease while the uniformity of light impinging the substantially rectangular surface remains substantially the same;
wherein the substantially rectangular surface has an edge that is at least 24 feet in length;
wherein the lighting apparatus is configured to direct light away from the circuit board so that the light is directed so as to illuminate the substantially rectangular surface that is off-center relative to the light assembly;
wherein the optical elements are part of an outer surface that forms an exposed surface of the lighting apparatus; and
wherein the light assembly is configured to illuminate the substantially rectangular surface being parallel to the circuit board.

* * * * *